United States Patent
Inoue et al.

(10) Patent No.: US 6,986,528 B2
(45) Date of Patent: Jan. 17, 2006

(54) OCCUPANT ARRESTING DEVICE

(75) Inventors: Michio Inoue, Aichi (JP); Chiharu Totani, Aichi (JP); Toshinori Tanase, Aichi (JP); Takuji Nagata, Aichi (JP); Shuji Inui, Aichi (JP); Shinji Oguchi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 155 days.

(21) Appl. No.: 10/257,933

(22) PCT Filed: Apr. 27, 2001

(86) PCT No.: PCT/JP01/03693

§ 371 (c)(1),
(2), (4) Date: Oct. 21, 2002

(87) PCT Pub. No.: WO01/83271

PCT Pub. Date: Nov. 8, 2001

(65) Prior Publication Data

US 2003/0141711 A1  Jul. 31, 2003

(30) Foreign Application Priority Data

| May 1, 2000 | (JP) | 2000-132581 |
| May 26, 2000 | (JP) | 2000-1157323 |
| Jun. 1, 2000 | (JP) | 2000-164019 |
| Jul. 7, 2000 | (JP) | 2000-207302 |
| Aug. 4, 2000 | (JP) | 2000-237540 |
| Feb. 14, 2001 | (JP) | 2001-037451 |

(51) Int. Cl.
 *B60R 21/22* (2006.01)

(52) U.S. Cl. .................. 280/730.2; 280/749; 49/502

(58) Field of Classification Search ............ 280/730.2, 280/749, 730.1; 49/502
See application file for complete search history.

(56) References Cited

U.S. PATENT DOCUMENTS

| 5,316,336 A | * | 5/1994 | Taguchi et al. | 280/730.2 |
| 5,324,072 A | * | 6/1994 | Olson et al. | 280/730.2 |
| 5,333,898 A | * | 8/1994 | Stutz | 280/730.2 |
| 5,333,899 A | * | 8/1994 | Witte | 280/730.2 |
| 5,462,308 A | * | 10/1995 | Seki et al. | 280/749 |
| 5,540,459 A | * | 7/1996 | Daniel | 280/730.2 |
| 5,588,672 A | * | 12/1996 | Karlow et al. | 280/730.2 |
| 5,605,346 A | * | 2/1997 | Cheung et al. | 280/728.2 |

(Continued)

FOREIGN PATENT DOCUMENTS

EP  771699 A2  5/1997

(Continued)

*Primary Examiner*—Paul N. Dickson
*Assistant Examiner*—Toan C. To
(74) *Attorney, Agent, or Firm*—Posz Law Group, PLC

(57) ABSTRACT

An occupant restraining device (S1) is provided with: a shielding member (41) to be let off from the peripheral edge (DW/VW) of a vehicle window (WF) arranged in a door of a vehicle, so as to shield the window; and a let-off means (81, 86, 87) for letting off the housed shielding member (41) so as to shield the window (WF). The shielding member (41) and the let-off means (81, 86, 87) are arranged in the door (FD). A garnish (21) is arranged on the peripheral edge of the door (FD) for covering the housed shielding member (41) so that the shielding member (41) is let off. An airbag device (ABM) can be arranged in the vehicle without any problem even if the occupant restraining device (S1) is mounted together with the airbag device (ABM) on the vehicle.

5 Claims, 49 Drawing Sheets

U.S. PATENT DOCUMENTS

| | | | |
|---|---|---|---|
| 5,647,609 A * | 7/1997 | Spencer et al. | 280/730.2 |
| 5,660,414 A | 8/1997 | Karlow et al. | |
| 5,707,075 A * | 1/1998 | Kraft et al. | 280/730.2 |
| 5,722,685 A * | 3/1998 | Eyrainer | 280/730.2 |
| 5,752,713 A | 5/1998 | Matsuura et al. | |
| 5,865,462 A * | 2/1999 | Robins et al. | 280/730.2 |
| 5,868,421 A | 2/1999 | Eyrainer | |
| 6,029,993 A * | 2/2000 | Mueller | 280/730.2 |
| 6,325,410 B1 * | 12/2001 | Eyrainer | 280/730.2 |
| 6,508,486 B1 * | 1/2003 | Welch et al. | 280/730.2 |
| 6,612,611 B1 * | 9/2003 | Swann et al. | 280/730.2 |
| 6,616,175 B2 * | 9/2003 | Hofmann et al. | 280/728.3 |

FOREIGN PATENT DOCUMENTS

| | | |
|---|---|---|
| GB | 2286564 | 8/1995 |
| JP | 9-150703 | 6/1997 |
| JP | 9-164900 | 6/1997 |
| JP | 9-183348 | 7/1997 |
| JP | 9-277889 | 10/1997 |
| WO | WO 95/21753 | 8/1995 |

* cited by examiner

OCCUPANT ARRESTING DEVICE

TECHNICAL FIELD

The present invention relates to an occupant restraining device for shielding the inner side of a window of a vehicle, when the vehicle makes a rollover (or a lateral turning), so as to restrain an occupant in the inner side.

BACKGROUND ART

In an occupant restraining device of the prior art, as disclosed in Japanese Patent Laid-Open No. 310098/1993, when a rollover (or a lateral turning) of a vehicle is predicted, the rollover of the vehicle is detected by a rollover sensor so that a belt- or sheet-shaped shielding member housed in the peripheral edge of a window on the inner side is let off the window peripheral edge to shield the window.

The shielding member of the prior art is housed on the body side of the vehicle. However, an airbag device for expanding and inflating an airbag between an occupant and the inner wall of the vehicle when an impact acts on the side face of the vehicle (as referred to Japanese Patent Laid-Open No. 26063/1996) is also likely to be arranged in the peripheral edge of the window. In this case, it is difficult to retain the space for arranging the airbag.

DISCLOSURE OF THE INVENTION

The present invention has been conceived to solve the above-specified problem and has an object to provide an occupant restraining device which can arrange an airbag device without any trouble on the vehicle even if it is mounted together with the airbag device on the vehicle.

The object of the invention can be achieved by the following occupant restraining device. According to the invention, more specifically, an occupant restraining device comprises: a shielding member adapted to be so let off from the peripheral edge of a window of a vehicle as to shield the window; and let-off means for letting off the shielding member housed, so as to shield the window. The window is arranged in a door of the vehicle, and the shielding member and the let-off means are arranged in the door. The door includes a garnish mounted on the frame of the door and arranged on the peripheral edge of the window to cover the housed shielding member and allow the same to be let off.

In the occupant restraining device of the invention, the shielding member is so housed in the door as to shield the window of the door. When an airbag of an airbag device is arranged in the vehicle, therefore, it can be arranged in a roof side rail portion or the like on the body side of the vehicle other than the door. If the door is attached to the body, the shielding member capable of shielding the window can naturally be mounted on the vehicle and can shield the window of the door when let off.

Moreover, the housed shielding member is covered in the letting-off manner by the garnish which is arranged on the peripheral edge of the window and mounted on the door frame, so that the degradation of the appearance design of the window peripheral edge at a normal time can be minimized.

According to the occupant restraining device of the invention, therefore, the airbag device can be arranged without any problem in the vehicle without degrading the appearance design of the window peripheral edge even if it is mounted together with the airbag device on the vehicle.

Here, the shielding member of the occupant restraining device of the invention may be let off at the time of a side collision of the vehicle, but is desired to be let off at the time of detection of a rollover of the vehicle. This is because the vehicle is demanded to have a higher performance to arrest the occupant in the vehicle at the time of a rollover than at the time of a side collision.

In the aforementioned occupant restraining device, moreover, it is desired that a shielding member unit having the garnish and the shielding member integrally assembled is prepared in advance. It is also desired that the garnish and the shielding member are arranged on the door by mounting the shielding member unit on the door frame.

With this construction, the garnish and the shielding member can be mounted on the door frame only by mounting the shielding member unit on the door frame. This makes it possible to improve the workability of mounting the garnish and the shielding member with the door frame. Moreover, if the garnish and the shielding member are assembled in advance into the shielding member unit, it is easy to make the handling or management for transporting/housing the garnish and the shielding member till these members are mounted on the door frame.

On the other hand, it is desired that the shielding member is housed between the portion on the inner peripheral edge side of the window in the garnish and the door frame.

If the shielding member is housed between the portion on the inner peripheral edge side of the window in the garnish covering the door frame and the door frame, the housed shielding member can be arranged at a position different from the seal portion for sealing the peripheral edge of the door. In other words, the sealing properties of the door against the body are not degraded even if the shielding member is arranged in the peripheral edge of the window of the door.

In this case, it is preferable that the garnish includes a door portion covering the housed shielding member and adapted to be opened by the shielding member being let off.

This is because the shielding member before let off can be covered with the door portion of the garnish, so that the design of the inner peripheral edge side of the window is not degraded. The shielding member can naturally be smoothly let off while pushing and opening the door portion.

This door portion may be constructed to be opened while breaking the peripheral edge when the shielding member is let off. With this construction, the shielding member before let off can be beautifully covered to prevent the degradation in the design on the inner peripheral edge side of the window.

The garnish having the door portion is constructed to include the vicinity of the door portion and a general portion apart from the door portion's vicinity. The garnish may be made of a two-color molding part such that the molding material for the vicinity of the door is a thermoplastic elastomer, and such that the molding material for the general portion is a synthetic resin having a compatibility with the thermoplastic elastomer of the door portion and harder than the thermoplastic elastomer.

With this construction, the garnish can be integrally formed by injection molding method or the like without using a fixing means such as bolts, so that the number of steps and the cost for manufacturing the garnish can be reduced. Of course, since the door portion of the garnish and its vicinity are formed of the thermoplastic elastomer, the door portion can be smoothly warped and opened to let off the shielding member easily. Moreover, the general portion is made of a harder synthetic resin material than that of the vicinity of the door portion, so that the strength of the garnish can be retained.

In the occupant restraining device of the invention, moreover, it is desired that the occupant restraining unit formed by assembling the garnish, the shielding member and the let-off means integrally is prepared in advance. It is desired that the occupant restraining unit is mounted on the door frame to arrange the garnish, the shielding member and the let-off means in the door.

With this construction, the garnish, the shielding member and the let-off means can be mounted on the door frame merely by mounting the occupant restraining unit on the door frame, thereby to improve the workability of mounting the garnish, the shielding member and the let-off means on the door frame. Moreover, if the garnish, the shielding member and the let-off means are assembled in advance and integrated into the occupant restraining unit, it is easy to make the handling or management for transporting/housing the garnish, the shielding member and the let-off means till these members are mounted on the door frame.

It is desired that this garnish is constructed to include the following door portion, cover portion, and general portion excepting the vicinity of the door portion and the vicinity of the cover portion. The door portion covers the shielding member housed and is pushed and opened by the shielding member when the shielding member is let off. The cover portion covers the moving track, at the letting-off time of the shielding member, of the vicinity of the connection portion between the let-off means and the shielding member, and opens on letting-off of the shielding member. Moreover, the garnish may be made of a two-colored molded part in which the molding material for the vicinities of the door portion and the cover portion is a thermoplastic elastomer, and the molding material for the general portion is a synthetic resin having a compatibility with the thermoplastic elastomer and harder than the thermoplastic elastomer.

With this construction, as has been described, the garnish can be integrally formed by injection molding method without using fixing means such as bolts to reduce the number of steps and the cost for manufacturing. Further, since the door portion of the garnish, the cover portion and their vicinities are formed of the thermoplastic elastomer, the door portion and the cover portion can be smoothly warped and opened to let off the shielding member easily. Moreover, the general portion is made of a harder synthetic resin material than that of the vicinity of the door portion and the vicinity of the cover portion. Therefore, the strength of the garnish can be retained. In this garnish, moreover, the shielding member and the let-off means before actions can be covered integrally with the door portion and the cover portion so that the degradation in the design of the inner peripheral edge side of the window can be more prevented even if the shielding member and the let-off means are arranged on the peripheral edge of the window.

Moreover, in the occupant restraining device comprising the shielding member and the let-off means, a shielding member may be housed between the garnish of the peripheral edge of the window and the body, if the window is arranged in the body of the vehicle.

Specifically, if the window is arranged in the body, the airbag can be arranged in a roof side rail portion or the like on the body side of the vehicle by housing the shielding member between the garnish of the window peripheral edge and the body.

In this occupant restraining device, therefore, the airbag device can be arranged without any problem in the vehicle even if the occupant restraining device is mounted together with the airbag device in the vehicle.

Especially if the shielding member and the let-off means are arranged in the lower edge portion or the vertical edge portion of the window peripheral edge, the airbag can be mounted more easily on the vehicle.

In the occupant restraining device of this case, too, it is preferred that the garnish includes a door portion covering the shielding member housed and adapted to be opened by the shielding member being let off. This is because the shielding member before let off can be covered with the door portion of the garnish so that the design of the inner peripheral edge side of the window is not degraded. Moreover, the shielding member can be smoothly let off while pushing and opening the door portion.

In this case, too, the housed shielding member can be covered more beautifully like before if the door is constructed to open while breaking the peripheral edge when the shielding member is let off.

Moreover, the garnish of this case may be formed of the two-color molded part in which the door portion vicinity and the remaining general portion are made of predetermined molding materials like before.

The occupant restraining device of the invention may also be constructed as follows. Specifically, the shielding member is housed in a vertical edge portion extending generally vertically on the front side or the rear side of the window peripheral edge. The let-off means of the shielding member is arranged in the lower edge portion of the window peripheral edge while being connected to the shielding member housed, and is constructed to move the connection portion to the shielding member, at the action time, along the lower edge side of the window peripheral edge. At the lower edge portion of the window peripheral edge, moreover, there are arranged a moving passage for allowing the movement of the vicinity of the connection portion between the let-off means and the shielding member, and a closing portion for opening over the moving passage.

In this occupant restraining device, the let-off means moves, when activated, the connection portion to the shielding member, along the lower edge side of the window peripheral edge. Then, the shielding member, as housed in the vertical edge portion of the window peripheral edge, is let off obliquely upward from the corner, at which the vertical edge portion housing the shielding member in the window peripheral edge and the lower edge portion of the window peripheral edge intersect, to shield the inner side of the window.

Therefore, the shielding member is smoothly let off while making an upward interference to raise the occupant, even if the occupant leans against the window peripheral edge on the inner side.

At the lower edge portion of the window peripheral edge in which the let-off means is arranged, moreover, there are arranged a moving passage for allowing the movement of the vicinity of the connection portion between the let-off means and the shielding member and a closing portion for opening over the moving passage. When the vicinity of the connection portion between the let-off means and the shielding member moves, therefore, the closing portion is removed to open over the moving passage. As a result, the movement of the vicinity of the connection portion between the let-off means and the shielding member to pass through the moving passage is smoothed without being obstructed by any surrounding member. Moreover, the opening above the moving passage is normally closed by the closing portion so that the appearance of the lower edge portion of the window peripheral edge is not degraded.

The shielding member and the let-off means are arranged in the lower edge portion or the vertical edge portion of the window peripheral edge. Even if the shielding member or the like is arranged in the door or on the body side, therefore, there naturally occurs no fear that the mounting of the airbag on the vehicle is obstructed.

Therefore, in this occupant restraining device, the airbag device can be arranged without any problem even if the occupant restraining device is mounted together with the airbag device on the vehicle. Moreover, the shielding member can be smoothly let off to shield the window even if the occupant leans against the window peripheral edge on the inner side. Without inviting any degradation in the appearance of the lower edge portion of the window peripheral edge at the normal time, moreover, the let-off means can be smoothly activated to shield the window with the shielding member.

In the occupant restraining device of this case, it is desired that the shielding member is arranged, when housed, in the lower edge portion while extending from the vertical edge portion of the window peripheral edge.

In this construction, the shielding member is housed not only in the vertical edge portion of the window peripheral edge but also in the lower edge portion. Specifically, as compared with the case in which the shielding member is housed in its entirety only in the lower edge portion or the vertical edge portion of the window peripheral edge, the shielding member can be dispersed between the lower edge portion and the vertical edge portion in the window peripheral edge. Therefore, the shielding member can be housed coping with limited space in the window peripheral edge.

Moreover, the let-off means is let off in the direction along the lower edge portion. If the moving portion of the shielding member at the letting-off time is housed in advance in the lower edge portion and if the let-off means is connected to that portion, the moving stroke of the let-off means can be minimized to make the let-off means simple and compact.

In the occupant restraining device thus constructed, too, in case the garnish is so arranged at the vertical edge portion of the window peripheral edge as to cover the housed shielding member, the garnish is desired to include a door portion covering the housed shielding member and adapted to be opened by the shielding member being let off. This is because the shielding member before let off can be covered with the door portion of the garnish so that the design of the inner peripheral edge side of the window is not degraded. On the other hand, the shielding member can be smoothly expanded while pushing and opening the door portion.

Of course, the door portion of this case may be constructed such that it is opened while breaking the peripheral edge when the shielding member is let off.

In the occupant restraining device having the moving passage and the closing portion, moreover, the closing portion is constructed of a removable cap arranged at the lower edge portion of the window peripheral edge. At the action time of the let-off means, moreover, the cap may be constructed to be pushed out of the lower edge portion of the window peripheral edge by a member in the vicinity of the connection portion moving, to form an opening.

With these constructions, at the action time of the let-off means, the cap is brought out of the lower edge portion of the window peripheral edge while being pushed by the member near the moving connection portion so that the opening can be simply formed to smooth the let-off of the shielding member.

In the occupant restraining device having the moving passage and the closing portion, moreover, the closing portion is constructed of an openable door portion arranged at the lower edge portion of the window peripheral edge. At the action time of the let-off means, moreover, the door portion may be constructed to be pushed and opened by the member in the vicinity of the connection portion moving, to form an opening.

With these constructions, too, at the action time of the let-off means, the door potion is opened while being pushed by the member near the moving connection portion so that the opening can be simply formed to smooth the let-off of the shielding member.

In the occupant restraining device having the moving passage and the closing portion, moreover, the closing portion may be constructed of a portion to be broken, arranged at the lower edge portion of the window peripheral edge. At the action time of the let-off means, the portion to be broken is constructed to be pushed and broken by the member in the vicinity of the connection portion moving, to form an opening above the moving passage.

With these constructions, too, at the action time of the let-off means, the potion to be broken is broken while being pushed by the member near the moving connection portion so that the opening can be simply formed to smooth the let-off of the shielding member.

In the occupant restraining device having the moving passage and the closing portion, still moreover, a surface skin may be arranged on the surface of the lower edge portion of the window peripheral edge. The surface skin is constructed to include a body and a cover-shaped surface skin to be peeled from the body. The closing portion is constructed of the cover-shaped surface skin to be peeled from the surrounding body. At the action time of the let-off means, the cover-shaped surface skin is constructed to be pushed by the member near the connection portion moving and is peeled from the body, to form an opening.

With these constructions, too, at the action time of the let-off means, the cover-shaped surface skin is peeled from the body while being pushed by the member near the moving connection portion so that the opening can be simply formed to smooth the let-off of the shielding member.

BEST MODE FOR CARRYING OUT THE INVENTION

One embodiment of the invention will be described with reference to the accompanying drawings.

Figure 1:
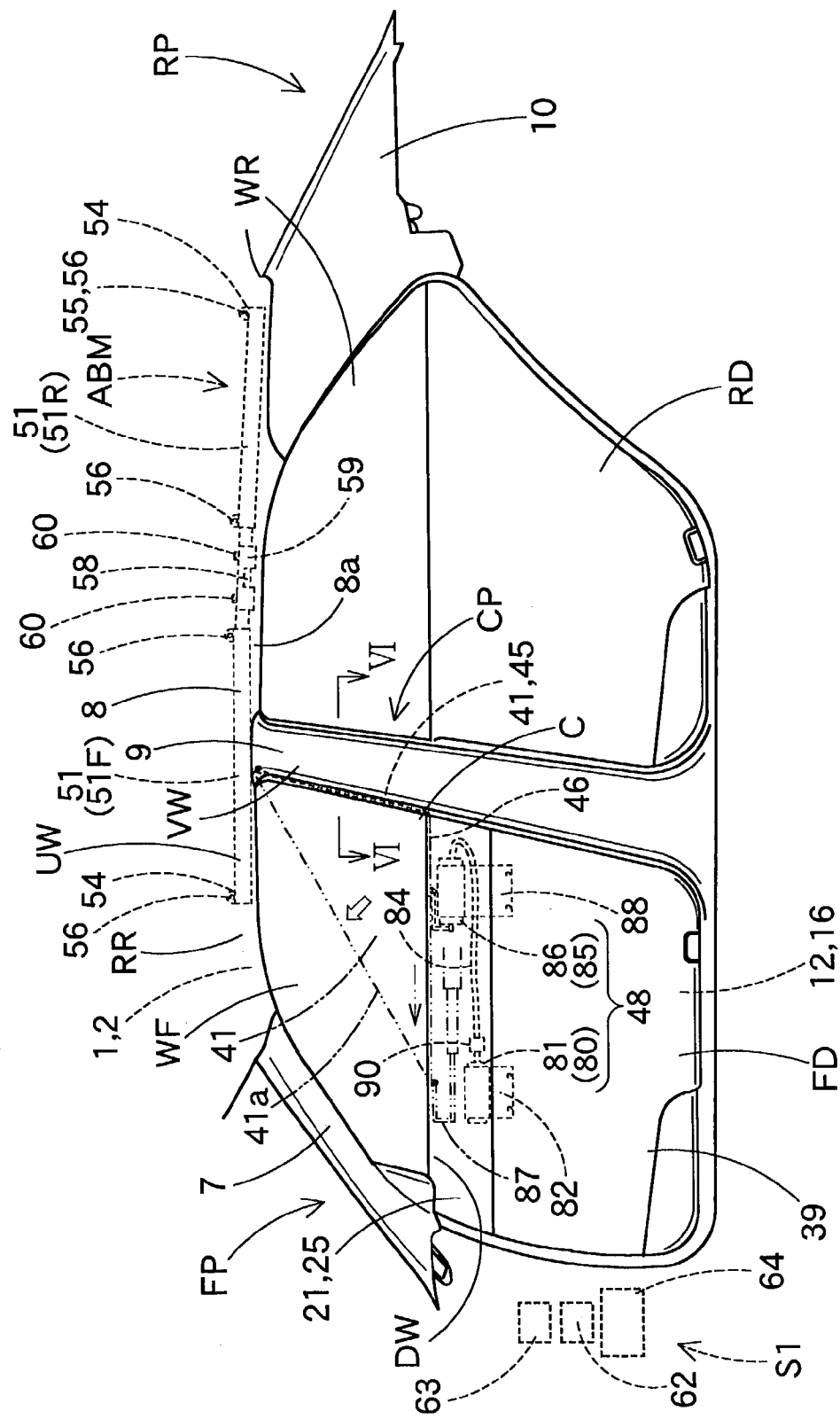
FIG. 1 is a front elevation showing an occupant restraining device according to a first embodiment of the present invention as taken from the inside of a vehicle.
Figure 2:
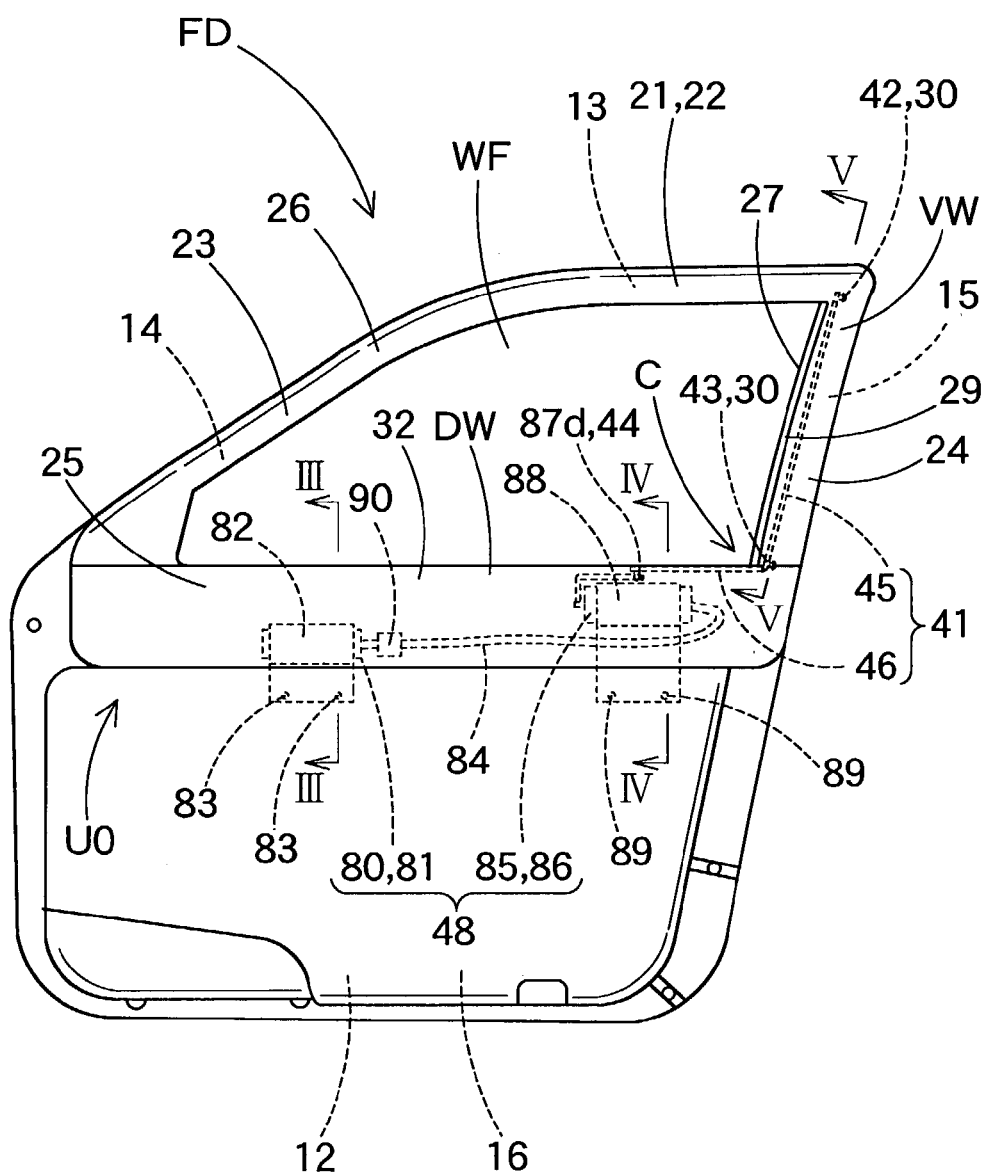
FIG. 2 is a front elevation showing a door of the first embodiment as taken from the inside of the vehicle.
Figure 8:
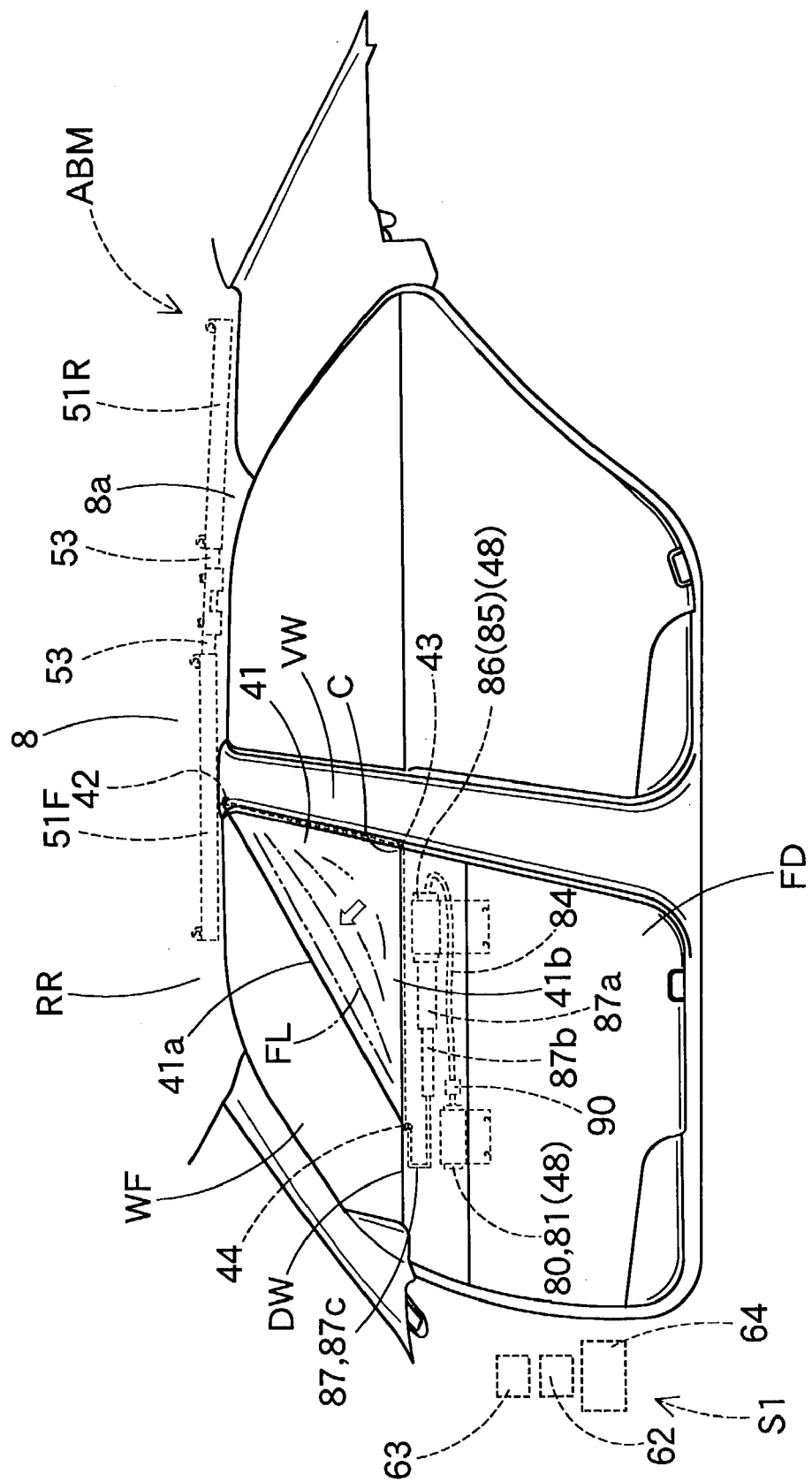
FIG. 8 is a front elevation showing the expanded state of a shielding member of the occupant restraining device of the first embodiment as taken from the inside of the vehicle.

An occupant restraining device S1 of a first embodiment is constructed by arranging a sheet-shaped shielding member 41 in a front side door FD of a vehicle, as shown in FIGS. 1, 2 and 8. Moreover, an airbag device ABM is mounted on the vehicle on condition that a folded airbag 51 (51F/51R) is housed at the lower edge side of a roof side rail portion RR.

The occupant restraining device S1 is constructed to include the shielding member 41, let-off means 48, or release mechanism, and a control device 64. The shielding member 41 is so folded as to shield a window WF of the door FD when it is expanded. The let-off means 48 is provided with an inflator 81 for expanding the folded shielding member 41. The control device 64 activates the let-off means 48 in response to a rollover detection signal from a rollover sensor 62. This rollover sensor 62 outputs the rollover detection signal to the control device 64 when a rollover of the vehicle is predicted.

The control device 64 and the rollover sensor 62 are arranged at predetermined positions of the vehicle. In response to the rollover detection signal from the rollover sensor 62, moreover, the control device 64 activates the inflator 81. On other hand, the control device 64 of the embodiment is further electrically connected with a side collision sensor 63 and an inflator 58 of the airbag device ABM, as will be described hereinafter. In response to a side collision detection signal from the side collision sensor 63, moreover, the control device 64 activates the inflator 58 to expand and inflate the airbag 51F/51R. When an impact at a predetermined or higher level is applied to the side face of the vehicle, the side collision sensor 63 outputs the side collision detection signal to the control device 64.

Figure 5:
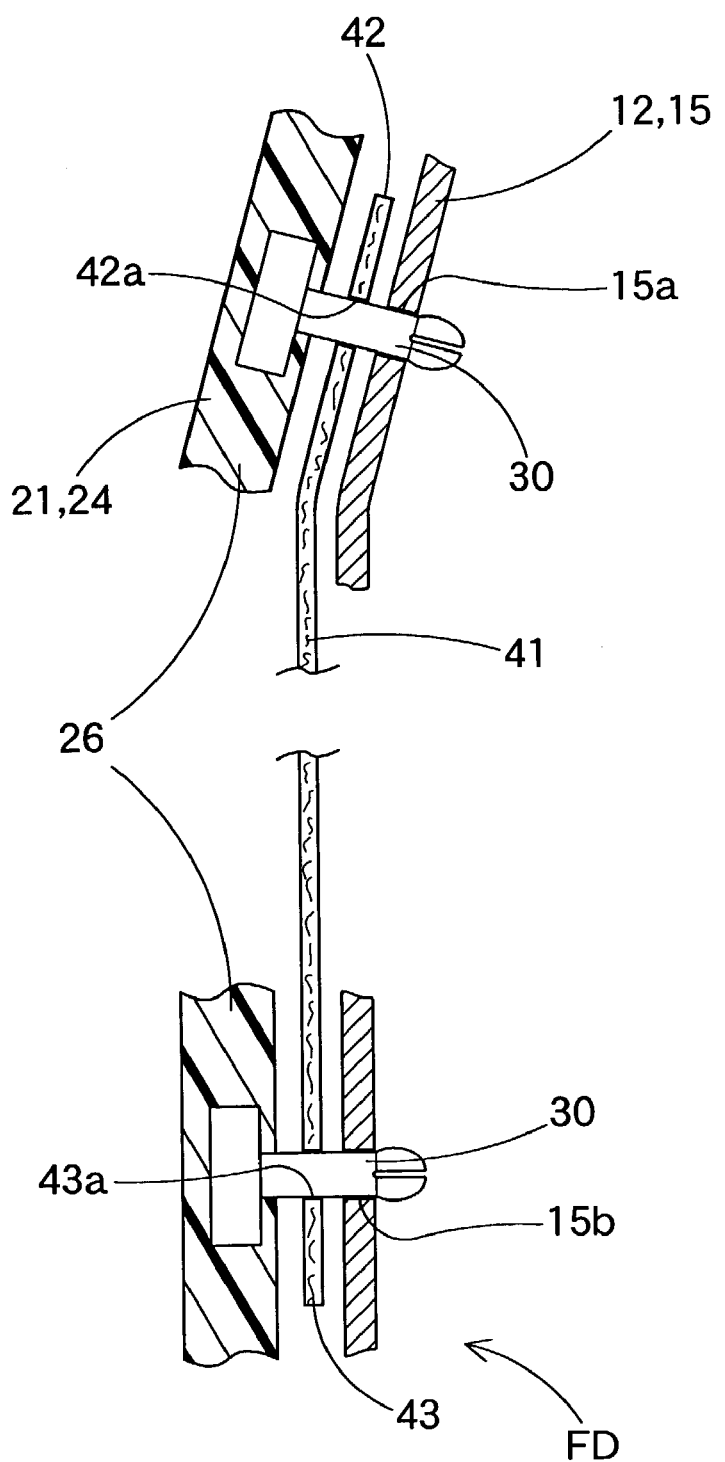
FIG. 5 is a schematic section of a portion V—V of FIG. 2.

As shown in FIGS. 1 and 8, the shielding member 41 is formed of a flexible cloth having a triangular sheet shape in the expanded state. Moreover, the shielding member 41 is housed in its folded state in the peripheral edge of the window WF of the door FD from the rear edge side to the lower edge side. The shielding member 41 provides mounting portions 42/43/44 at the rear edge upper portion, the rear edge lower portion and the front end portion in its expanded state, respectively. Moreover, the shielding member 41 is connected at its mounting portion 44 to a piston rod upper end 87d, as shown in FIG. 2. A piston rod 87 forms part of the later-described connection means 85 of the let-off means 48. The shielding member 41 is further connected at its mounting portions 42 and 43 to the frame 12 of the door FD, as shown in FIG. 5. Here, the mounting portions 42/43 are provided with mounting holes 42a/43a, respectively. A garnish 21 is arranged on the inner side of the door frame 12, and retaining pins 30 are buried in the garnish 21. Mounting holes 15a/15b are formed in the upper/lower portions of the rear vertical edge portion 15 of the door frame 12. Moreover, the individual mounting portions 42/43 are fixed on the door frame 12 by inserting the retaining pins 30 through the mounting holes 42a/43a and by retaining the retaining pins 30 in the mounting holes 15a/15b to mount them on the door frame 12. Moreover, the mounting portion 44 is fixed on the piston rod upper end 87d by means of bolts, as has been described hereinbefore.

This shielding member 41 is so housed in an inverted L-shape that it is folded obliquely backward and downward in a bellows shape, as shown in FIG. 2. Specifically, the shielding member 41 is so housed as to cross a rear side corner C of a lower edge portion DW in the peripheral edge of the window WF. Moreover, the housed shielding member 41 is covered with a rear vertical edge portion 24 and a lower edge portion 25 of each door frame garnish 21. This inverted L-shape shielding member 41 is composed of a vertical edge side housed portion 45 and a lower edge side housed portion 46. The shielding member 41 is folded, as shown by two-dotted lines in FIG. 8, from the flatly expanded state into such a bellows shape as has folds FL of crests and valleys extending as much as possible along an oblique side 41a of the shielding member 41.

Here, the door FD is constructed, as shown in FIGS. 1 to 5, to include the door frame 12 made of a sheet metal, the door frame garnish 21 and a door trim 39. The door frame garnish 21 covers the inner side of the peripheral edge of the window WF of the door frame 12. The door trim 39 is made of a synthetic resin such as polypropylene and covers the inner side of the door frame 12 below the garnish 21. The door frame 12 is constructed to include an upper edge portion 13, a front vertical edge portion 14 and a rear vertical edge portion 15 of the peripheral edge of the window WF, and a lower edge portion 16 of the lower edge side of the window WF.

The door frame garnish 21 is mounted on the inner side of the door frame 12. Moreover, the garnish 21 is arranged all over the peripheral edge of the window WF, and includes an upper edge portion 22, a front vertical edge portion 23, a rear vertical edge portion 24 and a lower edge portion 25. The upper edge portion 22, the front vertical edge portion 23 and the rear vertical edge portion 24 are formed to have such a generally U-shaped section (as referred to FIG. 6) as can be fitted on the inner side of the upper edge portion 13, the front vertical edge portion 14 and the rear vertical edge portion 15 in the peripheral edge of the window WF of the door frame 12.

Figure 6:
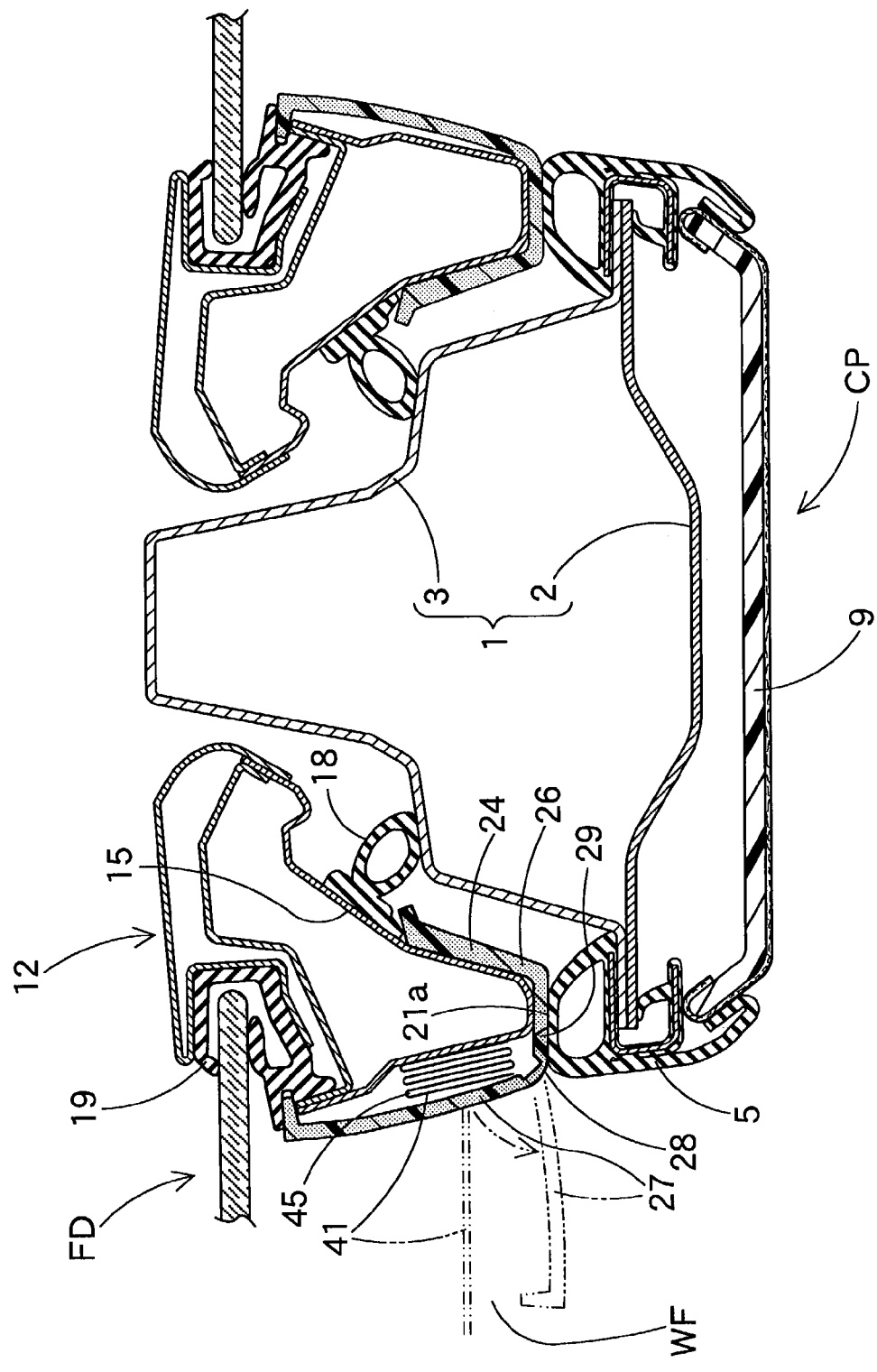
FIG. 6 is a schematic section of a portion VI—VI of FIG. 1.

Here the peripheral edge of the door FD on the side of the body 1 is constructed of an inner panel 2 and an outer panel 3, as shown in FIG. 6, and there is also arranged on the side of the body 1 a weather strip 5 for sealing the outer peripheral edge of the door FD. Moreover, the weather strip 5 is forced, when the door FD is closed, to contact with the apex portion 21a of the garnish 21 protruding to the inner side and the front edge, the lower edge and the rear edge of the door FD on the lower side apart from the garnish 21. The inward protruding apex portion 21a of the garnish 21 is arranged at the upper edge portion 22, the front vertical edge portion 23 and the rear vertical edge portion 24. On the other hand, a member designated by numeral 18 in FIG. 6 is a weather strip fixed on the outer edge side of the door frame 12. This weather strip 18 is forced, when the door FD is closed, to contact with the outer panel 3 on the side of the body 1. Moreover, a member designated by numeral 19 is a glass run.

In the rear vertical edge portion 24 of the garnish 21 and on the end portion side of the inner peripheral edge side of the window WF, moreover, there is arranged a door portion 27 which is pushed and opened by the shielding member 41 when this shielding member 41 is expanded from its folded state, as shown in FIG. 6. The door portion 27 is provided with such a thin hinge portion 28 at the end portion on the vehicle's inner side as to open the door portion 27 easily. Moreover, the vertical edge side housed portion 45 in the folded shielding member 41 on the side of the garnish rear vertical edge portion 24 is so housed between the door portion 27 and the rear vertical edge portion 15 of the door frame 12 as is covered on its front side with the door portion 27 on the inner peripheral edge side of the window WF.

Figure 3:
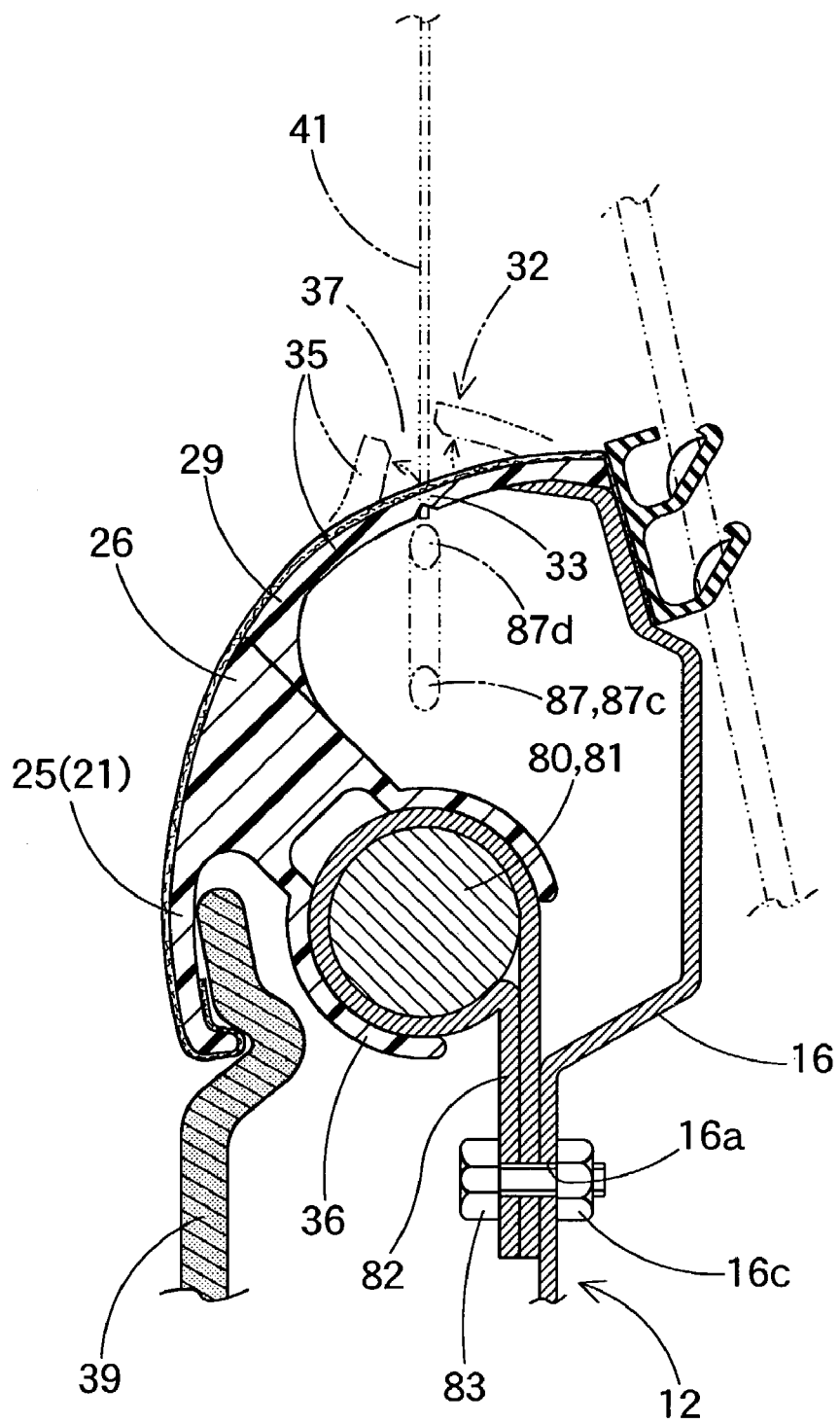
FIG. 3 is a schematic section of a portion III—III of FIG. 2.
Figure 4:
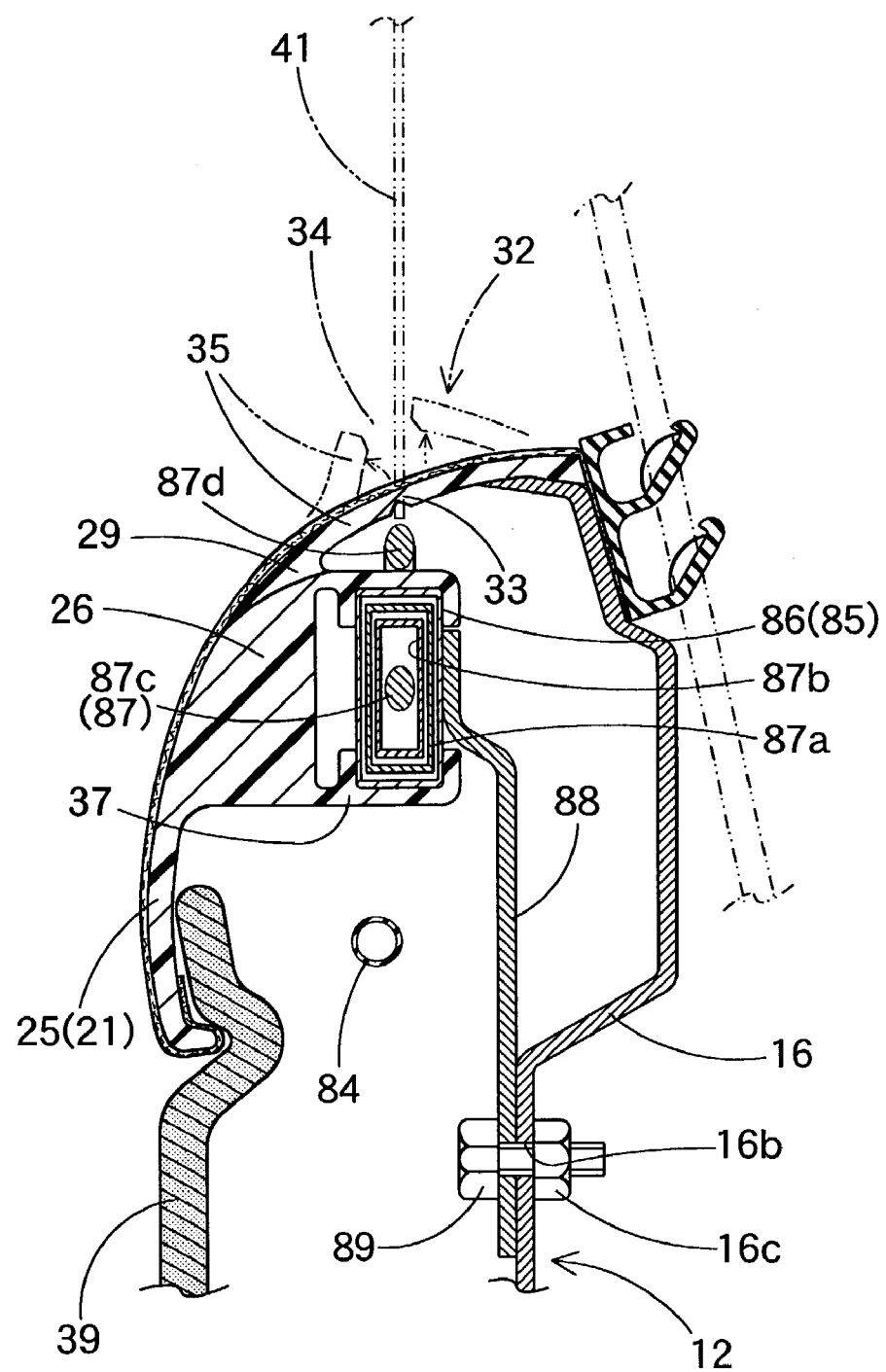
FIG. 4 is a schematic section of a portion IV—IV of FIG. 2.

On the upper edge side of the lower edge portion 25 of the garnish 21, as shown in FIGS. 2 to 4, there is arranged a cover portion 32. In this cover portion 32, there is arranged a portion 33 which is extended longitudinally of the vehicle and is thinned to be broken. The cover portion 32 covers over the lower edge side housed portion 46 of the folded shielding member 41 disposed at the side of the garnish lower edge portion 25. The cover portion 32 further covers over the track of the moving piston rod 87. Specifically, the cover portion 32 covers over the moving passage, via which the later-described connection portion between the piston rod upper end 87d and the shielding member 41 moves, so that the cover portion 32 plays a role of a closing portion for covering over the moving passage. As the piston rod 87 of the connection means 85 moves forward, moreover, the portion 33 to be broken is so broken by the shielding member 41 as to open a door portion 35 thereby to form an opening 34. In this opening 34, there is arranged the side of the lower edge portion 41b of the expanded shielding member 41 (as referred to FIG. 8).

Here, the lower edge side housed portion 46 being the lower side of the shielding member 41 in the folded state is not housed in the entire longitudinal length of the garnish lower edge portion 25, but is housed in about one third to one fifth of the entire length of the lower edge portion 25 that it is closer to the side of the garnish rear vertical edge portion 24.

Figure 7:
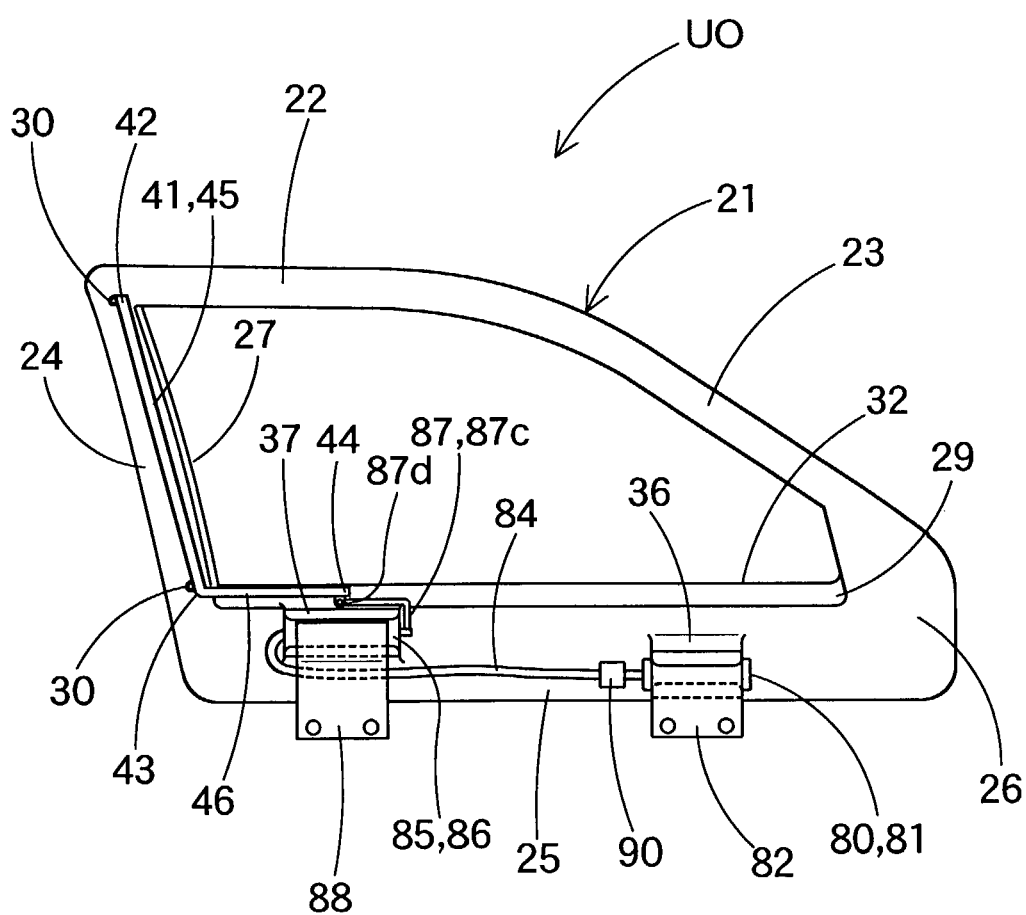
FIG. 7 presents front elevations showing an occupant restraining unit of the first embodiment as taken from the outside of the vehicle.

On the face of the outer side of the garnish lower edge portion 25, moreover, there are formed grip portions 36 and 37, as shown in FIGS. 3, 4 and 7. The grip portion 36 grips the inflator 81 constructing the let-off means 48. The grip portion 37 grips a cylinder 86 forming part of the connection means 85.

In the face on the outer side at the upper and lower ends of the garnish rear vertical edge portion 24, on the other hand, there are buried the retaining pins 30/30 made of a metal so as to protrude to the outer side, as shown in FIG. 5.

Moreover, the door frame garnish 21 is provided with a general portion (or a hard portion) 26 and a soft portion 29 (as referred to FIGS. 3, 4 and 7) and is molded of an integral two-color molded part made of a synthetic resin such as a thermoplastic elastomer of polyolefin. The soft portion 29 is a portion for constructing the door portion 27, the hinge portion 28 and the cover portion 32. The general portion 26 is the portion other than the soft portion 29. This soft portion 29 is so formed of a thermoplastic elastomer of polyolefin that the door portions 27/35 may be easily opened when the shielding member 41 is expanded. The general portion 26 has a compatibility with the molding material of the soft portion 29 and is made of hard polypropylene so as to retain the strength. Moreover, in this garnish 21, the soft portion 29 is molded after the hard portion (or the general portion) 26 was molded. Alternatively, the hard portion (or the general portion) 26 may be molded after the soft portion 29 was molded. After these molding operations, moreover, a skin (reference numeral omitted) of a thermoplastic elastomer such as olefin or styrene, leather or fabric is adhered to the inner side surface of the lower edge portion 25 of the garnish 21 so as to improve the design (as referred to FIGS. 3 and 4).

The let-off means 48 of the shielding member 41 is constructed, as shown in FIGS. 1 and 2, of the inflator 81 acting as a drive source 80 and the connection means 85 for guiding the shielding member 41 being expanded. The inflator 81 is constructed to discharge an inflating gas when activated. In the case of the embodiment, moreover, the connection means 85 is constructed of the cylinder 86 and the piston rod 87. The cylinder 86 admits the inflating gas from the inflator 81, and the piston rod 87 is largely protruded from the cylinder 86 by the inflating gas introduced into the cylinder 86.

As shown in FIGS. 1 and 4, the cylinder 86 is held by a mounting bracket 88 and is covered with the garnish lower edge portion 25. The mounting bracket 88 is fixed on the lower edge portion 16 of the door frame 12 by means of mounting bolts 89. These bolts 89 are fastened into mounting holes 16b formed by fixing nuts 16c.

The piston rod 87 is formed to have multiple steps of a first rod 87a, a second rod 87b and a third rod 87c. Of the piston rod 87: the first rod 87a is supported by the cylinder 86; the second rod 87b is supported by the first rod 87a; and the third rod 87c is supported by the second rod 87b. As the inflating gas is introduced into the cylinder 86, as shown in FIGS. 1 and 8: the first rod 87a is protruded forward from the cylinder 86; the second rod 87b is protruded forward from the first rod 87a; and the third rod 87c is protruded forward from the second rod 87b. The third rod 87c is bent at its front end portion, and the front end mounting portion 44 of the shielding member 41 is fixed on the leading end of the upper end 87d by means of bolts.

The inflator 81 for expanding the shielding member 41 is of such a cylinder type as is clamped by a mounting bracket 82, as shown in FIGS. 1 to 3. The inflator 81 is connected on its rear end side to a feed pipe 84. This feed pipe 84 feeds the rear end side of the cylinder 86 with the inflating gas discharged from the inflator 81. This inflator 81 is fixed on the door frame lower edge portion 16 by mounting the mounting bracket 82 on the lower edge portion 16 of the door frame 12 by means of bolts 83. Moreover, the inflator 81 is covered with the door garnish lower edge portion 25. The bolts 83 are fastened into mounting holes 16a. These mounting holes 16a are formed by fixing the nuts 16c on the lower edge portion 16 of the door frame 12.

In the feed pipe 84 and near the inflator 81, there is arranged a flow control valve 90 for adjusting the flow rate of the inflating gas. The flow control valve 90 is so electrically connected with the control device 64 that the flow rate of the inflating gas may be adjusted by the control device 64. In the case of the embodiment, the flow control valve 90 is normally kept in a fully open state and is controlled to such a closed side by the control of the control device 64 as to throttle the flow rate of the inflating gas. In the case of the embodiment, moreover, the flow control valve 90 is so set that the shielding member 41 may complete its expansion generally at the same time as the airbag 51F/51R completes expansion, if the inflator 81 is activated with the control valve 90 being in the fully open state. The flow control valve 90 is also so set that the shielding member 41 may complete its expansion after the airbag 51F/51R completes expansion when the control valve 90 is controlled to throttle the flow rate of the inflating gas. Here in the embodiment, the control device 64 activates the inflator 81 without making the throttle control of the flow control valve 90 when it receives the side collision detection signal from the side collision sensor 63. Moreover, the control device 64 controls the flow control valve 90 to throttle the flow rate of the inflating gas when it receives the rollover detection signal from the rollover sensor 62.

Figure 9:
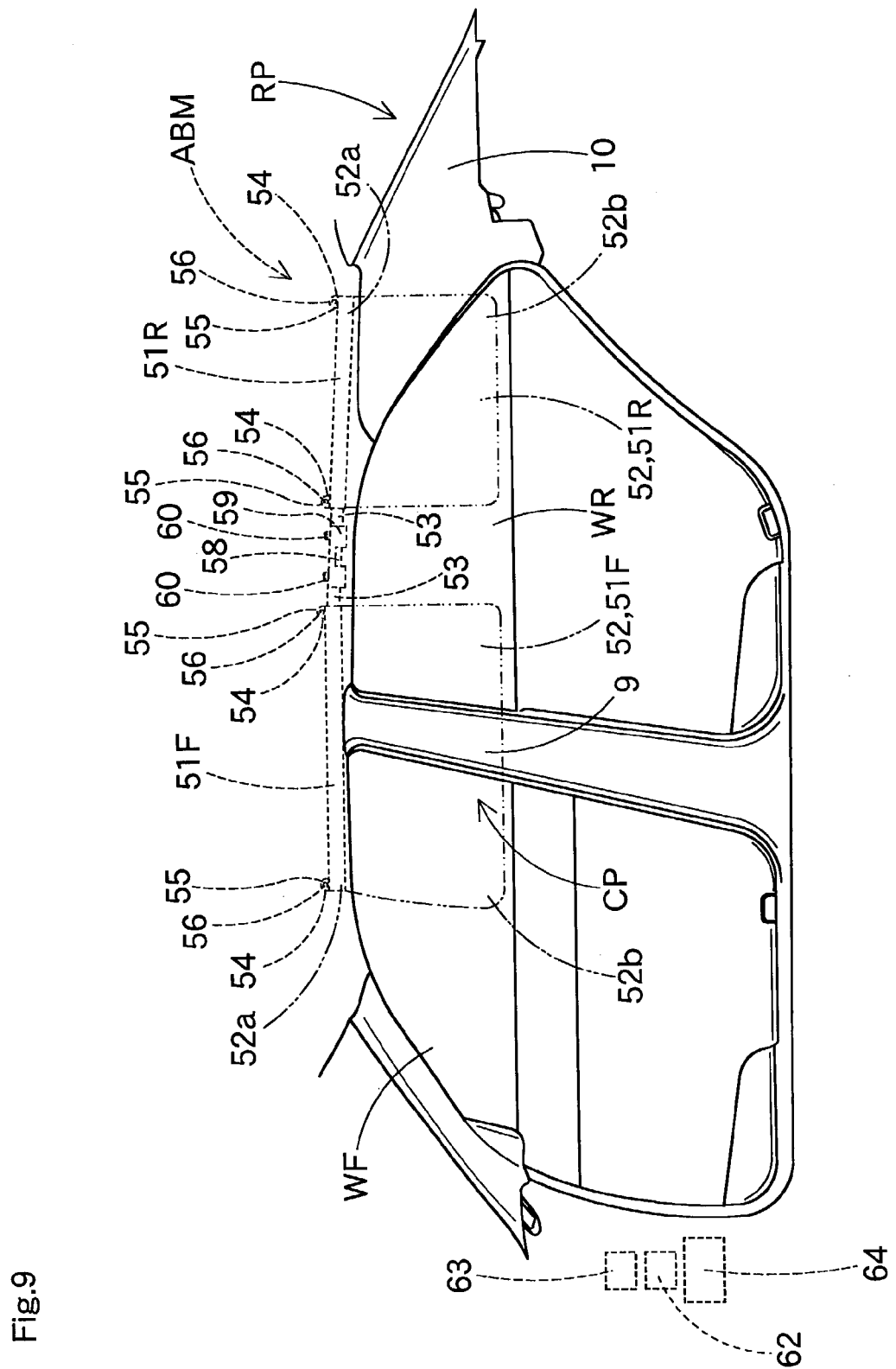
FIG. 9 is a front elevation showing the expansion and inflation of an airbag juxtaposed with the occupant restraining device of the first embodiment, as taken from the inner side.

As shown in FIGS. 1 and 9, moreover, the airbag device ABM is constructed to include the airbag 51F/51R, the inflator 58 and the side collision sensor 63. The inflator 58 feeds the airbag 51F/51R with the inflating gas. The side collision sensor 63 outputs a predetermined signal to the control device 64 at the time of a side collision of the vehicle. The side collision sensor 63 is arranged at a predetermined position of the vehicle. Here in the case of the embodiment, the inflator 58 of the airbag device ABM is set to be activated when the control device 64 receives the rollover detection signal from the rollover sensor 62, too.

The airbags 51F/51R are made separate and independent of each other and are in the bag shapes which are inflated when fed with the inflating gas from the inflator 58. In the case of the embodiment, both the airbags 51F/51R are formed generally into rectangular sheets. Each airbag 51F/51R is constructed to include: a body portion 52/52 to be inflated when fed with the inflating gas; and a cylindrical gas inlet port 53/53 for feeding the inflating gas into the body portion 52/52. The gas inlet port 53 of the airbag 51F is arranged on the upper rear side of the body portion 52, and the gas inlet port 53 of the airbag 51R is arranged on the upper front side of the body portion 52. These gas inlet portions 53 are individually connected with the inflators 58. On the upper edge side of the airbag 51F/51R, there are arranged a plurality of mounting portions 54/54. These mounting portions 54 are fixed at the roof side rail portion RR on the inner panel 2 on the side of the body 1. On each of the mounting portion 54/54, there is fixed a mounting bracket 55, with which the mounting portion 54/54 is fixed on the inner panel 2 by means of bolts 56.

Moreover, the airbags 51F/51R are individually fixed only at the sides of upper edges 52a on the inner panel 2, when expanded/inflated, by using the individual mounting portions 54/54. In other words, the body portions 52/52 at the time of expansion/inflation are arranged to have their lower edges 52*b* as free ends to swing to the inner side and to the outer side.

Moreover, the airbag 51F/51R is folded in bellows from the lower edge 52*b* to the upper edge 52*a* and is covered with the roof head lining 8 on the inner side of the roof side rail portion RR. This roof head lining 8 is made of a synthetic resin and is provided at its lower edge with a door portion 8*a* which can be opened to the inner side. At the time of the expansion/inflation, moreover, the airbag 51F/51R pushes against and opens the door portion 8*a* and protrudes downward to take a position between the occupant, e.g. a driver or a passenger, and the inner face of the shielding member 41 or the inner face of the vehicle.

At the time of the expansion/inflation, the airbag 51F covers the upper side of a center pillar garnish 9 on the inner side of a center pillar portion CP. The airbag 51R covers the front side of a rear pillar garnish 10 on the inner side of a rear pillar portion RP.

The inflator 58 is made into a cylinder type and is held by a mounting bracket 59. Moreover, the inflator 58 is so mounted on the inner panel 2 of the roof side rail portion RR by fixing the mounting bracket 59 on the inner panel 2 of the roof side rail portion RR by means of mounting bolts 60. The inflator 58 is of dual type capable of discharging the inflating gas from its two ends so that the inflating gas discharged from the front end side expands/inflates the airbag 51F on the front side and the inflating gas discharged from the rear end side expands/inflates the airbag 51R on the rear side.

Here will be described how to mount the occupant restraining device S1 of the first embodiment on the vehicle. First of all, an occupant restraining unit U0 is assembled, as shown in FIG. 7. In the assembly of the occupant restraining unit U0, the shielding member 41 in the flatly expanded state is folded in such a bellows shape as to bring the front mounting portion 44 close to the side of the rear mounting portions 42/43, and the shielding member 41 thus folded is wrapped with a plurality of not-shown breakable tape members for preventing the collapse. Then, the inflator 81 and the cylinder 86 are assembled with the garnish 21 by gripping them in the grip portions 36/37 of the garnish 21. At this time, the feed pipe 84 having the flow control valve 90 is connected in advance to the inflator 81 and the cylinder 86.

By inserting the retaining pins 30 into the mounting holes 42*a*/43*a*, the individual mounting portions 42/43 of the shielding member 41 are mounted on the outer side of the garnish rear vertical edge portion 24. Then, the occupant restraining unit U0 can be assembled, as shown in FIG. 7, by mounting the mounting portion 44 of the front end side of the shielding member 41 on the upper end 87*d* of the piston rod 87 housed in the cylinder 86, by means of bolts.

In the occupant restraining unit U0 thus assembled, the retaining pins 30/30 are fitted at first into the mounting holes 15*a*/15*b* of the door frame 12. Then, the garnish 21 is fixed on the door frame 12 by means of suitable bolts or the like at the not-shown portions while the upper edge portion 22, the front vertical edge portion 23 and the rear vertical edge portion 24 of the garnish 21 are fitted on the upper edge portion 13, the front vertical edge portion 14 and the rear vertical edge portion 15 of the door frame 12. By screwing the individual mounting bolts 83/89 into the mounting holes 16*a*/16*b* to fix the individual mounting brackets 82/88 on the door frame lower edge portion 16, moreover, the occupant restraining unit U0 can be assembled with the door frame 12. After this, the assembly of the door FD can be completed by mounting the door trim 39 on the door frame lower edge portion 16, and the occupant restraining device S1 can be mounted on the vehicle by mounting the door FD on the body 1. Here, the control device 64 and the rollover sensor 62 are separately mounted at the predetermined positions of the vehicle, and the not-shown lead wires extending from the inflator 81 are connected with the control device 64 when the occupant restraining device S1 is mounted on the vehicle.

Here will be described how to mount the airbag device ABM on the vehicle. The individual airbag 51F/51R is folded toward the upper edge side and is then wrapped with the not-shown breakable tape members so that it may not collapse. Next, the mounting bracket 55 is mounted on the mounting portion 54/54 of the airbag 51F/51R. On the other hand, the gas inlet portion 53/53 is connected with the inflator 58, and the mounting bracket 59 is mounted on the inflator 58 to form the airbag assembly. By mounting the mounting bracket 55/59 on the inner panel 2 by means of the bolts 56/60 to mount the roof head lining 8 on the inner panel 2, moreover, the airbag device ABM can be mounted on the vehicle. Here, the side collision sensor 63 is separately mounted at a predetermined position of the vehicle and is electrically connected with the control device 64, and the not-shown lead lines extending from the inflator 58 are connected with the control device 64 when the airbag device ABM is mounted on the vehicle.

After the occupant restraining device S1 and the airbag device ABM was mounted on the vehicle, moreover, the control device 64 activates, in response to the rollover detection signal from the rollover sensor 62, the inflator 81 to throttle the flow rate of the inflating gas to pass through the flow control valve 90. Then, the inflating gas discharged from the inflator 81 is introduced through the feed pipe 84 into the cylinder 86 of each cylinder 86 so that the first/second rods 87*a*/87*b* of the piston rod 87 are sequentially protruded forward from the cylinder 86, and the third rod 87*c* is protruded forward from the second rod 87*b*.

As a result, the shielding member 41 moves forward at its front end mounting portion 44 from its folded state, as indicated by a double-dotted line in FIG. 1 and by a solid line in FIG. 8, in accordance with the forward movement of the third rod 87*c*. Then, the shielding member 41 pushes against and opens the door portion 27 of the garnish rear vertical edge portion 24 and expands while opening the to-be broken portion 33 of the garnish lower edge portion 25. Then, the shielding member 41 thus let off can complete its expansion to arrest the occupant.

In the embodiment, at this time, the control device 64 receives the rollover detection signal from the rollover sensor 62 to activate the inflator 58 of the airbag device ABM, too. This inflator 58 discharges, when activated, the inflating gas from the two front/rear ends and feeds it to the airbag 51F/51R. Then, the airbag 51F/51R admits the inflating gas through the gas inlet portion 53/53 into the body portion 52/52. Therefore, the airbag 51F/51R is expanded/inflated from its folded state to push against and open the door portion 8*a* of the roof head lining 8 to the inner side, thereby to arrange its body portion 52/52 between the occupant and the center pillar portion CP and/or the rear pillar portion RP being the inner face of the vehicle's inner side, as indicated by a double-dotted line in FIG. 9. Therefore, the occupant can also be properly arrested by the body portion 52/52 of the airbag 51F/51R.

In the vehicle of the first embodiment, moreover, the control device 64 activates the inflator 58/81, too, in response to the side collision detection signal from the side collision sensor 63 thereby to expand the airbag 51F/51R and the shielding member 41.

Here in the occupant restraining device S1 of the first embodiment, the control device 64 activates the inflator 81 without controlling the flow control valve 90 in the fully open state, when it receives the side collision detection signal from the side collision sensor 63, so that the shielding member 41 is expanded to complete the shielding operation in a shorter time period than that against rollover. Even if an impact from the side face is applied to the vehicle, therefore, the shielding member 41 can shield the window WF quickly to arrest the occupant properly.

Here, the first embodiment may be modified such that the let-off completion of the shielding member 41 and the completion of the expansion/inflation of the airbag 51F/51R are made to occur substantially simultaneously even at the time against the rollover by eliminating the flow control valve 90. When controlling the throttling of the flow control valve 90, on the contrary, the let-off completion of the shielding member 41 may be made simultaneous. Then the let-off completion of the shielding member 41 may occur earlier than the expansion/inflation completion of the airbag 51F/51R at a predetermined time coping with rollover or side collision. In this case, it is preferable to arrange the shielding member 41 on the peripheral edge of the window WR on the side of the rear door RD (as referred to FIG. 25). When a later-described pretensioner 70 is used as a let-off means 48, too, the let-off completion of the shielding member 41 may be made earlier than the expansion/inflation completion of the airbag 51F/51R.

In case the airbags 51F/51R of the airbag device ABM are arranged in the vehicle, as has been described, the shielding member 41 is housed in the door FD in the occupant restraining device S1 of the first embodiment. Therefore, the airbag 51F/51R can be arranged in the roof side rail portion RR on the side of the body 1 other than the door FD. Moreover, the housed shielding member 41 is covered with the garnish 21 which is arranged in the peripheral edge of the window WF and mounted on the door frame 12 so that it may be let off. Therefore, it is possible to minimize the degradation of the appearance design of the peripheral edge of the window WF at a normal time.

Even if the occupant restraining device S1 of the first embodiment is mounted together with the airbag device ABM on the vehicle, therefore, the airbag device ABM can be arranged in the vehicle without degrading the appearance design of the peripheral edge of the window WF.

Especially in the first embodiment, the vertical edge side housed portion 45 of the folded shielding member 41 is housed at the portion on the inner peripheral edge of the window WF of the garnish 21 covering the door frame 12, that is, between the portion on the inner peripheral edge side of the garnish rear vertical edge portion 24 and the door frame rear vertical edge portion 15. Therefore, the vertical edge side housed portion 45 of the housed shielding member 41 can be arranged at a position different from the arranged portion (or the seal portion) of the weather strip 5/18 for sealing the peripheral edge of the door FD, i.e., the portion 21a protruding toward the inner side or the portion of the outer edge side in the outer peripheral edge of the door FD. As a result, the sealing properties of the door FD against the body 1 can be prevented from being degraded, even if the garnish 21 covers the shielding member 41 in such a manner as enables the same to be let off.

Moreover, in the first embodiment, in the door frame garnish 21 is arranged the door portion 27/35 which covers the housed shielding member 41 but is opened by the push of the shielding member 41 when the shielding member 41 is let off. Therefore, the shielding member 41 before let off can be covered with the garnish door portion 27/35 so that the design of the inner peripheral edge side of the window WF is not degraded. It is quite natural that the shielding member 41 can be smoothly let off while pushing and opening the door portion 27/35.

Moreover, the door portion 35 is so constructed that it opens while breaking the breakable portion 33 of the peripheral edge when the shielding member 41 is let off. Therefore, the door portion 35 can cover the shielding member 41 before let off beautifully, thereby to further prevent the degradation of the design on the side of the inner peripheral edge of the window WF.

Here, the following construction may be made even in case a portion of the folded shielding member 41 is housed and covered with the front vertical edge portion 23 or the upper edge portion 22 excepting the portion of the garnish lower edge portion 25. Specifically, the door portions 27/35 are disposed at the portions of the inner peripheral edge side of the window WF in the edge portions 23/22. Moreover, the shielding member 41 may be so housed between the door portions 27/35 and the door frame front vertical edge portion 14 or the upper edge portion 13 that it is covered with the door portions 27/35.

Moreover, the shielding member 41 of the first embodiment is housed on the side of the lower corner C from the rear vertical edge portion 24 to the lower edge portion 25 of the garnish 21 in the peripheral edge of the window WF on the inner side. Therefore, the shielding member 41 substantially rises from the lower edge portion DW of the peripheral edge of the window WF in a manner that the downward oblique side 41a in the expanded triangular sheet shape rotates clockwise, as viewed from the inner side, on the mounting portion 42 thereby to shield the window WF.

Therefore, even if an occupant leans against the peripheral edge (especially the lower edge portion DW) of the window WF on the inner side, the shielding member 41 is smoothly expanded while raising the occupant from the lower side.

In the occupant restraining device S1 of the first embodiment, moreover, the shielding member 41 is housed in such an inverted L-shape as is composed of the vertical edge side housed portion 45 extending upward from the corner C of the lower portion of the peripheral edge of the door window WF and the lower edge side housed portion 46 extending longitudinally from the corner C. As compared with the case in which the shielding member 41 is to be raised from the entire region of the lower edge portion DW of the peripheral edge of the door window WF, therefore, it is possible to minimize the space for housing the shielding member 41 which is arranged in the peripheral edge of the window WF. As a result, the shielding member 41 can be easily arranged in the door FD having a limited space.

In the first embodiment, the shielding member 41 is housed in the peripheral edge of the window WF of the door FD, and an inflator 81 as the drive source 80 for expanding and moving the shielding member 41 is arranged on the front side of the lower edge portion DW of the peripheral edge of the window WF of the door frame 12. With this arrangement, the inflator 81 is arranged in front of the occupant so that it can minimize the interference with the occupant. Naturally, both the shielding member 41 and the drive source 80 are arranged on the side of the door FD so that the shielding member 41 can be smoothly expanded by the drive source 80 without any complicated structure.

In the first embodiment, the garnish 21 is provided with the lower edge portion 25 for covering the lower edge portion DW of the peripheral edge of the window WF, and the drive source 80 and the connection means 85 of the let-off means 48 are assembled in advance with that lower edge portion 25. The let-off means 48, together with the garnish 21 and the shielding member 41 constructs the occupant restraining unit U0. Merely by mounting the occupant restraining unit U0 on the door frame 12, therefore, the garnish 21, the shielding member 41 and the let-off means 48 can be mounted on the door frame 12. As a result, it is possible to improve the workability of mounting the garnish 21, the shielding member 41 and the let-off means 48 with the door frame 12. Moreover, the garnish 21, the shielding member 41 and the let-off means 48 are assembled in advance integrally into the occupant restraining unit U0. It is, therefore, possible to facilitate the handling or management such as the operations to transport/house the garnish 21, the shielding member 41 and the let-off means 48 before they are mounted on the door frame 12.

Moreover, the garnish 21 of the first embodiment is formed into a two-color molded part composed of: the soft portion 29 near the door portion 27 and the cover portion 32; and the general portion 26. The soft portion 29 is made of a synthetic resin such as a thermoplastic elastomer of polyolefin. The general portion 26 is made of such a synthetic resin of polypropylene as has a compatibility with the thermoplastic elastomer of the door portion 27 or the like and as is harder than the thermoplastic elastomer. Therefore, the garnish 21 can be integrally formed by injection molding not using fixing means such as bolts, thereby to reduce the number of steps of and the cost for manufacturing. Moreover, the door portion 27 and the cover portion 32 of the garnish 21 and their vicinities are made of the thermoplastic elastomer. At the time of letting off the shielding member 41, therefore, the door portion 27 and the cover portion 32 can be smoothly warped and opened to let off the shielding member 41 easily. Moreover, the general portion 26 is made of a harder synthetic resin material than the soft portion 29, so that the strength of the garnish 21 can be retained. In this garnish 21, moreover, the shielding member 41 and the let-off means 48 before actions can be integrally covered with the door portion 27 and the cover portion 32, so that the degradation in the design of the side of the inner peripheral edge of the window WF can be more prevented even if the shielding member 41 and the let-off means 48 are arranged in the peripheral edge of the window WF.

Here, the occupant restraining device S1 of the first embodiment as has been described on the case in which the let-off means 48 of the shielding member 41 is assembled in advance with the garnish 21. However, a shielding member unit U1 may be used as in an occupant restraining device S2 of a second embodiment, as shown in FIGS. 10 to 13. This shielding member unit U1 is prepared by assembling a shielding member 41 and a garnish 21A excepting the let-off means 48.

In this second embodiment, a door trim 40 for covering the inner side of the lower edge portion 16 of the door frame 12 is provided with an upper trim 40a and a lower trim 40b. The upper trim 40a corresponds to the garnish for covering the inner side of the lower edge portion DW of the peripheral edge of the window WF, and covers the upper edge side of the door frame lower edge portion 16. The lower trim 40b covers the lower side of the door frame lower edge portion 16. In the shown embodiment, the upper trim 40a and the lower trim 40b are made separate, but the door trim may be integrally molded of a synthetic resin. In this case, the vicinity of the cover portion 32 is made of a thermoplastic elastomer of polyolefin or the like, and the remaining portion is made of a synthetic resin such as hard polypropylene or the like for retaining the strength. Moreover, the door trim 40 may be made of a two-color molded part of the upper trim 40a and the lower trim 40b having compatibility with each other. Here in the case of the embodiment, the upper trim 40a is made of a thermoplastic elastomer of polyolefin, and the lower trim 40b is made of hard polypropylene.

Figure 10:
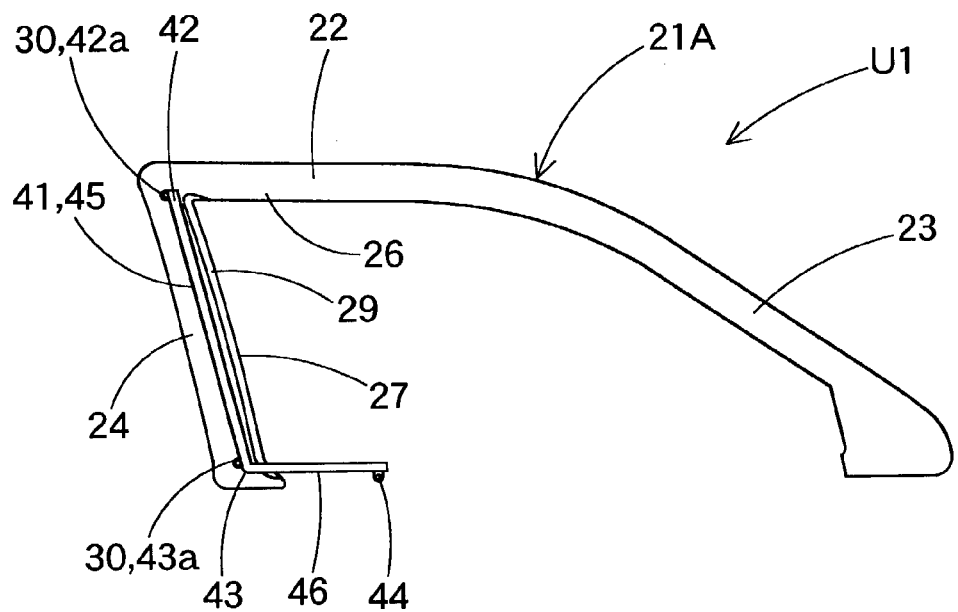
FIG. 10 is a front elevation showing a shielding member unit of a second embodiment as taken from the outer side of the vehicle.
Figure 11:
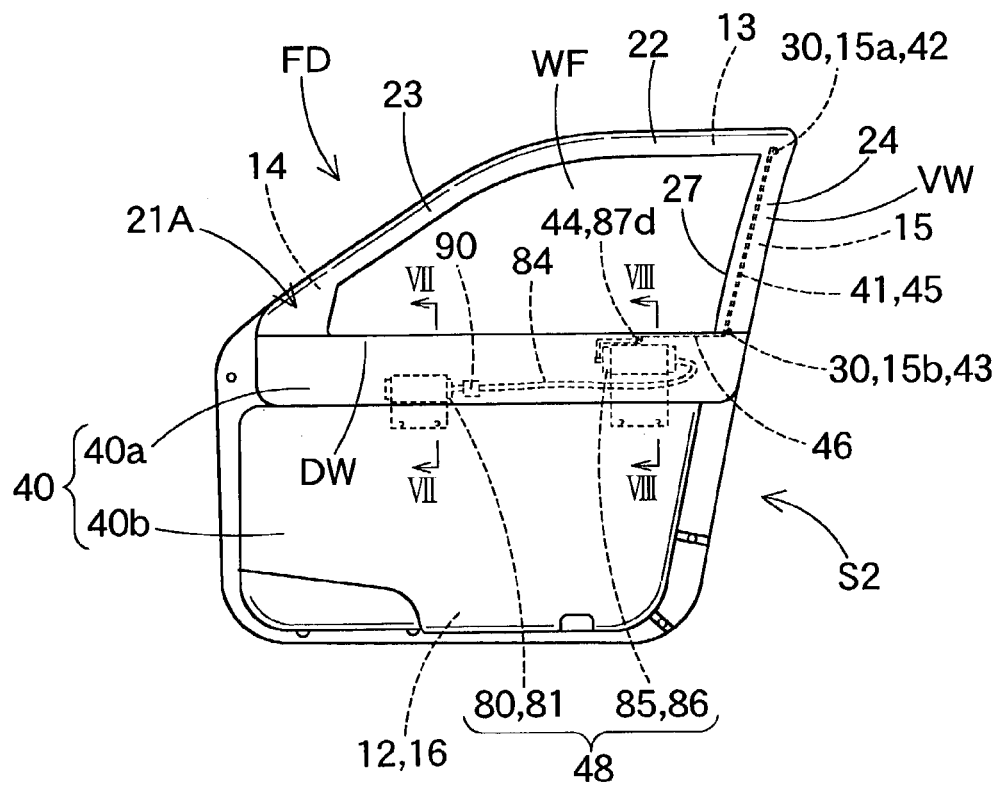
FIG. 11 is a front elevation showing a door of the second embodiment as taken from the inside.
Figure 12:
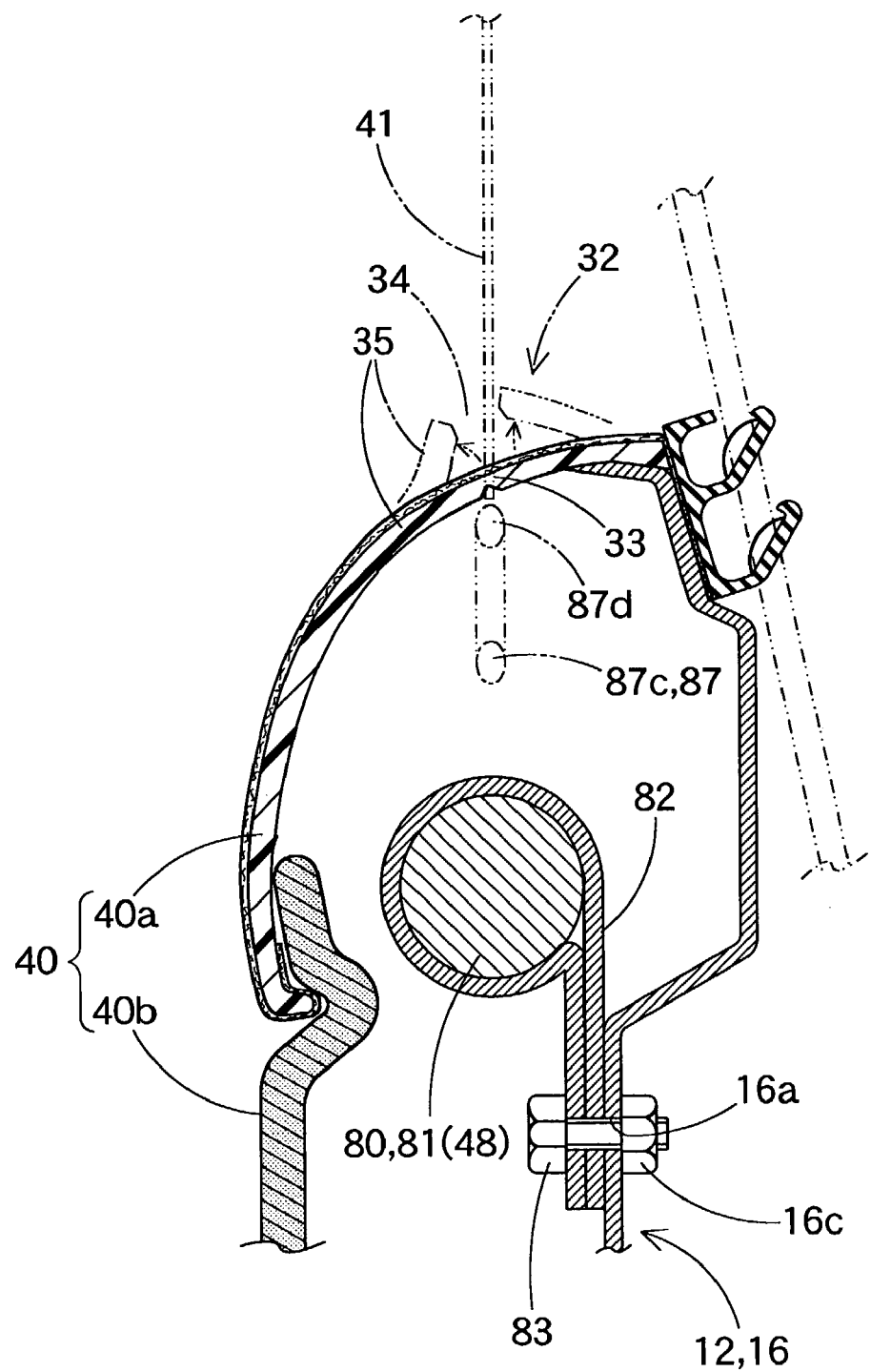
FIG. 12 is a schematic section of a portion XII—XII of FIG. 11.
Figure 13:
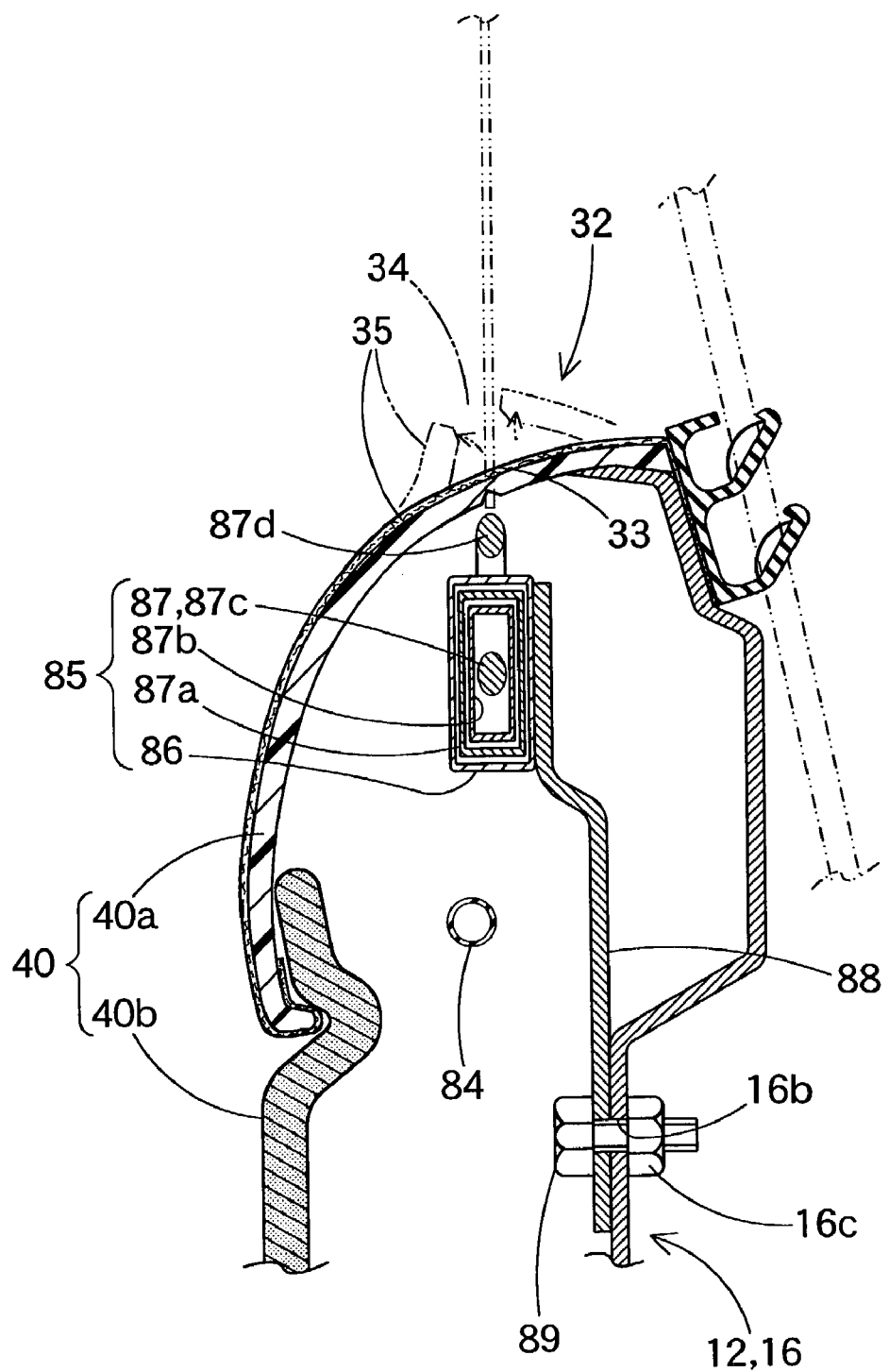
FIG. 13 is a schematic section of a portion XIII—XIII of FIG. 11.

The door frame garnish 21A of the second embodiment is constructed to include the upper edge portion 22, the front vertical edge portion 23 and the rear vertical edge portion 24 excepting the lower edge portion DW of the peripheral edge of the window WF. As in the garnish 21 of the first embodiment, the upper edge portion 22, the front vertical edge portion 23 and the rear vertical edge portion 24 are formed to have such a generally U-shaped section as can fit in the inner sides of the upper edge portion 13, the front vertical edge portion 14 and the rear vertical edge portion 15 in the peripheral edge of the window WF of the door frame 12. In the rear vertical edge portion 24, moreover, there is arranged on the end side of the inner peripheral edge of the window WF the door portion 27 which is pushed and opened by the shielding member 41, as shown in FIGS. 10 and 11, when the folded shielding member 41 is to be expanded. The door portion 27 is provided on the inner side end portion with a thin hinge portion 28 (not shown) such that the door portion 27 may be easily opened. Moreover, the vertical edge side housed portion 45 on the side of the garnish rear vertical edge portion 24 in the folded shielding member 41 is housed between the door portion 27 and the rear vertical edge portion 15 of the door frame 21 while being covered on its front side with the door portion 27 of the inner peripheral edge side of the window WF (as referred to FIG. 6).

Like the garnish 21, moreover, the garnish 21A is formed of the integral two-color molded part which is made of a synthetic resin such as a thermoplastic elastomer of polyolefin and is constructed of the general portion (or the hard portion) 26 and the soft portion 29. The soft portion 29 is a portion to construct the vicinity of the door portion 27. The general portion 26 is a portion excepting the soft portion 29. This soft portion 29 is made of a thermoplastic elastomer of polyolefin such that the door portion 27 may be easily opened at the time of expansion of the shielding member 41. The general portion 26 is made of such a hard polypropylene or the like as has a compatibility with the material molding the soft portion 29 and as can retain the strength. In this garnish 21A, too, the soft portion 29 is molded after the hard portion (or the general portion) 26 was molded. Here in the garnish 21, the hard portion (or the general portion) 26 may be molded after the soft portion 29 was molded.

The shielding member unit U1 is constructed of the garnish 21A and the shielding member 41. For assembly of the shielding member unit U1, the shielding member 41 in the flatly expanded state is folded at first in such a bellows shape that the front mounting portion 44 may approach the side of the mounting portions 42/43 on the back side. Then, the shielding member 41 thus folded is then wrapped with a plurality of not-shown breakable tape members for preventing the shielding member 41 from collapsing. The shielding member unit U1 can be prepared by inserting the retaining pins 30 into the mounting holes 42a/43a to mount the individual mounting portions 42/43 of the shielding member 41 on the outer side of the garnish rear vertical edge portion 24.

Then, the retaining pins 30/30 are fitted in the mounting holes 15a/15b of the door frame 12. When the garnish 21A is fixed on the door frame 12 by using bolts or the like at not-shown portions while the upper edge portion 22, the front vertical edge portion 23 and the rear vertical edge portion 24 of the garnish 21A being fitted in the upper edge portion 13, the front vertical edge portion 14 and the rear vertical edge portion 15 of the door frame 12, then the shielding member unit U1 can be assembled with the door frame 12.

After this, the inflator 81 and the cylinder 86 are fixed on the door frame 12 by screwing the individual mounting bolts 83/89 into the mounting holes 16a/16b to fix the individual mounting brackets 82/89 on the door frame lower edge portion 16. When the upper trim 40a and the lower trim 40b of the door trim 40 are then mounted on the door frame lower edge portion 16, the assembly of the door FD can be completed. Subsequent mounting on the vehicle and its action are similar to those of the first embodiment.

In this second embodiment, the shielding member unit U1 is constructed by assembling the garnish 21A and the shielding member 41 in advance. Merely by mounting the shielding member unit U1 on the door frame 12, therefore, the garnish 21A and the shielding member 41 can be mounted on the door frame 12. As a result, it is possible to improve the workability of assembling the garnish 21A and the shielding member 41 with the door frame 12. Moreover, the garnish 21A and the shielding member 41 are assembled in advance and integrated as the shielding member unit U1. It is, therefore, possible to facilitate the handling or management such as operations to transport/house the garnish 21A and the shielding member 41 before they are mounted on the door frame 12.

In the second embodiment, too, the garnish 21A is formed into a two-color molded part composed of the soft portion 29 near the door portion 27 and the general portion 26. The soft portion 29 is made of a thermoplastic elastomer of polyolefins. The general portion 26 is made of such a synthetic resin of polypropylene or the like as has a compatibility with the thermoplastic elastomer of the soft portion 29 and is harder than the thermoplastic elastomer. Therefore, the garnish 21A can be integrally formed not using the fixing means such as bolts but by injection molding, thereby to reduce the number of steps of and the cost for manufacturing itself. Moreover, the soft portion 29 of the garnish 21A is made of thermoplastic elastomer. At the time of letting off the shielding member 41, therefore, the door portion 27 can be smoothly warped and opened to let off the shielding member 41 easily. Moreover, the general portion 26 is made of a harder synthetic resin material than the soft portion 29 near the door portion 27 so that the strength of the garnish 21A can be retained.

Although the second embodiment is not directed to the occupant restraining unit U0, other working-effects can be attained as in the first embodiment. Especially in the shielding member unit U1 of the second embodiment, not the let-off means 48 but only the shielding member 41 is assembled with the garnish 21A. Therefore, the unit U1 can be so light that it can be conveniently handled. In case the inflator 81 or the later-described pretensioner 70 as a drive source for the let-off means 48 is to be changed, moreover, this change can be easily made without any modification in the garnish 21A and so on of the unit U1.

Here in the first and second embodiments, the inflator 81 as a drive source 80 for the let-off means 48 for expanding the shielding member 41 may be exemplified by those employing gas pressure of: the type in which a combustion gas is produced by an ignition; the type in which a compressed gas is discharged; or their mixed type. The construction may be modified such that the shielding member 41 is expanded by electric/mechanical means, such as a pretensioner as a drive source. This pretensioner can be exemplified by those using gas pressure of the inflator, an electric motor, the restoring force of a spring, an electromagnetic solenoid and so on.

In order to guide the expansion of the shielding member 41, still moreover, a guide rail or the like can be used. In this case, a cam follower to be guided by the guide rail or the like may be mounted on the side of the shielding member 41.

An occupant restraining device S3 of the third embodiment is constructed, as shown in FIGS. 14, 15, 18 and 21, to include a shielding member 41 (41F/41R) which is so let off the peripheral edge of a window WF/WR as to shield the inner side of the window WF/WR. On a vehicle having the occupant restraining device S3, there is also mounted an airbag device ABM. This airbag device ABM is provided with the airbag 51 (51F/51R) which is to be so inflated from the peripheral edge of the window WF/WR as to be interposed between the shielding member 41 and the occupant.

Here in the third embodiment, the description of the portions similar to those of the first and second embodiments will be partially omitted by designating them by the common reference numerals.

The shielding member 41 is activated by the pretensioner 70 acting as the let-off means 48, and the airbag 51 is expanded/inflated by an inflating gas from the inflator 58. The pretensioner 70 and the inflator 58 are operationally controlled by the control device 64. As in the first embodiment, the control device 64 activates the pretensioner 70 and the inflator 58 in response to the predetermined signal from the rollover sensor 62.

In the vehicle of the third embodiment, moreover, the window WF/WR is arranged individually in the front door FD and the rear door RD, and the shielding member 41F is arranged in the front door FD whereas the shielding member 41R is arranged in the rear door RD. Moreover, the airbag 51F is arranged at the roof side rail portion RR on the side of the body 1 and in the peripheral edge of the window WF from the upper side of the front door FD to the upper side of a center pillar portion CP, and the airbag 51R is arranged at the roof side rail portion RR on the side of the body 1 and in the peripheral edge of the window WR from the upper side of the rear door RD to the upper side of the rear pillar portion RP.

Figure 15:
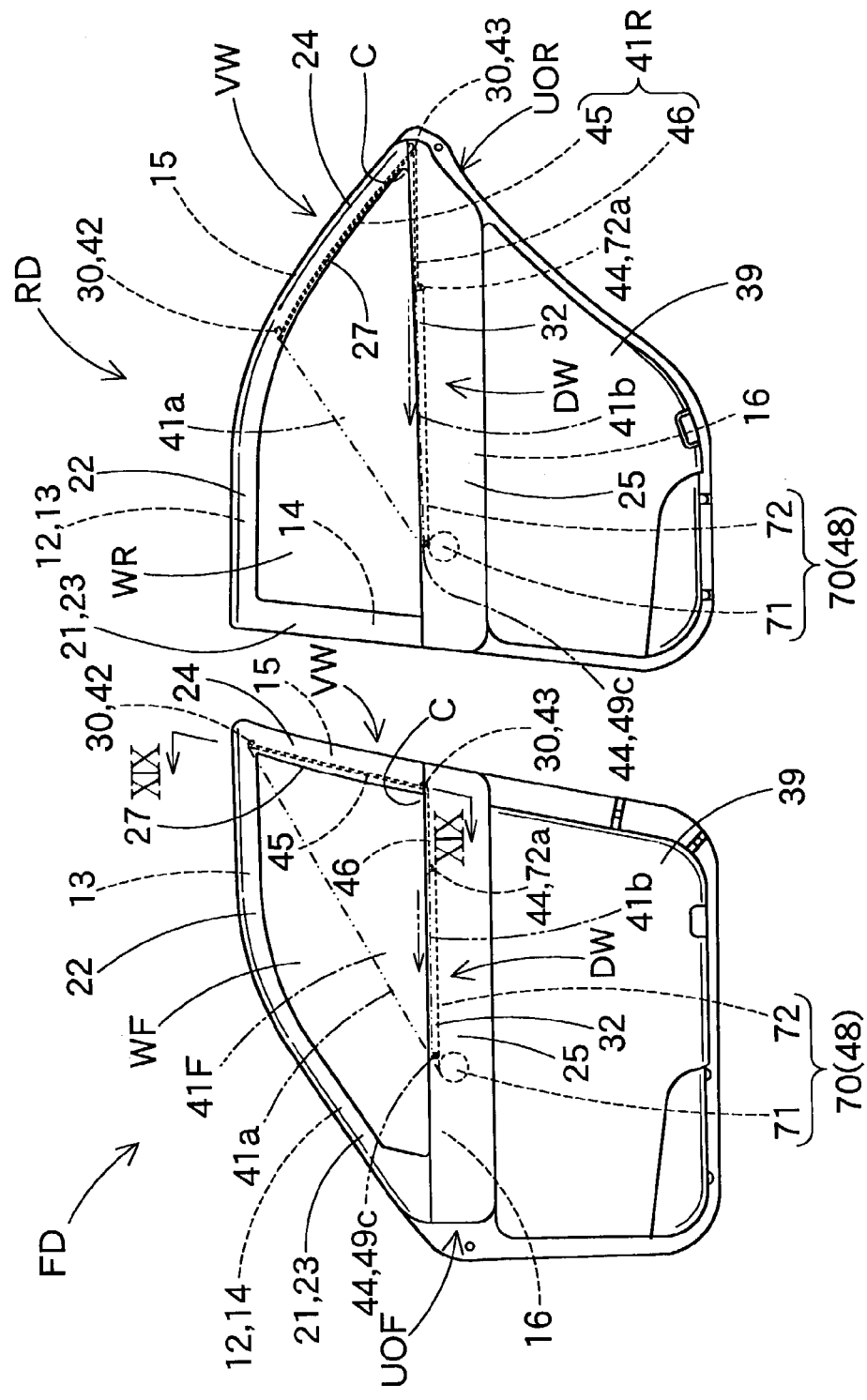
FIG. 15 is a front elevation showing a door of the third embodiment as taken from the inner side.

The front door FD and the rear door RD are made to have substantially identical constructions excepting the shapes of the openings and the peripheral edges of the windows WF/WR, as shown in FIG. 15. The door FD/RD is constructed to include: the door frame 12 on the outer side; a door frame garnish 21 on the peripheral edge of the window WF/WR of the door frame 12 on the inner side; and the door trim 39 arranged below the garnish 21 of the door frame 12 on the inner side.

Each door frame 12 is made of a sheet metal and is constructed, as in the first embodiment, to include the upper edge portion 13, the front/rear vertical edge portions 14/15 and the lower edge portion 16 arranged on the peripheral edge of the window WF/WR. Near the upper/lower end portions of the rear vertical edge portion 15, there are formed mounting holes 15a/15b for mounting the individual shielding members 41F/41R (as referred to FIG. 19).

In each door frame garnish 21, the door portion 27, the cover portion 32 and their vicinities are made of the soft portion 29 of thermoplastic elastomer of polyolefin, and the remaining portions are made of the general portion 26 of polypropylene. Like the first embodiment, each of the garnishes 21 is provided with the upper edge portion 22, the front/rear vertical edge portions 23/24 and the lower edge portion 25, which are arranged on the peripheral edge around the window WF/WR. The upper edge portion 22, the front vertical edge portion 23 and the rear vertical edge portion 24 are formed to have such a generally U-shaped section as can be fitted on the inner side of the upper edge portion 13, the front vertical edge portion 14 and the rear vertical edge portion 15 of the door frame 12 (as referred to FIG. 16).

Figure 16:
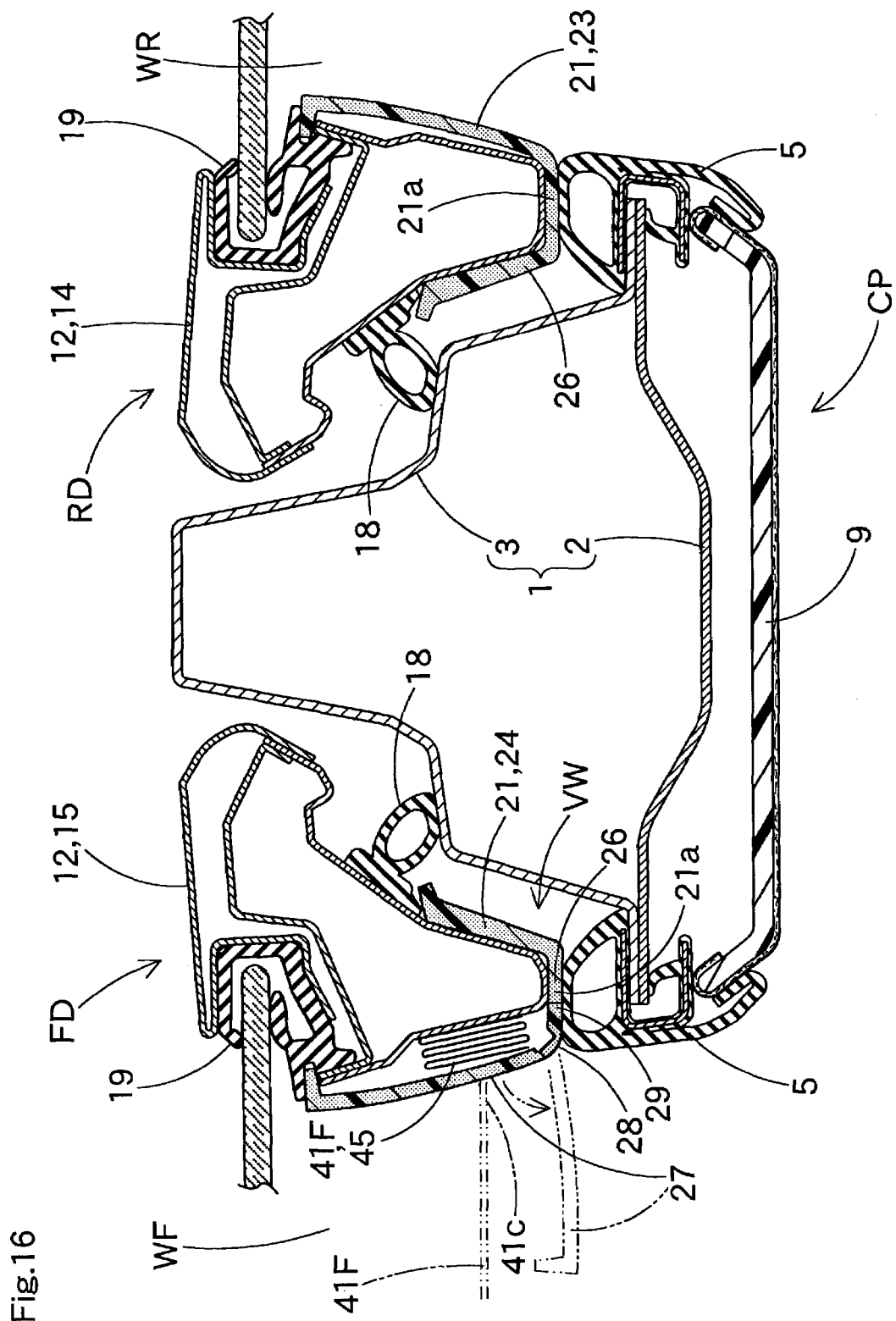
FIG. 16 is a schematic section of a portion XVI—XVI of FIG. 14.
Figure 17:
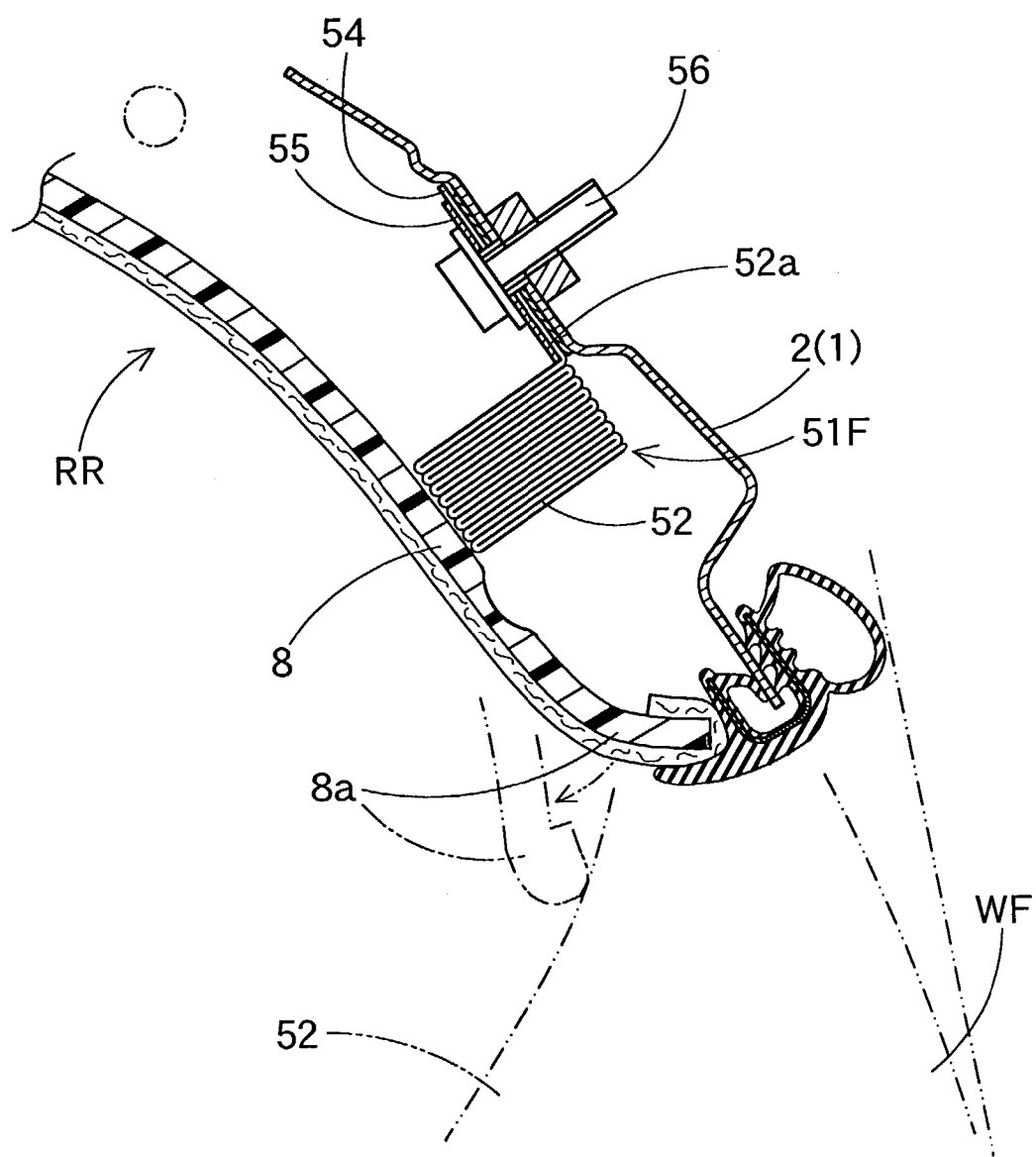
FIG. 17 is a schematic section of a portion XVII—XVII of FIG. 14.
Figure 19:
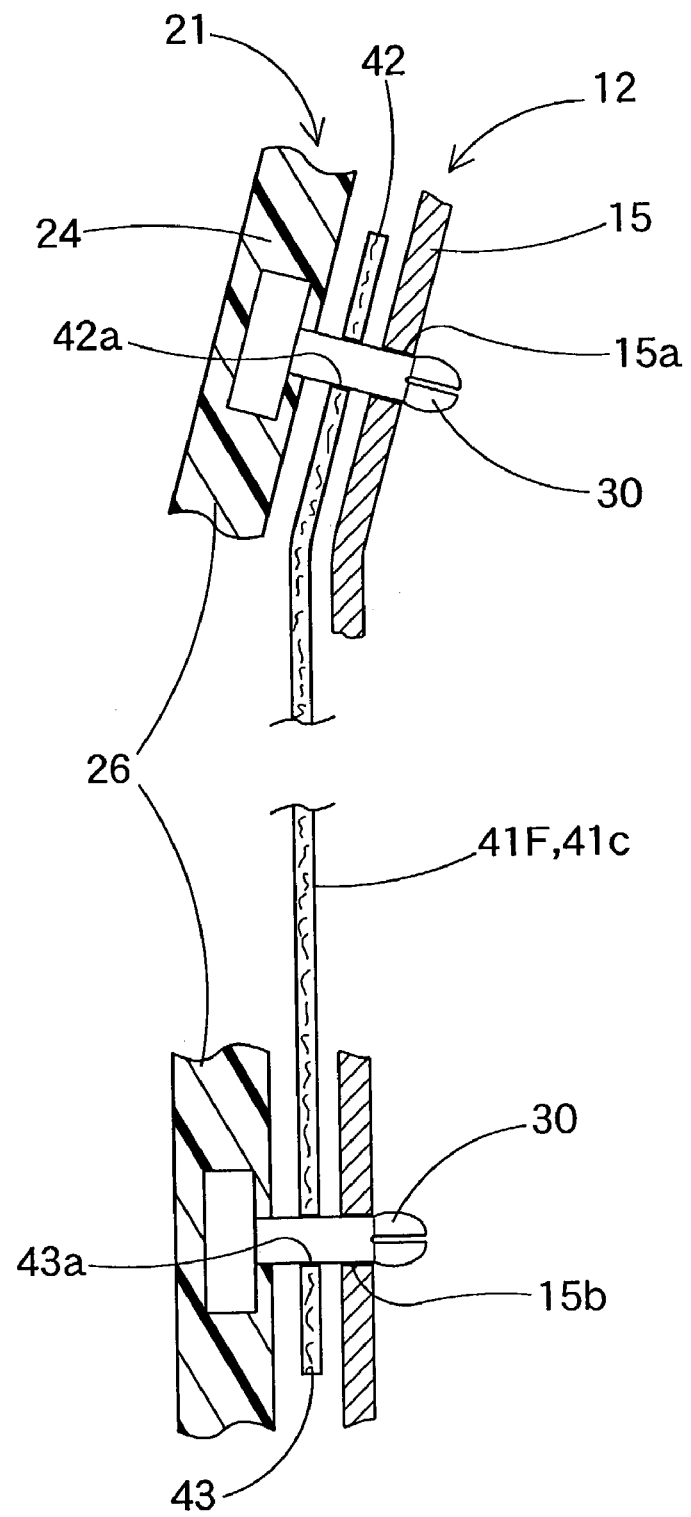
FIG. 19 is a schematic section of a portion XIX—XIX of FIG. 15.

In the rear vertical edge portion 24 covering the housed shielding member 41F/41R, as in the first embodiment, there are buried the retaining pins 30 which are made of a metal (as referred to FIG. 19). In the rear vertical edge portion 24 of each garnish 21, moreover, there is arranged the door portion 27 which is pushed and opened by the shielding member 41F/41R when this shielding member 41 is let off, as shown in FIG. 16. The door portion 27 is provided with the thin hinge portion 28 at the end portion on the inner side. Moreover, the vertical edge side housed portion 45 in the housed shielding member 41 is so housed between the door portion 27 and the rear vertical edge portion 15 of the door frame 12 as is covered on its front side with the door portion 27.

Figure 18:
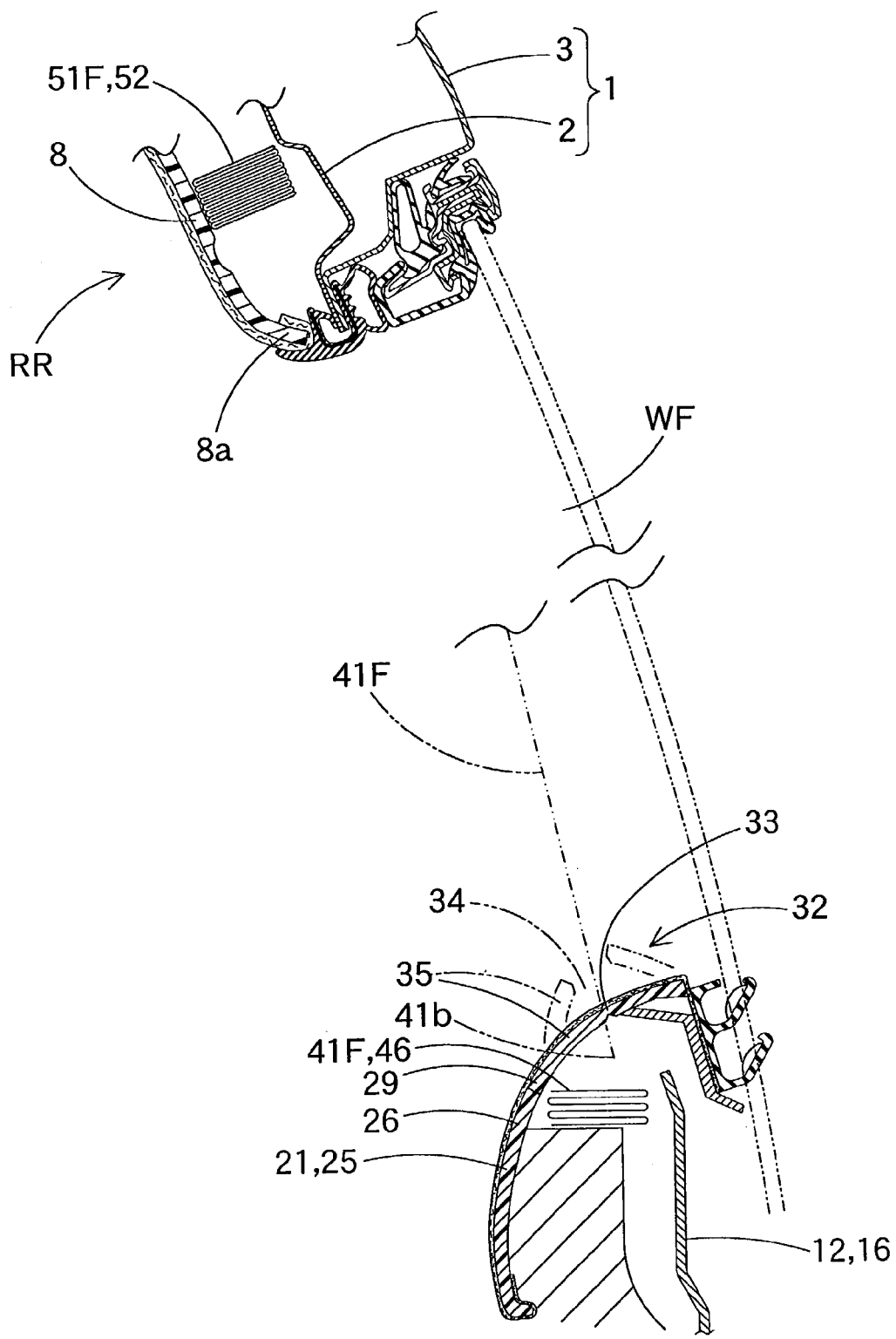
FIG. 18 is a schematic section of a portion XVIII—XVIII of FIG. 14.

On the upper edge side of the lower edge portion 25 of the garnish 21, as in the first embodiment, as shown in FIG. 18, there is arranged the cover portion 32 which is provided with the thin portion 33 to be broken. The cover portion 32 covers over not only the lower edge side housed portion 46 of the housed shielding member 41 but also the track of the moving tension member leading end 72a of the pretensioner 70. As the tension member leading end 72a moves forward, (as referred to FIGS. 14 and 15), the portion 33 to be broken is so broken by the shielding member 41 as to open the door portion 35 thereby to form the opening 34. In this opening 34, there is arranged the lower edge portion 41b of the expanded shielding member 41.

Figure 20:
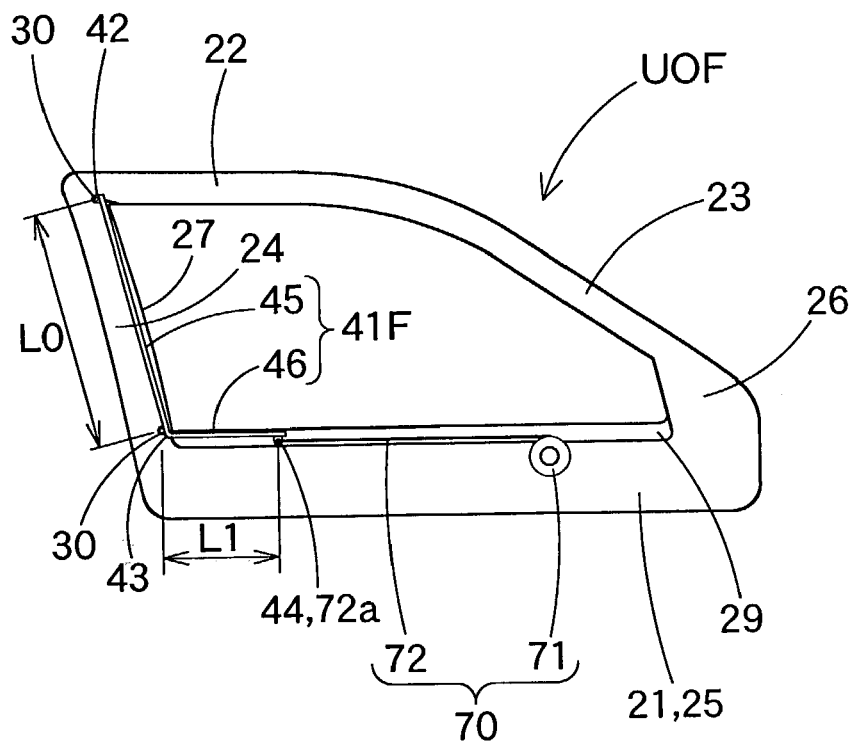
FIG. 20 presents front elevations showing an occupant restraining unit of the third embodiment as taken from the outside.
Figure 20:
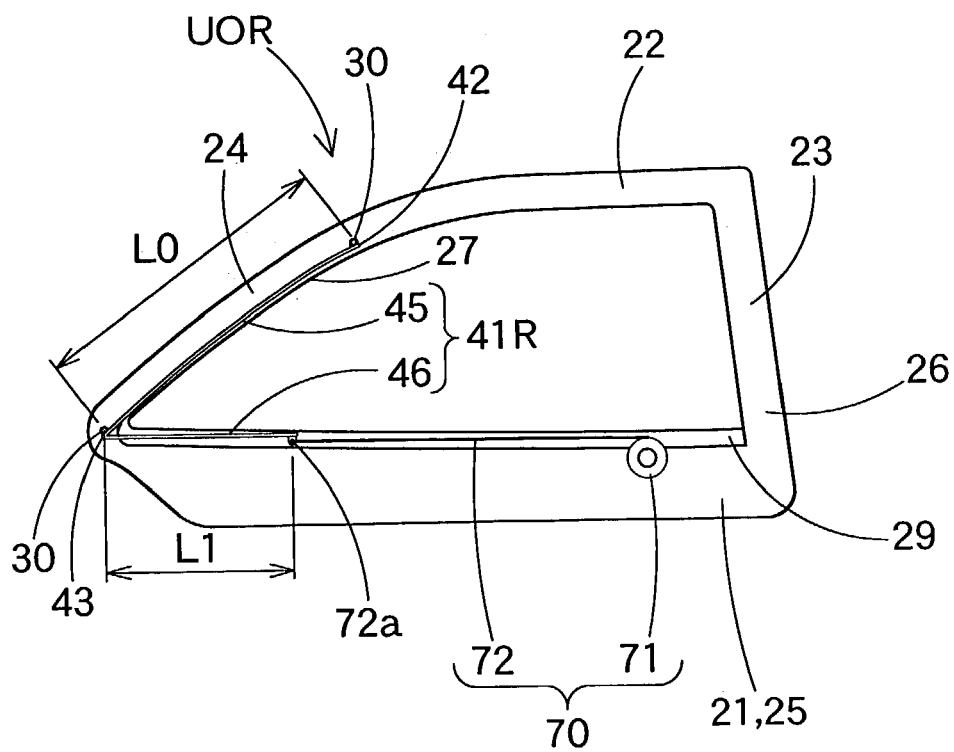

On the outer side face of the garnish lower edge portion 25, moreover, there is mounted the body 71 of the pretensioner 70 (as referred to FIG. 20).

On the other hand, the side of the body 1 of the peripheral edge of the door FD/RD is constructed of the inner panel 2 and the outer panel 3, as shown in FIG. 16. There is also arranged the weather strip 5. This weather strip 5 is forced, when the door FD/RD is closed, to contact with the apex portion 21a of the garnish 21 protruding to the inner side and with the front edge, the lower edge and the rear edge of the lower portion of the door FD/RD apart from the garnish 21. The apex portion 21a protruding to the inner side of the garnish 21 is arranged, as in the first embodiment, at the upper edge portion 22, the front vertical edge portion 23 and the rear vertical edge portion 24.

Figure 14:
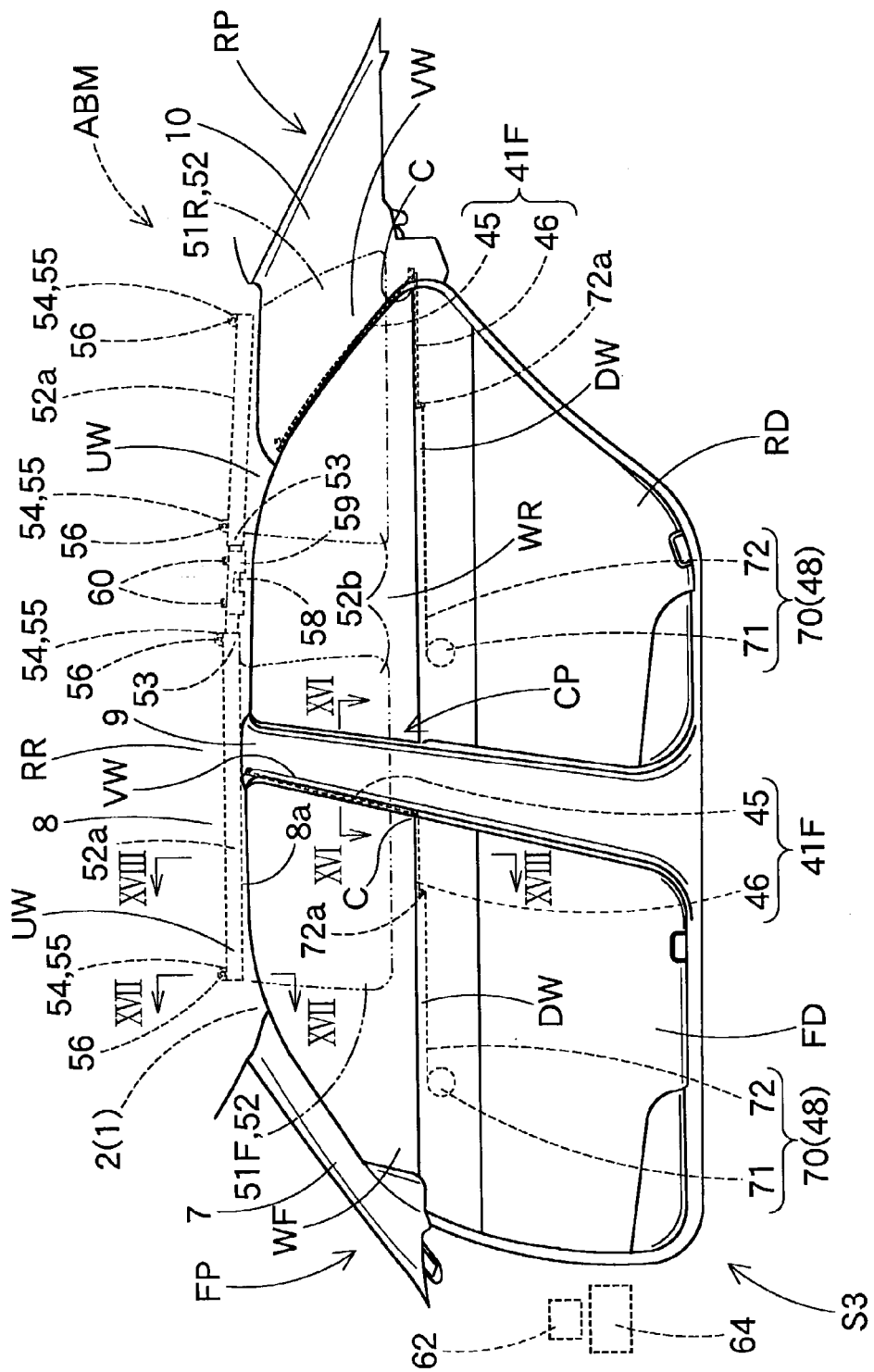
FIG. 14 is a front elevation showing an occupant restraining device of a third embodiment, as taken from the inside of a vehicle.

As shown in FIGS. 14 and 15, moreover, each shielding member 41(41F/41R) is formed of a cloth of flexible polyester or polyamide yarns to shield the window WF/WR. Most of the shielding member 41F, as designated by numeral 45, is housed in the vertical edge portion VW of the peripheral edge of the window WF, which is arranged generally vertically on the rear side. Most of the shielding member 41R, as designated by numeral 45, is also housed in the vertical edge portion VW of the peripheral edge of the window WR, which is arranged generally vertically on the rear side.

In the case of the third embodiment, the window WF/WR are opened in the front/rear door FD/RD. The shielding member 41F/41R is folded and housed between the rear vertical edge portion 15 of the door frame 12 and the rear vertical edge portion 24 of the door frame garnish 21 in the peripheral edge of the window WF/WR of the door FD/RD, respectively, and its excess portion 46 is folded and housed between the lower edge portion 16 of the door frame 12 and the lower edge portion 25 of the door frame garnish 21, as located at the lower edge portion DW of the peripheral edge of the window WF/WR.

Moreover, each of the shielding member 41F/41R is formed to take such a generally triangular sheet shape at the time of let-off completion as has apexes 42/43 at the upper and lower portions of the vertical edge portion VW on the housed side and an apex 44 at the leading end portion extending along the lower edge of the peripheral edge of the window WF/WR. Moreover, the upper/lower apex portions 42/43 are fixed at the rear vertical edge portion 15 of the door frame 12 in the vertical edge portion VW, and the apex portion 44 on the leading end side is connected to a tension member 72 of the pretensioner 70. The upper/lower apex portions 42/43 are constructed to include mounting holes 42a/43a. The upper/lower apex portions 42/43 are fixed on the door frame 12 by retaining the retaining pins 30 buried in the garnish 21, through the mounting holes 42a/43a, in the mounting holes 15a/15b to mount on the rear vertical edge portion 15 of the door frame 12. Each of the leading end apex portions 44 is connected to the leading end 72a of the tension member 72 of the pretensioner 70.

Figure 23:
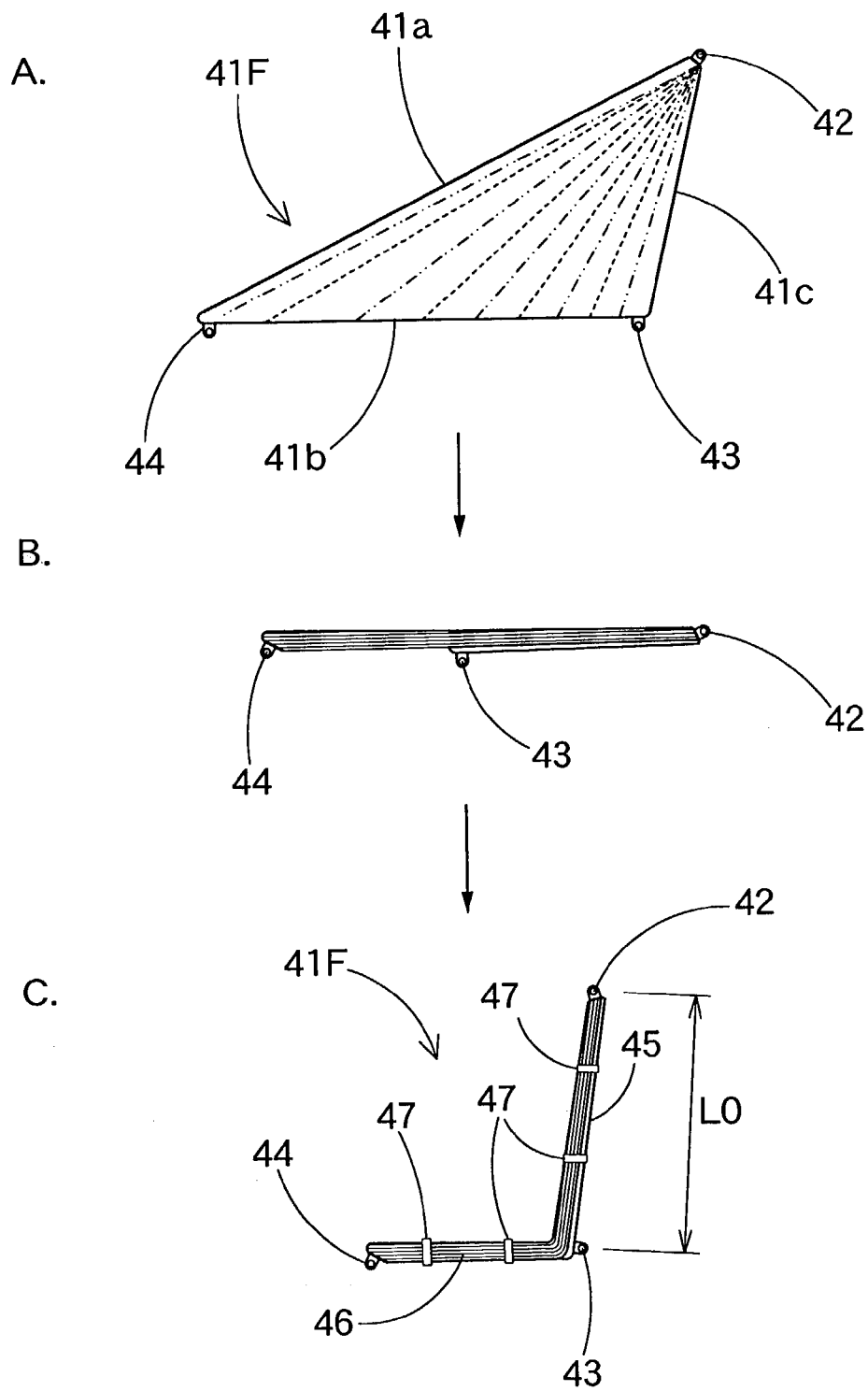
FIG. 23 diagrams steps of folding a shielding member on the side of a front door in the third embodiment.
Figure 24:
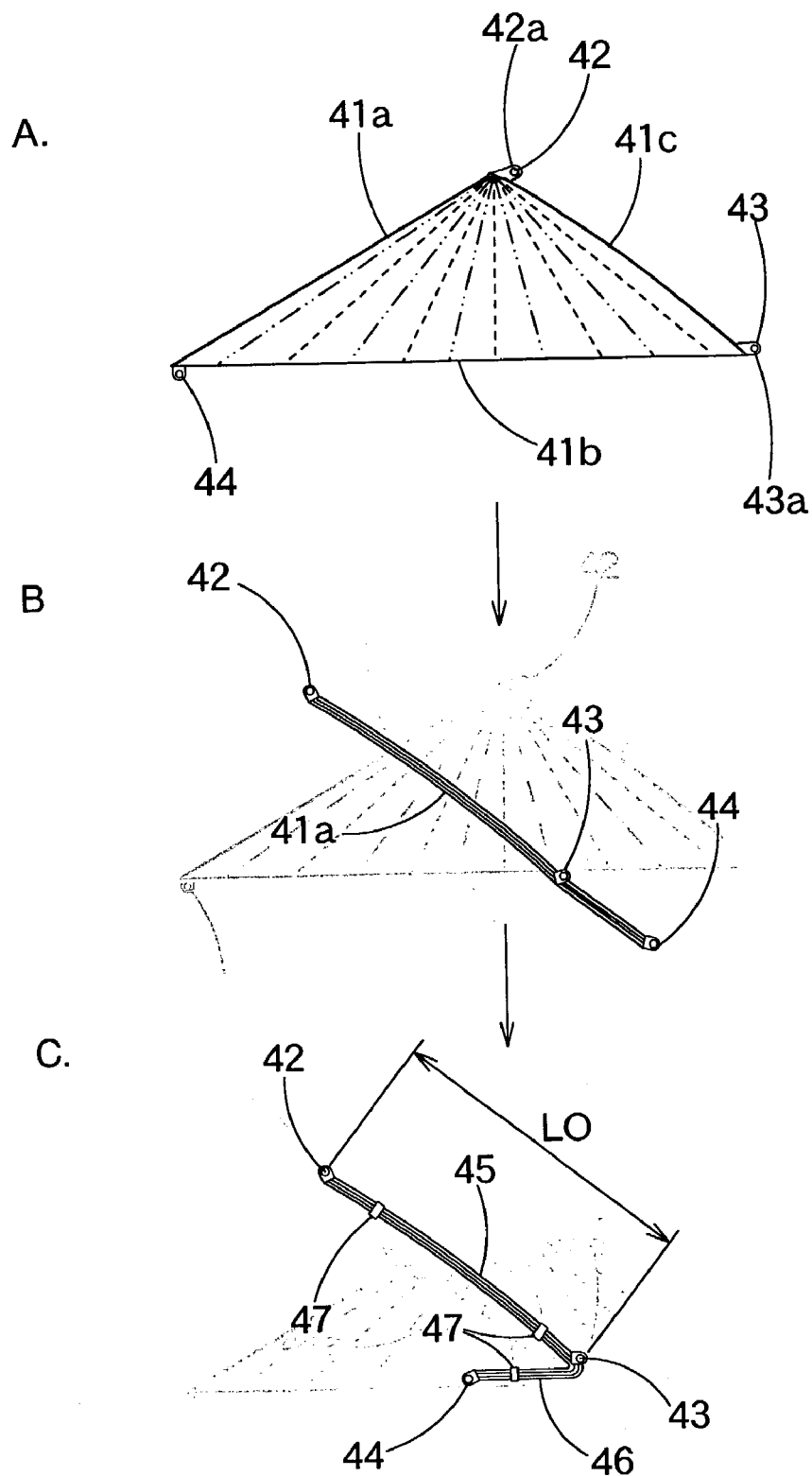
FIG. 24 diagrams steps of folding a shielding member on the side of a rear door in the third embodiment.

As shown in FIG. 15, moreover, the shielding member 41F/41R is housed in such an inverted-L shape, as has the vertical edge side housed portion 45 and the lower edge side housed portion 46 across the corner C on the lower rear side of the window WF/WR. This shielding member 41F/41R is folded, as shown in FIGS. 23 and 24, in a folding-fan shape having the upper apex portion 42 of the shielding member 41F/41R in the flatly expanded state as the fan's center, in which the folding width is wider on the side of the lower edge portion 41b than on the side of the upper apex portion 42.

In the third embodiment, too, the lower edge side housed portion 46 of each shielding member 41 in the housed state is not housed in its whole longitudinal length of the garnish lower edge portion 25 but in about one third to one fifth portion of the entire length of the lower edge portion 25, and the portion 46 is closer to the side of the garnish rear vertical edge portion 24.

The pretensioner 70 as the let-off means 48 of each shielding member 41F/41R is constructed to include a body 71 as the drive source and a flexible tension member 72 as the connection means. The body 71 is enabled to pull the tension member 72 extending from the body 71 instantly, by using a gas pressure of the inflator, an electric motor, restoring force of spring, an electromagnetic solenoid and so on. In the case of the third embodiment, the body 71 is mounted in advance together with each shielding member 41F/41R on the outer side face of the garnish 21 of each door FD/RD.

Figure 21:
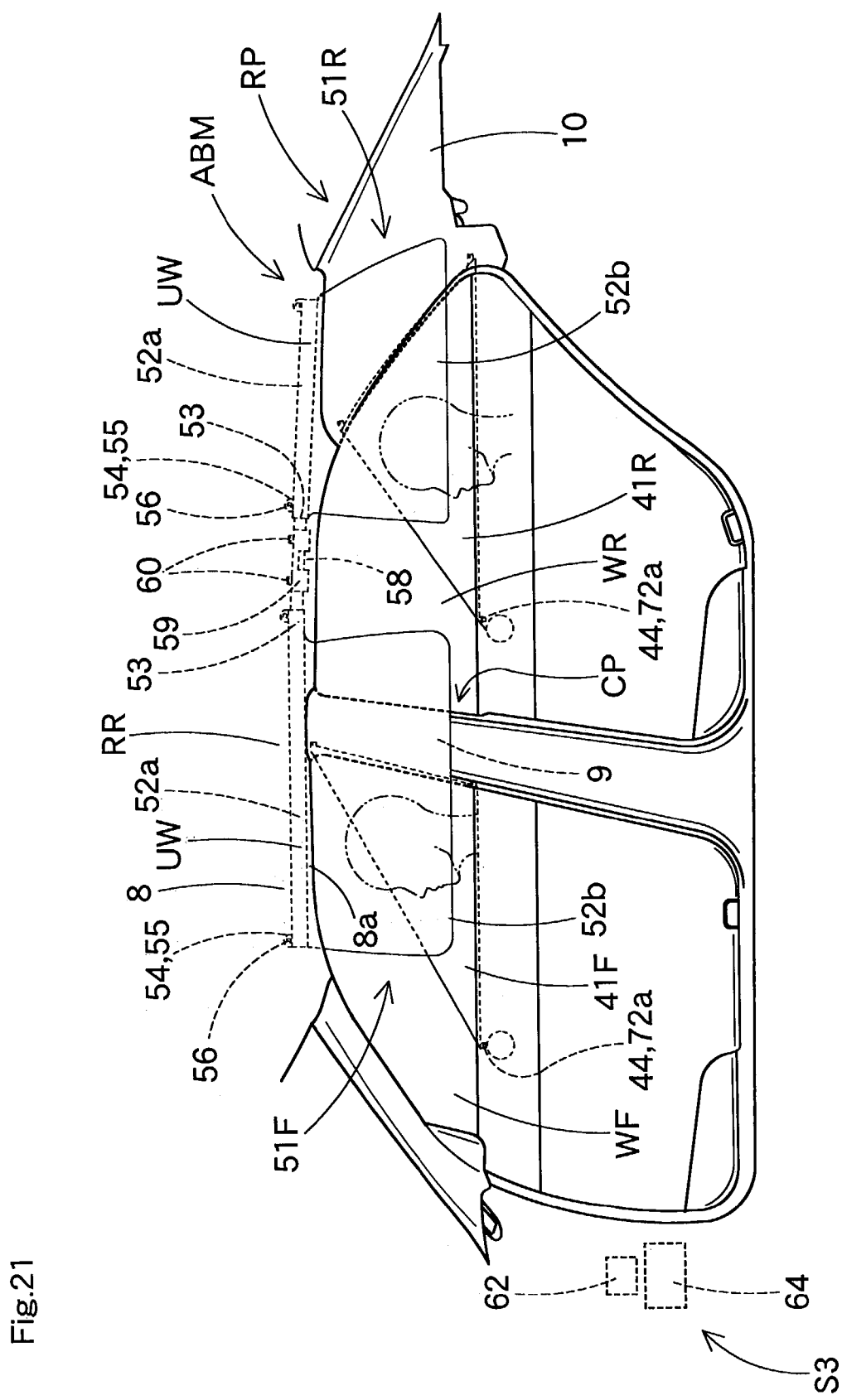
FIG. 21 is a front elevation showing the action time of the occupant restraining device of the third embodiment as taken from the inner side.

As shown in FIGS. 14 and 21, the airbags 51F/51R are made separate and independent of each other in a bag shape which is to be inflated with an inflating gas from the inflator 58. Each airbag 51F/51R is provided, as in the first embodiment, with the body portion 52 of a generally rectangular sheet shape, the gas inlet portion 53 and the mounting portions 54. By using the mounting bracket 55 and the bolts 56, moreover, each of the mounting portions 54 is fixed on the inner panel 2 on the side of the body 1 so that each airbag 51F/51R is arranged at the roof side rail portion RR on the side of the body 1.

In the airbag 51F/51R, like the first embodiment, only the side of the upper end 52a of the body portion 52 at the expanded and inflated time is fixed on the inner panel 2 by using the mounting portions 54. In the airbag 51F/51R, more specifically, the side of the lower end 52b of the body portion being expanded and inflated is left as free end so that it can swing to the inner or outer direction generally perpendicular to the window WF/WR.

Moreover, the airbag 51F/51R is folded in a bellows shape from the side of the lower end 52b to the side of the upper end 52a, and is housed in an upper edge portion UW in the peripheral edge of the window WF/WR. The housed airbag 51F/51R is covered with the roof head lining 8 on the inner side of the roof side rail portion RR. The roof head lining 8 is made of a synthetic resin and is provided at its lower edge with the door portion 8a which can be opened to the inner side. At the time of expansion/inflation, the airbag 51F/51R pushes and opens the door portion 8a and protrudes downward so that it is interposed between the occupant and the shielding member 41F/41R.

At the time of expansion/inflation, the airbag 51F covers the inner side of the rear portion of the window WF, the upper side of the center pillar garnish 9 on the inner side of the center pillar portion CP, and the inner side of the front portion of the window WR. The airbag 51R covers the inner side of the rear portion of the window WR and the front side of the rear pillar garnish 10 on the inner side of the rear pillar portion RP.

In the case of the third embodiment, moreover, the airbag 51F/51R is arranged such that the substantially entire length of the lower end 52b thereof excepting the portion of the pillar portion CP/RP horizontally overlaps the shielding member 41F/41R at the time of let-off completion (as referred to FIG. 21), at the time of completion of the expansion/inflation.

The inflator 58 for inflating the airbag 51F/51R is of a cylinder type and is mounted on the inner panel 2 of the roof side rail portion RR by using the mounting bracket 59 and the mounting bolts 60. The inflator 58 is of a dual type for expanding and inflating the airbag 51F on the front side with the inflating gas discharged from its front end side and the airbag 51R on the rear side with the inflating gas discharged from its rear side.

Here will be described how to mount the occupant restraining device S3 of the third embodiment on the vehicle. First of all, an occupant restraining unit U0F/U0R is assembled, as shown in FIG. 20. The occupant restraining unit U0F/U0R is constructed to include the shielding member 41F/41R, the garnish 21 and the pretensioner 70. These members are integrated to improve the workability of assembling themselves on the door frame 12.

In the operation to assemble the occupant restraining unit U0F/U0R, the shielding member 41 in the flatly expanded state is folded in a folding-fan shape on the upper apex portion 42 so that the folding width is larger on the side of the lower edge portion 41b than on the side of the upper apex portion 42, bringing the leading end apex portion 44 closer to the lower apex portion 43, as shown in FIGS. 23A/23B and 24A/24B. Next, the shielding member 41 thus folded is wrapped with a plurality of breakable tape members 47 for preventing it from collapsing, as shown in FIGS. 23C/24C. In this folded state, the folded portion from the upper apex portion 42 to the lower apex portion 43 provides the vertical edge side housed portion 45 to be housed between the rear vertical edge portion 15 of the door frame 12 and the rear vertical edge portion 24 of the door frame garnish 21. On the other hand, the folded portion from the lower apex portion 43 to the leading end apex portion 44 provides the lower edge side housed portion 46 to be housed between the lower edge portion 16 of the door frame 12 and the lower edge portion 25 of the door frame garnish 21. Moreover, the pretensioner 70 is mounted on the face of the outer side of the garnish 21. Here, the leading end apex portion 44 is so exposed at the leading end position as to facilitate the connection to the tension member leading end 72a of the later-described pretensioner 70 in the completely folded state.

Then, the retaining pins 30 are inserted into the mounting holes 42a/43a to mount the upper/lower apex portions 42/43 of the shielding member 41 on the outer side of the garnish rear vertical edge portion 24. Then, the occupant restraining unit U0F/U0R can be assembled by connecting the leading end apex portion 44 of the shielding member 41 to the leading end 72a of the tension member 72 of the pretensioner 70.

In the occupant restraining units U0F/U0R thus assembled, the retaining pins 30/30 are fitted in the mounting holes 15a/15b of the door frame 12. Moreover, the garnish 21 is fixed on the door frame 12 of each door FD/RD by using bolts properly at not-shown portions while the upper edge portion 22, the front vertical edge portion 23 and the rear vertical edge portion 24 of the garnish 21 being fitted on the upper edge portion 13, the front vertical edge portion 14 and the rear vertical edge portion 15 of the door frame 12. Thus, the occupant restraining unit U0F/U0R can be assembled with a predetermined door frame 12. After this, the assembly of the door FD/RD can be completed if each door trim 39 is mounted on the lower portion of the door frame lower edge portion 16. When the door FD/RD is then mounted on the body 1, the occupant restraining device S3 can be mounted on the vehicle.

Here will be described how to mount the airbag device ABM on the vehicle. First of all, each airbag 51F/51R is folded up toward the side of the upper end 52a, and is wrapped with a not-shown breakable tape member so that it may not collapse. Then, the mounting bracket 55 is mounted on each mounting portion 54 of the airbag 51F/51R. Moreover, each gas inlet portion 53 is connected to the inflator 58, and the mounting bracket 59 is mounted on the inflator 58 to form the airbag assembly. After this, the airbag device ABM can be mounted on the vehicle by mounting the mounting brackets 55 and 59 on the inner panel 2 by means of the bolts 56/60 and mounting the roof head lining 8 on the inner panel 2. Then, the shielding member 41F/41R, the pretensioner 70, the airbag 51F/51R and the inflator 58 are mounted on the vehicle. Thus, the occupant restraining device S3 and the airbag device ABM can be mounted on the vehicle.

Here, the control device 64 and the rollover sensor 62 are separately mounted on predetermined positions of the vehicle. When the occupant restraining device S3 is mounted on the vehicle, not-shown lead wires extending from the pretensioner 70 and the inflator 58 are connected with the control device 64.

After the occupant restraining device S3 was mounted on the vehicle, moreover, the control device 64 activates each pretensioner 70 in response to the rollover detection signal from the rollover sensor 62. Then, the pretensioner 70 pulls the leading end 72a of the tension member 72 forward. In each shielding member 41F/41R, therefore, the leading end apex portion 44 moves forward from the folded state, as shown by double-dotted lines in FIGS. 15, 16 and 18 and by solid lines in FIG. 21. Then, each shielding member 41F/41R pushes-and opens the door portion 27 of the garnish rear vertical edge portion 24 and opens the portion 33 to be broken of the garnish lower edge portion 25, so that it is expanded to shield the window WF/WR.

At this time, the control device 64 activates the inflator 58 of the airbag device ABM to discharge the inflating gas. Therefore, each airbag 51F/51R is inflated by the inflating gas admitted into the body portion 52, to break the not-shown tape member, thereby to push and open the door portion 8a of the roof head lining 8. As a result, the airbag 5IF/51R is expanded and inflated so downward as to shield the window WF/WR on the inner side of the shielding member 41F/41R, as shown in FIG. 21.

This occupant restraining device S3 of the third embodiment can attain the same working-effects as the first embodiment. At the time of a rollover, moreover, the shielding member 41F/41R shields the window WF/WR on the inner side of the window WF/WR, and the airbag 51F/51R is interposed between these shielding member 41F/41R and an occupant on the inner side so as to shield the window WF/WR, thereby to arrest the occupant properly with the shielding member 41 (41F/41R) and the airbag 51 (51F/51R).

Figure 22:
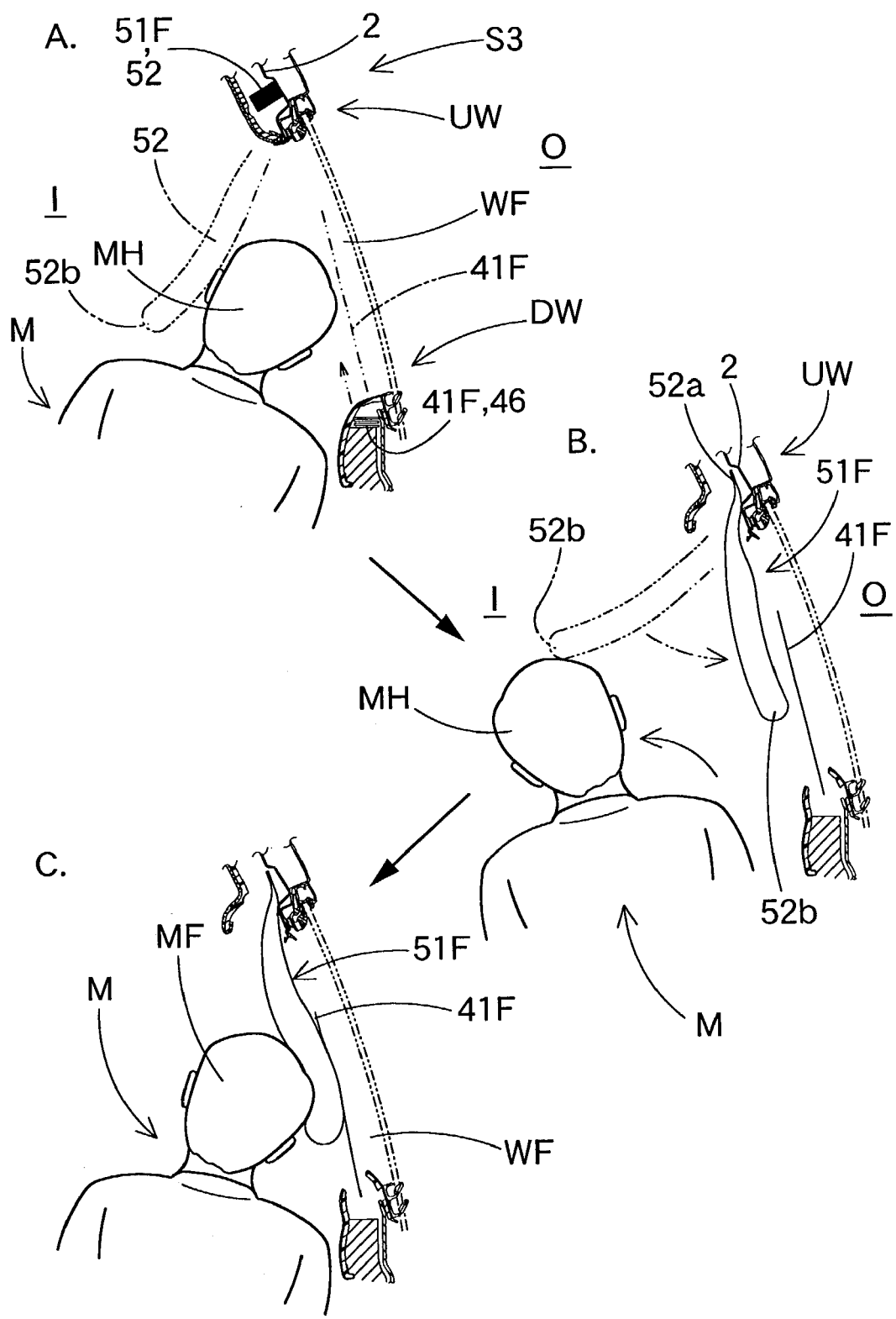
FIG. 22 diagrams the behavior of the airbag at the time of a rollover of the vehicle in the third embodiment.

In the occupant restraining device S3 of the third embodiment, moreover, the airbag 51F may be expanded/inflated with the head MH of the occupant M being close to the window WF, so that the airbag 51F is arranged on the inner side I of the occupant's head MH, as shown in FIG. 22A. However, the airbag 51F is connected and supported at its upper end 52a to and by the inner panel 2 of the upper edge portion UW of the peripheral edge of the window WF, and leaves the lower end 52b as the free end capable of swinging in the direction generally perpendicular to the window WF. While the vehicle is rolling over, the occupant M may also leave or approach the window WF. When the occupant M leaves the window WF, as shown in FIG. 22B, the airbag 51F swings to the outer side O of the vehicle and easily goes into the space between the occupant M and the window WF or the shielding member 41F. If the airbag 51F is then sandwiched between the occupant's head MH and the shielding member 41F, as shown in FIG. 22C, the occupant's head MH can be arrested properly. These correlations likewise apply to the airbag 51R, and can be likewise coped with in the first and second embodiments.

Of course, even if the occupant's head MH approaches the window WF/WR at the beginning of the expansion/inflation of the airbag 51F/51R so that the airbag 51F/51R takes a position on the inner side of the occupant's head MH, the shielding member 41F/41R is arranged on the inner side of the window WF/WR. Therefore, the shielding member 41F/41R arrests/catches the occupant's head MH, and thus the restraining performance of the occupant's head MH is secured.

In the occupant restraining device S3 of the third embodiment, therefore, the airbag 51F/51R to be activated at the time of detection of a rollover can be smoothly interposed between the occupant M and the window WF/WR even if the occupant M is close to the window WF/WR.

In the third embodiment, moreover, the airbag 51F/51R at the time of completion of the expansion/inflation is so arranged that the substantially entire length of the lower end 52b excepting the portion of the pillar portion CP/RP can overlap the completely let-off shielding member 41F/41R horizontally. When the airbag 51F/51R is clamped between the occupant's head MH and the window WF/WR or the shielding member 41F/41R, therefore, the airbag 51F/51R can be stably supported by the shielding member 41F/41R to arrest the occupant M in excellent cushioning properties.

In the third embodiment, moreover, the rear side of the lower end 52b of the airbag 51F/51R covers the inner side of the center pillar portion CP or the rear pillar portion RP, too. Therefore, the airbag 51F/51R is more stably supported by these pillar portions CP/RP. The airbag 51F/51R, on the contrary, prevents the occupant M from engaging the center pillar portion CP or the rear pillar portion RP.

In the third embodiment, moreover, the vertical edge side housed portion 45 constituting a major part of the shielding member 41F/41R is housed between the door frame rear vertical edge portion 15 and the garnish rear vertical edge portion 24 in the vertical edge portion VW of the peripheral edge of the window WF/WR, and the pretensioner 70 as the let-off means 48 of the shielding member 41F/41R is interposed between the door frame lower edge portion 16 and the garnish lower edge portion 25 in the lower edge portion DW of the peripheral edge of the window WF/WR. In other words, there is a more space between the door frame lower edge portion 16 and the garnish lower edge portion 25 in the lower edge portion DW of the peripheral edge of the window WF/WR than in the upper edge portion UW or the generally vertically extending vertical edge portion VW in the peripheral edge of the window WF/WR. As in the first and second embodiments, therefore, the pretensioner 70 as the let-off means 48 can be easily arranged in the lower edge portion DW of the door FD/RD. Moreover, the pretensioner 70 is close to the shielding member 41F/41R housed in the vertical edge portion VW of the peripheral edge of the window WF/WR, so that it is easily connected to the shielding member 41F/41R and easily let off the same. These working-effects can also be attained in the first and second embodiments.

In the case of the third embodiment, moreover, the shielding member 41F/41R is formed into such a generally triangular sheet shape at the time of let-off completion that its apexes 42/43 are located at the upper and lower portions in the vertical edge portion VW at the housing time and its apex 44 is located at the leading end portion extending along the lower edge of the peripheral edge of the window WF/WR. Moreover, the upper/lower apex portions 42/43 are fixed on the door frame rear vertical edge portion 15 of the vertical edge portion VW, and the leading end apex portion 44 is connected to the leading end 72a of the pretensioner tension member 72. At the housing time, moreover, the shielding member 41F/41R is formed into such an inverted L-shape that the vertical edge side housed portion 45 is housed in the vertical edge portion VW and the lower edge side housed portion 46 having the leading end apex portion 44 is housed in the lower edge portion DW near the vertical edge portion VW.

With this construction, at the action time of the pretensioner 70, as shown by double-dotted lines in FIG. 15, the leading end apex portion 44 is moved forward to establish tensions at the shielding member oblique side 41a between the leading end apex portion 44 and the upper apex portion 42 and at the shielding member lower edge portion 41b between the leading end apex portion 44 and the lower apex portion 43, thereby to complete the letting-off of the shielding member 41F/41R.

At this time, the shielding member 41F/41R is so housed in the lower edge portion DW that its leading end apex portion 44 connected to the leading end 72a of the pretensioner tension member 72 may protrude from the vertical edge portion VW. As compared with the case in which the shielding member 41F/41R is housed as a whole in the vertical edge portion VW, therefore, the motion stroke of the leading end apex portion 44 till the let-off completion can be shortened by the length L1 (as referred to FIG. 20) of the lower edge side housed portion 46 extending from the housed position in the vertical edge portion VW. Therefore, the load on the pretensioner 70 as the let-off means 48 can be lightened to make the pretensioner 70 simple and compact. These working-effects can also be attained in the first and second embodiments.

Moreover, the following working-effects can be attained from the construction including the vertical edge side housed portion 45 to be housed in the vertical edge portion VW, and the lower edge side housed portion 46 to be housed in the lower edge portion DW by arranging the leading end apex portion 44 connected to the let-off means 48.

At first, at the time of letting off the shielding member 41F/41R, the oblique side 41a in the generally triangular sheet shape at the let-off completion substantially rises from the corner C of the peripheral edge of the window WF/WR such that it rotates clockwise, as viewed from the inner side, on the upper apex portion 42. As in the first and second embodiments, therefore, the shielding member 41F/41R is smoothly let off, even if the occupant M is extremely close to the peripheral edge (especially the lower edge) of the window WF/WR on the inner side, so as to raise the occupant M from the lower side.

Secondly, since the shielding member 41F/41R is not wholly housed in the vertical edge portion VW, the space for housing the vertical edge side housed portion of the shielding member can be minimized, enabling the shielding member 41F/41R to be arranged easily in the door FD/RD having a limited space. These working-effects can also be attained in the first and second embodiments.

Here, the third embodiment has been described on the case in which the shielding member 41F/41R and the airbag 51F/51R are activated at the time of detection of a rollover. However, the construction may be modified by connecting the side collision sensor capable of detecting a side collision of a vehicle with the control device 64 so that the shielding member 41 and the airbag 51 may be activated at the time of the side collision of the vehicle.

The occupant restraining devices S1 to S3 of the first to third embodiments have been described on the case in which the units U0/U1/U0F/U0R are assembled and in which the shielding member 41 is assembled in advance with the garnish 21/21A. As in an occupant restraining device S4 of a fourth embodiment, however, the shielding member 41 and the let-off means 48 may be sequentially arranged with the door frame 12 without forming the unit.

Figure 25:
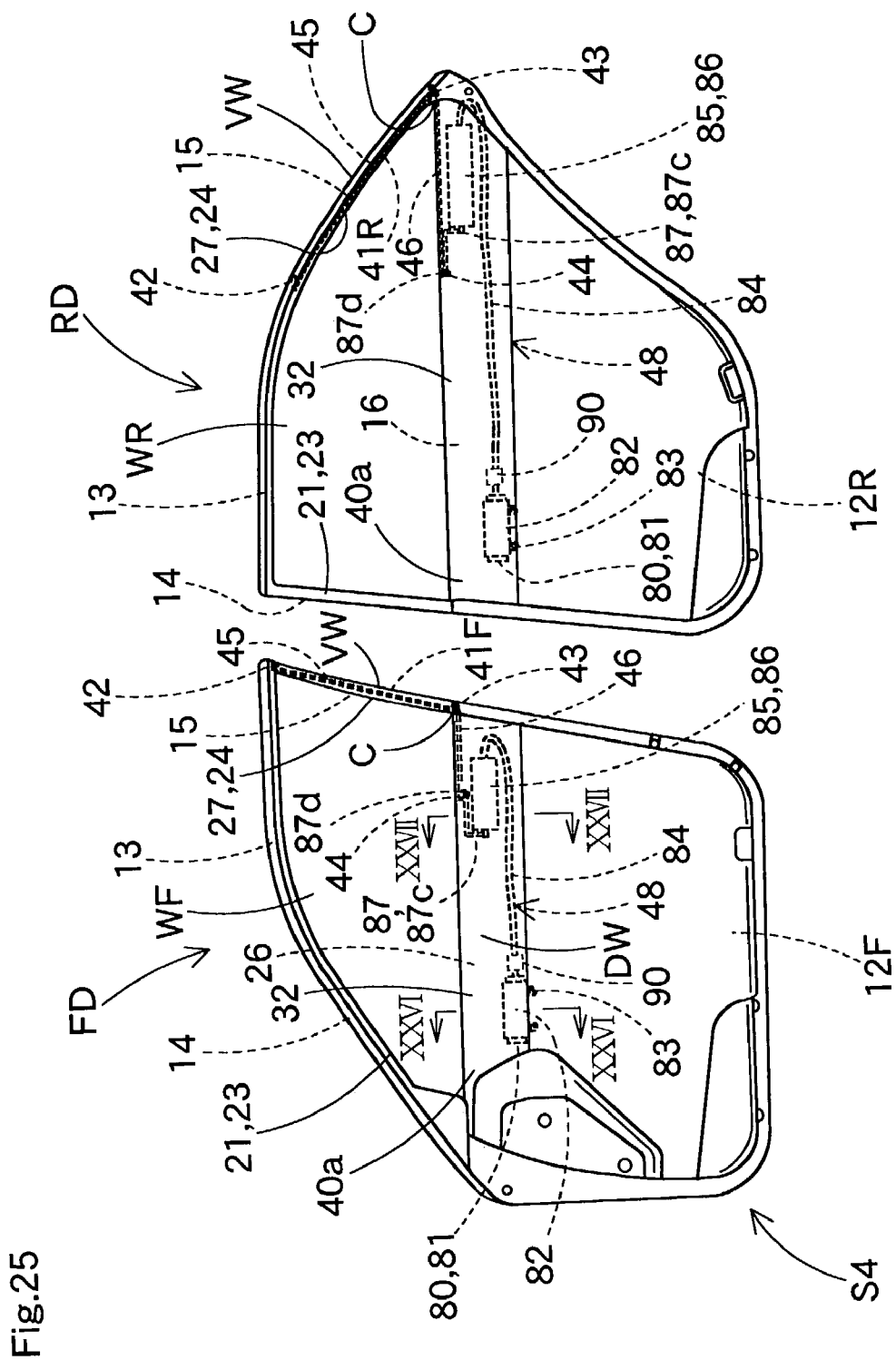
FIG. 25 is a front elevation showing a door of a fourth embodiment as taken from the inner side.
Figure 26:
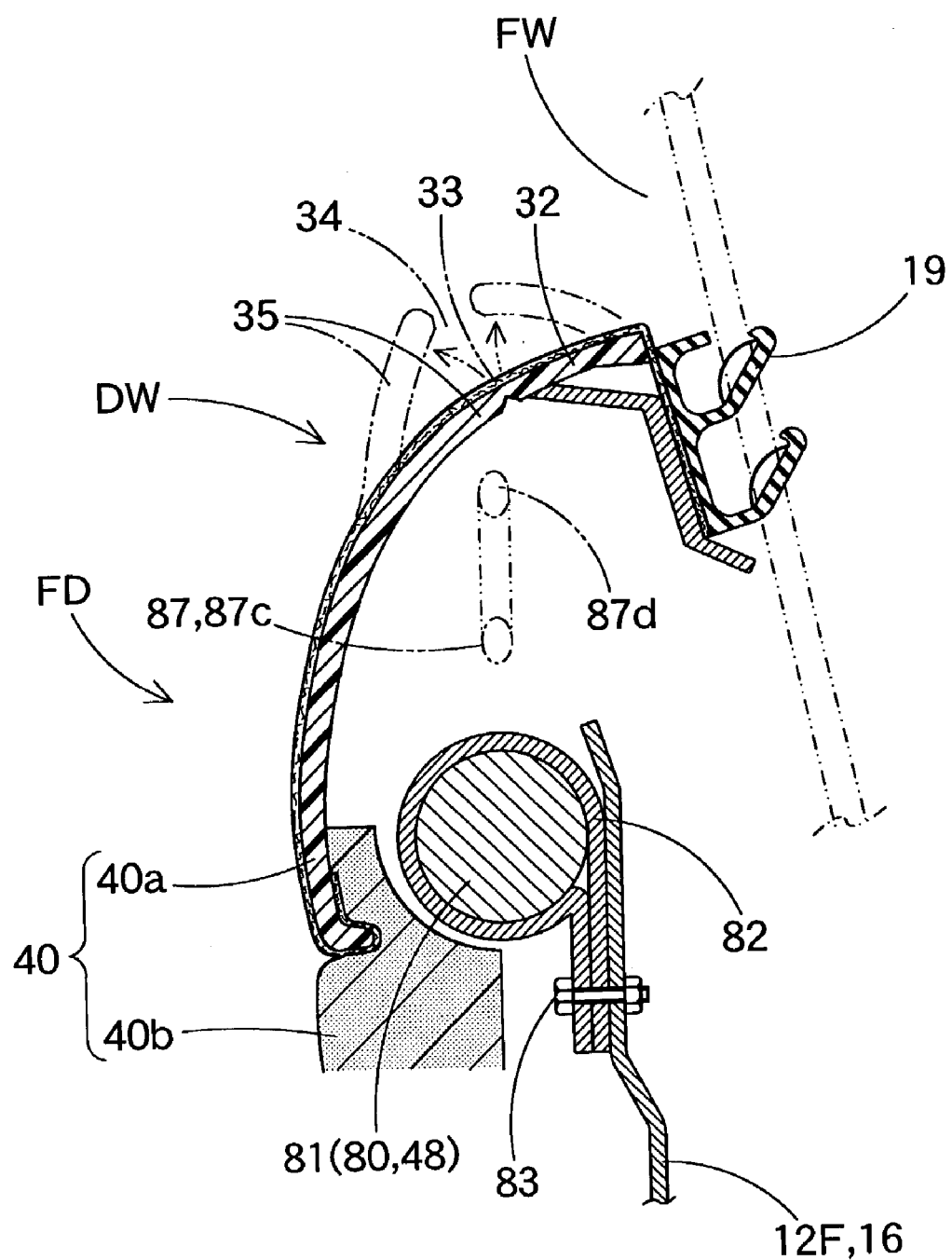
FIG. 26 is a schematic section of a portion XXVI—XXVI of FIG. 25.
Figure 27:
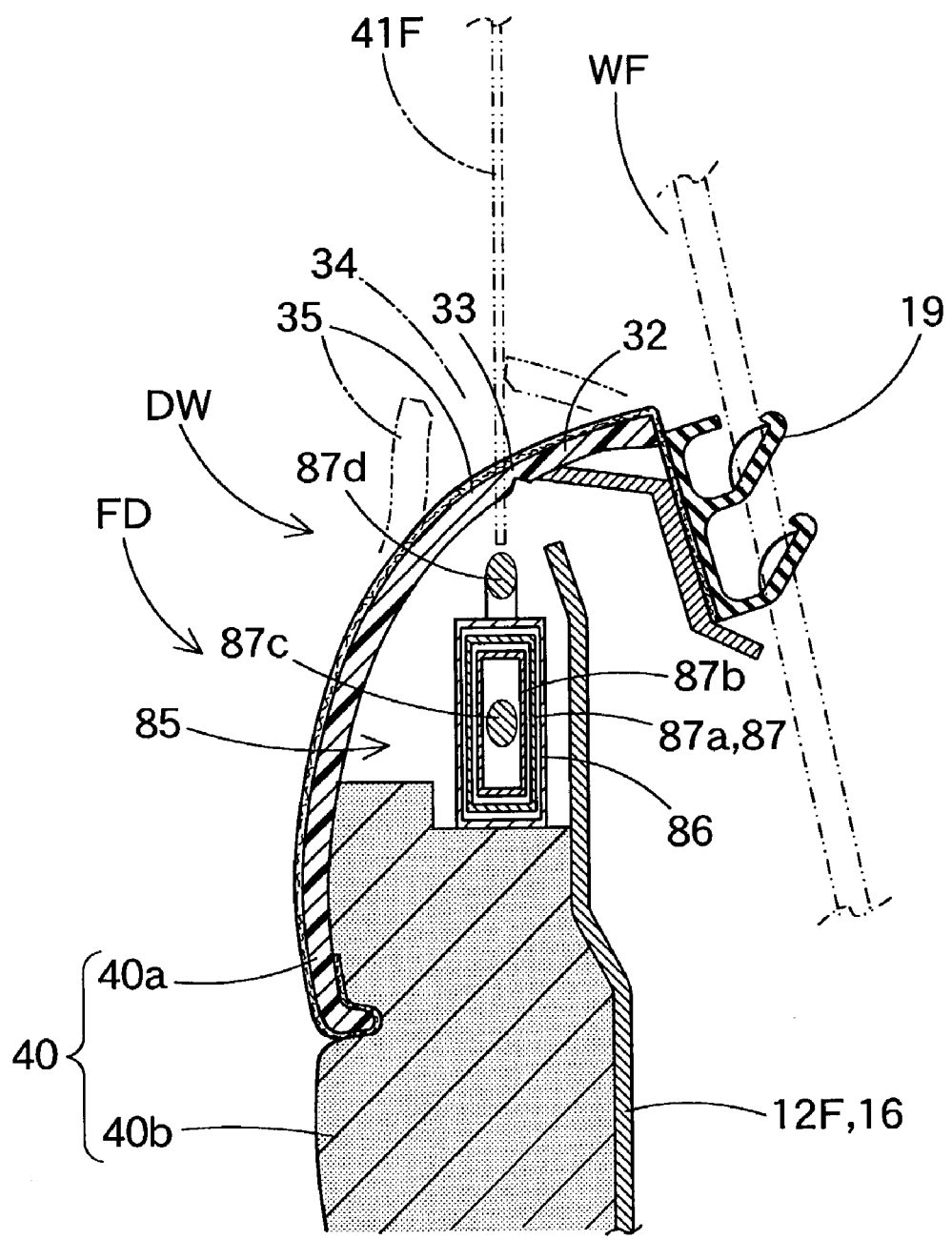
FIG. 27 is a schematic section of a portion XXVII—XXVII of FIG. 25.

In the occupant restraining device S4 of the fourth embodiment, as shown in FIGS. 25 to 27, the sheet-shaped shielding members 41F/41R are arranged individually in the front/rear door FD/RD. However, the individual shielding members 41F/41R and their let-off means 48 are not assembled with the door frame garnish 21.

The shielding member 41F/41R is formed into a triangular sheet shape, as shown in FIG. 25, and the upper/lower mounting portions 42/43 on the rear edge side are mounted on the individual door frames 12F/12R of the doors FD/RD by means of predetermined bolts. The mounting portions 42/43 are fixed individually on the upper and lower portions of the rear vertical edge portion 15 of the door frames 12F/12R in the peripheral edge of the windows WF/WR. The portion 44 on the front end side at the time of expansion of each shielding member 41F/41R is connected to the upper end 87d of the third rod 87c in the piston rod 87 by means of predetermined bolts. Moreover, the shielding member 41F/41R is housed in such an inverted L-shape as to cross the corner C on the rear side of the lower edge portion DW of the peripheral edge of the window WF/WR while being folded in a bellows shape toward the rear side. In the shielding member 41F/41R thus folded, the vertical edge side housed portion 45 is covered with the rear vertical edge portion 24 of the door frame garnish 21F/21R, and the lower edge side housed portion 46 is covered with the upper edge side of the upper trim 40a of the door trim 40.

Each door frame garnish 21F/21R is made of a synthetic resin such as a thermoplastic elastomer of polyolefin and is mounted on the door frame 12F/12R and positioned on the upper edge side of the peripheral edge of the window WF/WR to take an inverted U-shape, as viewed from the inner side. As in the first and second embodiments, moreover, the door portion 27 to be opened to the inner side is formed in the rear vertical edge portion 24 on the rear edge side of the door frame garnish 21.

In the upper trim 40a, as shown in FIGS. 26 and 27, there is formed the cover portion 32. This cover portion 32 causes the shielding member 41F/41R being let off to break the portion 33 and open the door portion 35 so that the opening 34 is formed. Here in the fourth embodiment, the door trim 40 covering the inner side of the lower edge portion 16 of the door frame 12 is constructed to include the upper trim 40a and the lower trim 40b. The upper trim 40a covers the upper edge side of the door frame lower edge portion 16. The lower trim 40b covers the lower side of the door frame lower edge portion 16. The upper trim 40a is formed of a thermoplastic elastomer of polyolefin, and the lower trim 40b is formed of hard polypropylene.

These garnishes 21F/21R and door trim 40 are sequentially mounted on the door frames 12F/12R after the shielding members 41F/41R and their let-off means 48 were mounted on the door frames 12F/12R.

The let-off means 48 of each shielding member 41F/41R of the fourth embodiment is constructed to include the inflator 81 as the drive source 80, and the connection means 85 for guiding the shielding member 41F/41R being expanded. The connection means 85 is constructed to include the cylinder 86 for admitting the inflating gas from the inflator 81, and the piston rod 87 to protrude largely from the cylinder 86 when the inflating gas flows into the cylinder 86.

As shown in FIGS. 25 and 27, the cylinder 86 is fixed on the side of the lower edge portion 16 of the door frame 12F/12R by means of not-shown mounting bracket and mounting bolts. Each cylinder 86 is covered with the upper trim 40a. The cylinder 86 supports the piston rod 87. As the inflating gas flows into the cylinder 86: the first rod 87a is protruded forward from the cylinder 86; the second rod 87b is protruded forward from the first rod 87a; and the third rod 87c is protruded forward from the second rod 87b. This third rod 87c is bent at its front end portion and is connected at the leading end of the upper end 87d to the front end portion 44 of the shielding member 41F/41R by means of bolts.

The inflator 81 is of a cylinder type, which is clamped by the mounting bracket 82 as shown in FIGS. 25 and 26, and is connected at its rear end side to the feed pipe 84 for feeding the rear end side of the cylinder 86 with the inflating gas discharged. Each inflator 81 is fixed on the lower edge portion 16 of each door frame 12F/12R by using the mounting bracket 82 and the bolts 83. Moreover, the inflator 81 is arranged on the front side of the lower edge portion DW of the peripheral edge of the window WF/WR. The inflator 81 is covered with the upper trim 40a.

In the occupant restraining device S4 of the fourth embodiment, too, when each inflator 81/81 is activated, the inflating gas discharged from the inflator 81/81 flows through the feed pipe 84 into the cylinder 86. In this cylinder 86, the first, second and third rods 87a, 87b and 87c of the piston rod 87 are sequentially protruded forward. As a result, each shielding member 41F/41R is expanded, as the third rod 87c moves forward, from its folded state while pushing and opening the individual door portions 27/35 of the door frame garnish 21.

In this fourth embodiment, too, the working-effects similar to those of the first to third embodiments can be attained excepting the Assembling workability of the shielding member 41F/41R and the let-off means 48.

The first to fourth embodiments have been described on the case in which the shielding member 41/41F/41R are housed in the front door FD and the rear door RD. However, the construction may be modified such that the shielding member is housed in various doors such as a slide door used in a vehicle having three tandem seats or a back door or in the body.

As shown in FIGS. 28 to 33, an occupant restraining device S5 of a fifth embodiment is mounted on a vehicle VC having three tandem seats, and the shielding member 41 is housed in the peripheral edge of each window WF/WS/WR of the door or body on the inner side. In this vehicle VC, moreover, there are arranged three folded airbags 51 (51F/51S/51R) of the airbag device ABM in the roof side rail portion RR in the upper edge portion UW of the peripheral edge of each window WF/WS/WR extending from the vicinity of the front pillar portion FP through the first/second intermediate pillar portions P1/P2 to the vicinity of the rear pillar portion RP. In this vehicle VC, moreover, there is arranged a slide door SD which is slid backward when opened and forward when closed.

Each shielding member 41 (41F/41S/41R) is made of a flexible cloth having a triangular sheet shape in the expanded state and is folded and housed in the L-shape from the rear vertical edge portion VW to the lower edge portion DW in the peripheral edge of the window WF/WS/WR. Each shielding member 41 has apex portions 44/42/43 at the front end portion, the rear edge upper portion and the rear edge lower portion in the expanded state. The apex portion 44 is connected to the let-off means 48, and the apex portions 42/43 are fixed on the upper and lower portions of the vertical edge portion VW in the peripheral edge of the window WF/WS/WR.

In the case of the fifth embodiment, in the shielding member 41F/41S on the front side, the apex portion 42 is fixed on the upper portion of the vertical edge portion VW of the peripheral edge of the window WF/WS in the door frame 12 of the front door FD or the slide door SD, and the apex portion 43 is fixed on the lower portion of the vertical edge portion VW of the peripheral edge of the window WF/WS in the door frame 12.

In the shielding member 41R on the rear end side, the apex portion 42 is fixed on the inner panel 2 on the side of the body 1 in the upper portion of the vertical edge portion VW of the peripheral edge of the window WR, and the apex portion 43 is fixed on the inner panel 2 on the side of the body 1 in the lower portion of the vertical edge portion VW of the peripheral edge of the window WR.

The individual apex portions 42/43 of the shielding member 41F/41S/41R are fixed by means of bolts or the like.

Moreover, the individual shielding members 41 are let off the peripheral edges of the windows WF/WS/WR by the let-off means 48. This let-off means 48 is activated by the control device 64, as in the first embodiment, and comprises: the inflator 81 as the drive source 80; the cylinder 86 and the piston rod 87 as the connection means 85; the feed pipe 84 for feeding the inflating gas; and the flow control valve 90.

Each inflator 81 is fixed on the lower side of the peripheral edge of the window WF/WS/WR in the door frame 12 or the inner panel 2 by means of the mounting bracket 82. Each cylinder 86 is fixed on the lower edge portion DW of the peripheral edge of the window WF/WS/WR in the door frame 12 or the inner panel 2 by means of a not-shown mounting bracket.

Moreover, each shielding member 41F/41S/41R is covered, when folded and housed in the L-shape, with the door frame garnish 21, the door trim 40 or a quarter trim (or a window edge garnish) 20.

The door frame garnish 21 of each door FD/SD is formed into an inverted U-shape having the upper edge portion 22, the front vertical edge portion 23 and the rear vertical edge portion 24. The inner side of the lower edge portion DW of the peripheral edge of the window WF/WS is formed of the door trim 40. In each rear vertical edge portion 24, moreover, as in the first to fourth embodiments, the door portion 27 to be pushed and opened by the shielding member 41 being let off is arranged on the end side of the inner peripheral edge side of the window WF/WS. The door portion 27 is provided with the thin hinge portion 28 (not shown) on the inner side end portion so that it can be easily opened. Each of these garnishes 21 is also made of integral two-color molded part of a soft portion near the door portion 27 and a general portion other than the door portion 27.

The door trim 40 of each door FD/SD is constructed of the upper trim 40a on the upper side and the lower trim 40b on the lower side. On the upper edge side of the upper trim 40a, as in the second embodiment, there is formed the cover portion 32 which has a portion to be broken so that the door portion may be opened, when pushed by the shielding member 41, to form an opening. Each door trim 40 is made of two-color molded part, in which the upper trim 40a and the lower trim 40b are integrally formed. The portion near the cover portion 32 is made as the soft portion of a thermoplastic elastomer of polyolefin, and the portion other than the cover portion 32 is made as the general portion of hard polypropylene having a compatibility with the soft portion.

The quarter trim 20 is arranged to cover the inner sides of the vertical edge portion VW and the lower edge portion DW of the peripheral edge of the window WR, and is provided with the rear vertical edge portion 24 and the lower edge portion 25. Moreover, the quarter trim 20 is fixed on the inner panel 2 on the side of the body 1 by means of bolts or the like.

Figure 31:
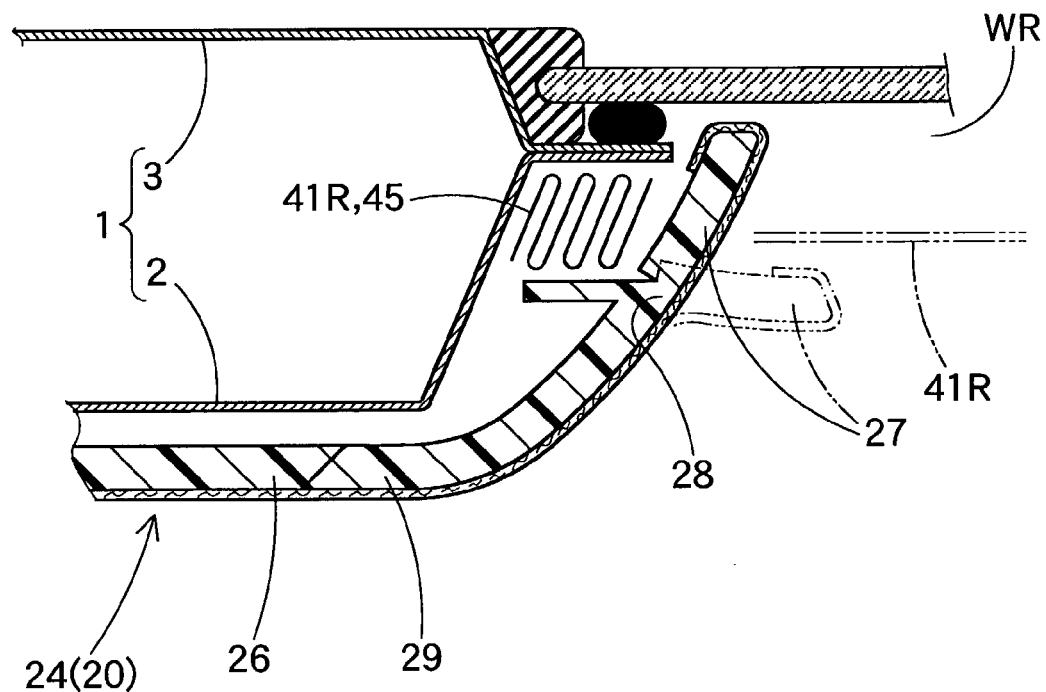
FIG. 31 is a schematic section of a portion XXXI—XXXI of FIG. 28.
Figure 32:
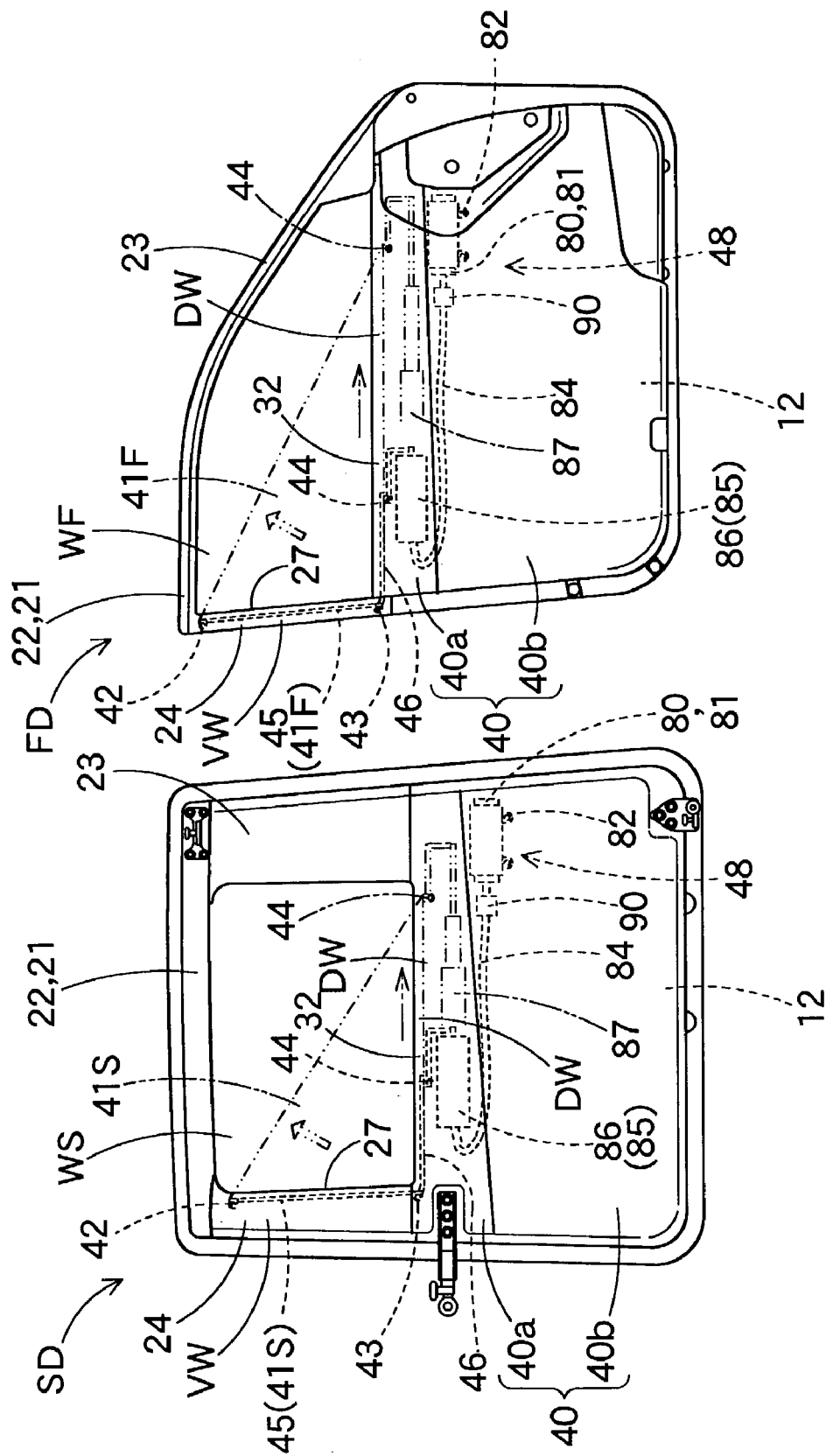
FIG. 32 is a front elevation showing a slide door and a front door of the fifth embodiment as taken from the inner side.

On the rear vertical edge portion 24 of the quarter trim 20, as shown in FIG. 31, such a door portion 27 is arranged on the end side of the inner peripheral edge side of the window WR as is pushed and opened by the shielding member 41R when the folded shielding member 41R is expanded. As in the first embodiment, the door portion 27 is provided at its inner side end portion with the thin hinge portion 28 so that it is easily opened. Moreover, the vertical edge side housed portion 45 of the folded shielding member 41 is so housed between the door portion 27 and the inner panel 2 that its front side is covered with the door portion 27 of the inner peripheral edge side of the window WR.

Figure 29:
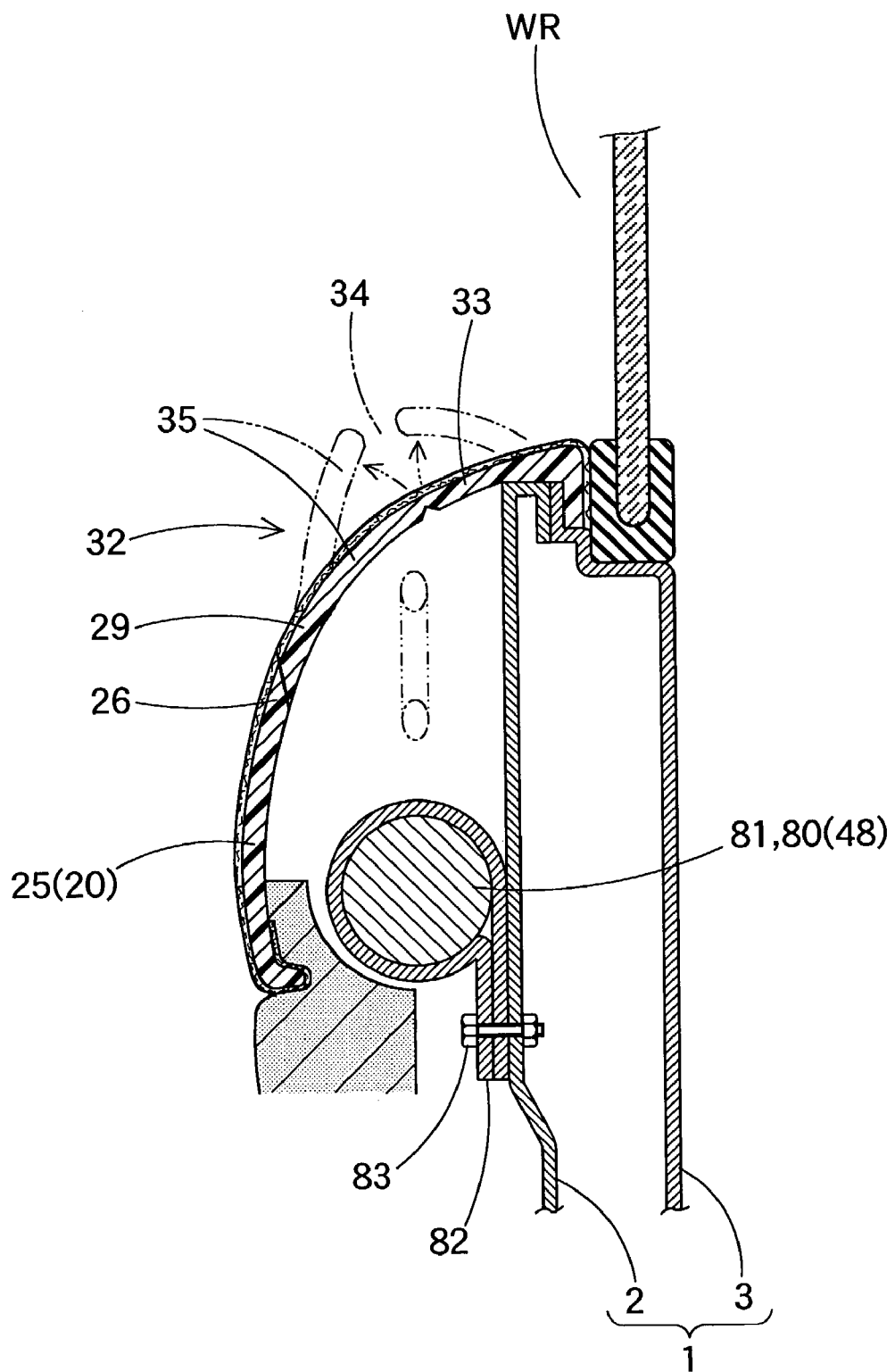
FIG. 29 is a schematic section of a portion XXIX—XXIX of FIG. 28.
Figure 30:
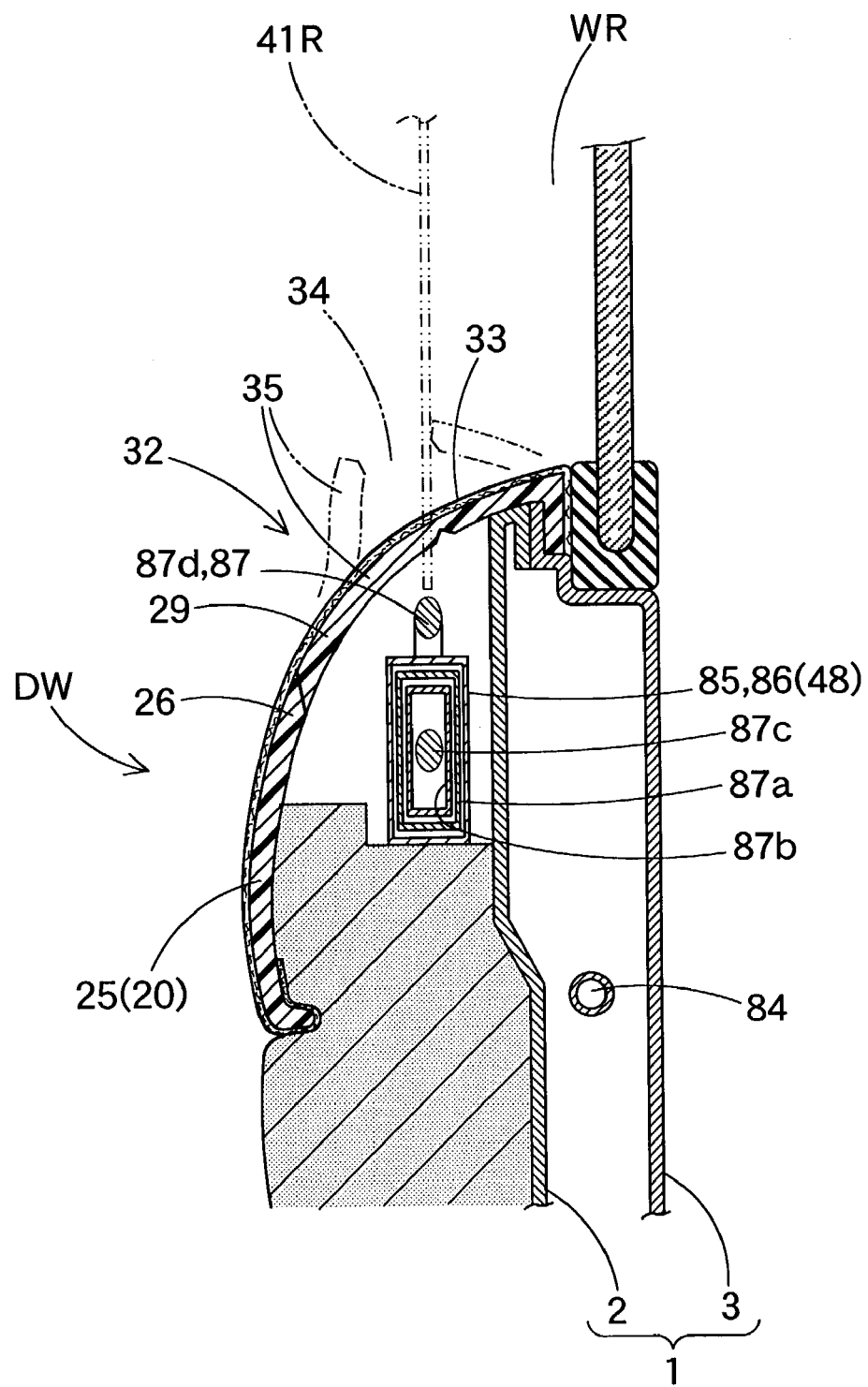
FIG. 30 is a schematic section of a portion XXX—XXX of FIG. 28.

On the upper edge side of the lower edge portion 25 of the quarter trim 20, as shown in FIGS. 29 and 30, there is arranged the cover portion 32. In this cover portion 32, there is arranged the thin portion 33 to be broken, which extends longitudinally in the vehicle. As in the first and third embodiments, the cover portion 32 covers over the lower edge side housed portion 46 of the folded shielding member 41R. Moreover, the cover portion 32 covers over the track which is followed by the moving of the third rod 87c.

Moreover, the quarter trim 20 of the fifth embodiment is also formed of two-color molded part having the soft portion 29 and the general portion 26. The soft portion 29 constructs the vicinity of the door portion 27 and the vicinity of the cover portion 32 and is made of a thermoplastic elastomer of polyolefin in so that the door portions 27/35 may be easily opened. The general portion (or the hard portion) 26 is a portion of the trim 20 other than the soft portion 29 and is made of hard polypropylene so as to have a compatibility with the molding material of the soft portion 29 and to retain the strength. The quarter trim 20 can be manufactured by setting a surface skin (not numbered) in a molding die to mold either one of the soft portion 29 or the general portion 26 and then the other portion 26/29.

The airbag 51 (51F/51S/51R) of the airbag device ABM is constructed to feed the inflating gas from the inflator 58 through a feed pipe 57.

Figure 28:
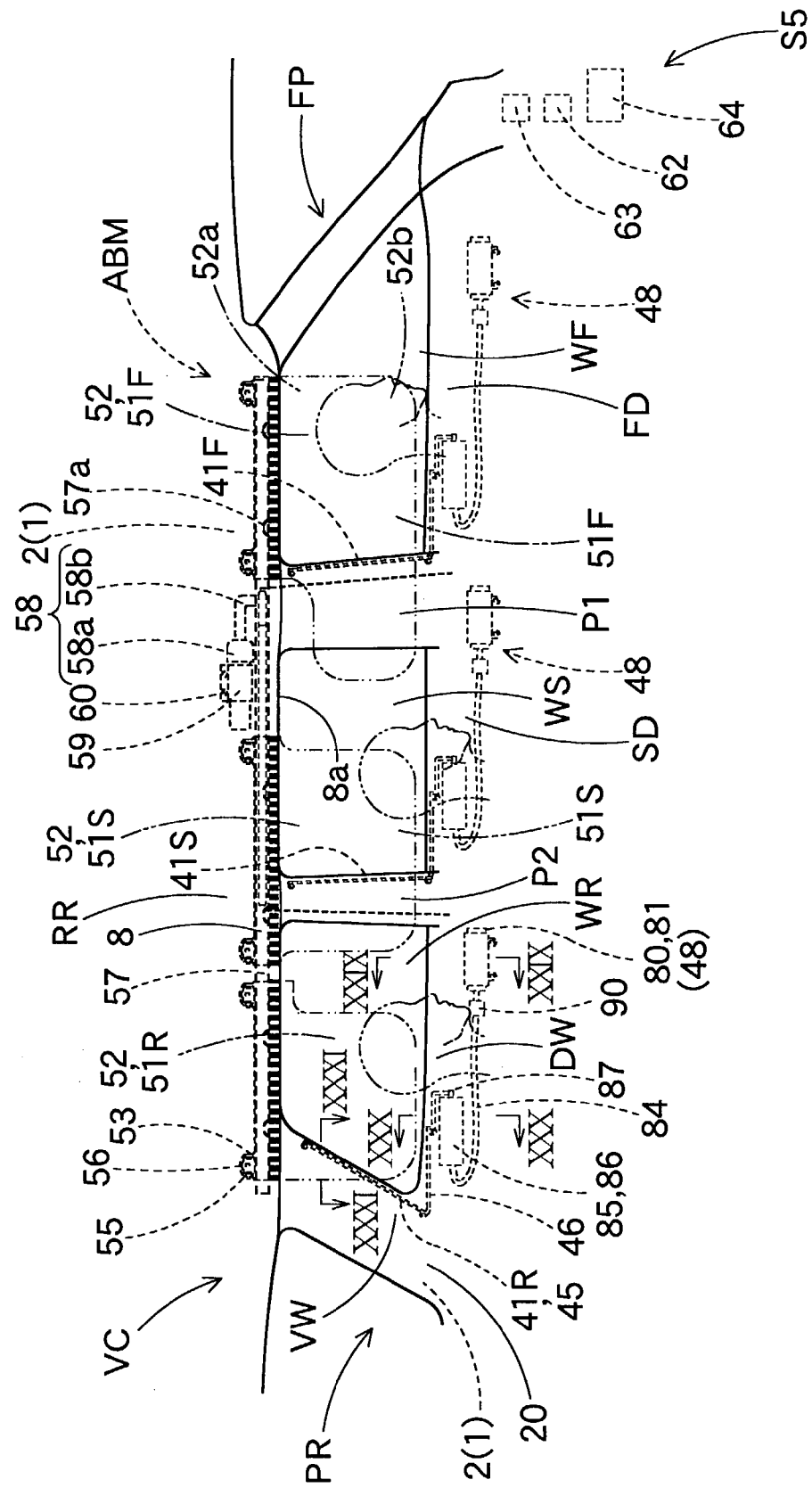
FIG. 28 is a front elevation showing an occupant restraining device of a fifth embodiment as taken from the inner side.
Figure 33:
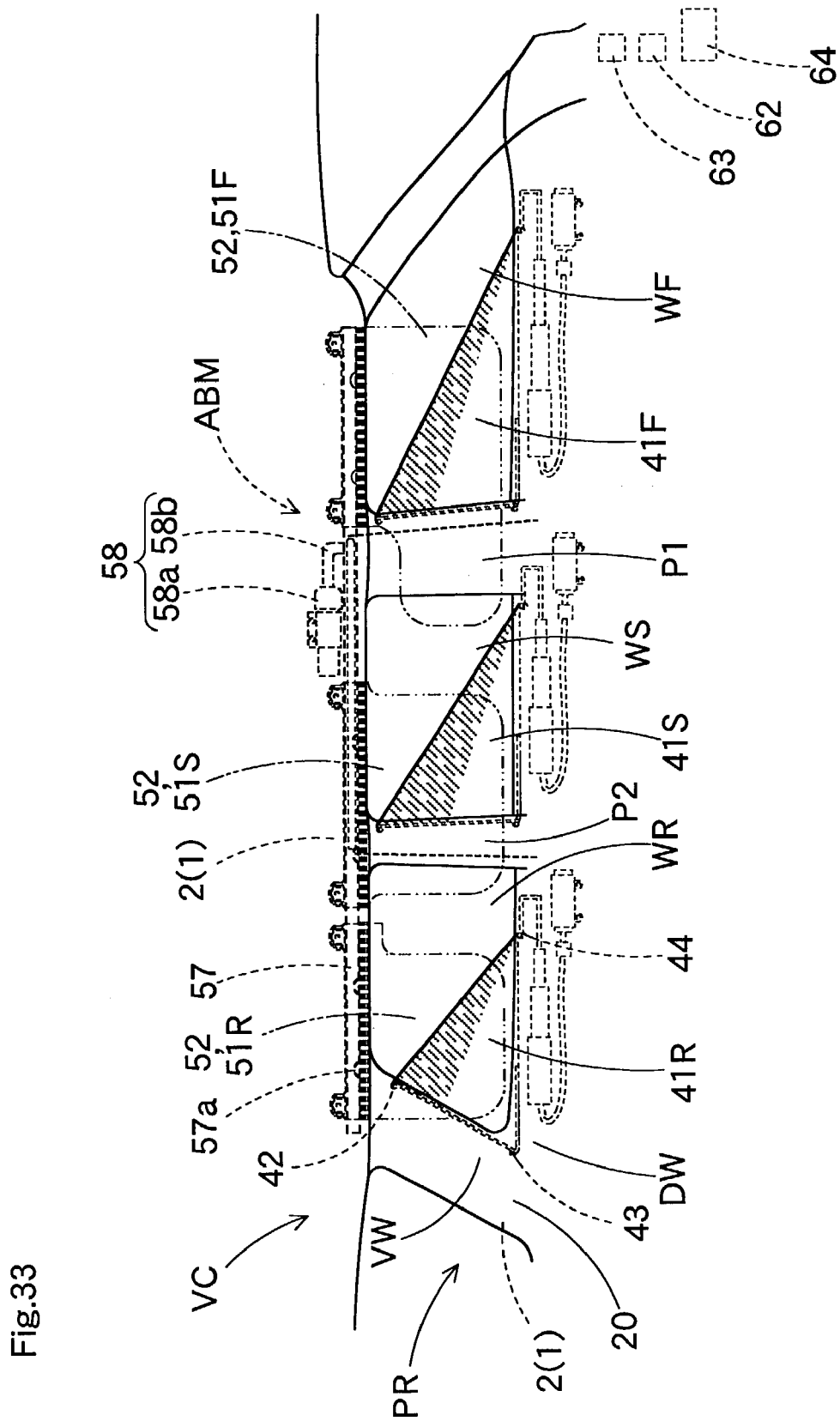
FIG. 33 is a front elevation showing the action time of the occupant restraining device of the fifth embodiment as taken from the inner side.

As shown in FIGS. 28 and 33, the inflator 58 is arranged on the inner side I of the inner panel 2 of the body 1 in the roof side rail RR. The inflator 58 is constructed to include a cylinder type body portion 58a, and a pipe-shaped communication portion 58b for guiding the inflating gas discharged from the body portion 58a into the feed pipe 57. The inflator 58 is fixed on the inner panel 2 such that it is held by the mounting bracket 59 for clamping the body portion 58a and such that the mounting bracket 59 is mounted to the inner panel 2 by means of the bolts 60.

In this occupant restraining device S5 of the fifth embodiment, too, the control device 64 activates the individual inflators 81/58 when it receives predetermined signals from the rollover sensor 62 or the side collision sensor 63. As shown in FIG. 33, more specifically, the individual shielding members 41F/41S/41R shield the windows WF/WS/WR. The individual airbag 51F/51S/51R are expanded and inflated with the inflating gas admitted from the inflator 58 through the feed pipe 57.

In the occupant restraining device S5 of the fifth embodiment, moreover, if the shielding member 41R is housed between the quarter trim (or the window edge garnish) 20 of the peripheral edge of the window WR and the body 1, the airbag 51R can be arranged in the roof side rail portion RR on the side of the body 1 of the vehicle VC despite that the window WR is arranged in the body 1.

In the occupant restraining device S5 of the fifth embodiment, therefore, the airbag device ABM can be arranged in the vehicle VC without any problem even if the occupant restraining device is mounted together with the airbag device ABM in the vehicle VC.

Especially in the embodiment, since the shielding member 41R and the let-off means 48 are arranged in the lower edge portion DW and the vertical edge portion VW of the peripheral edge of the window WR, the airbag 51R can be more easily mounted on the vehicle VC.

In the occupant restraining device S5 of this case, too, the garnish 20 is provided with the door portion 27/35 which covers the shielding member 41R and which can be pushed and opened by the shielding member 41R when this shielding member 41R is let off. Therefore, the shielding member 41R before let off can be covered with the door portion 27/35 of the garnish 20 so that the design on the inner peripheral edge side of the window WR is not degraded. It is natural that the shielding member 41R is smoothly let off while pushing and opening the door portion 27/35.

At the letting-off time of the shielding member 41R, moreover, the door portion 35 breaks and opens the portion 33 of the peripheral edge. Therefore, the housed shielding member 41R can be covered more beautifully.

Moreover, this garnish 20 is made of two-color molded part composed of the soft portion 29 of the vicinities of the door portion 27 and the cover portion 32, and the remaining general portion 26, as described hereinbefore, and can be easily manufactured.

Figure 34:
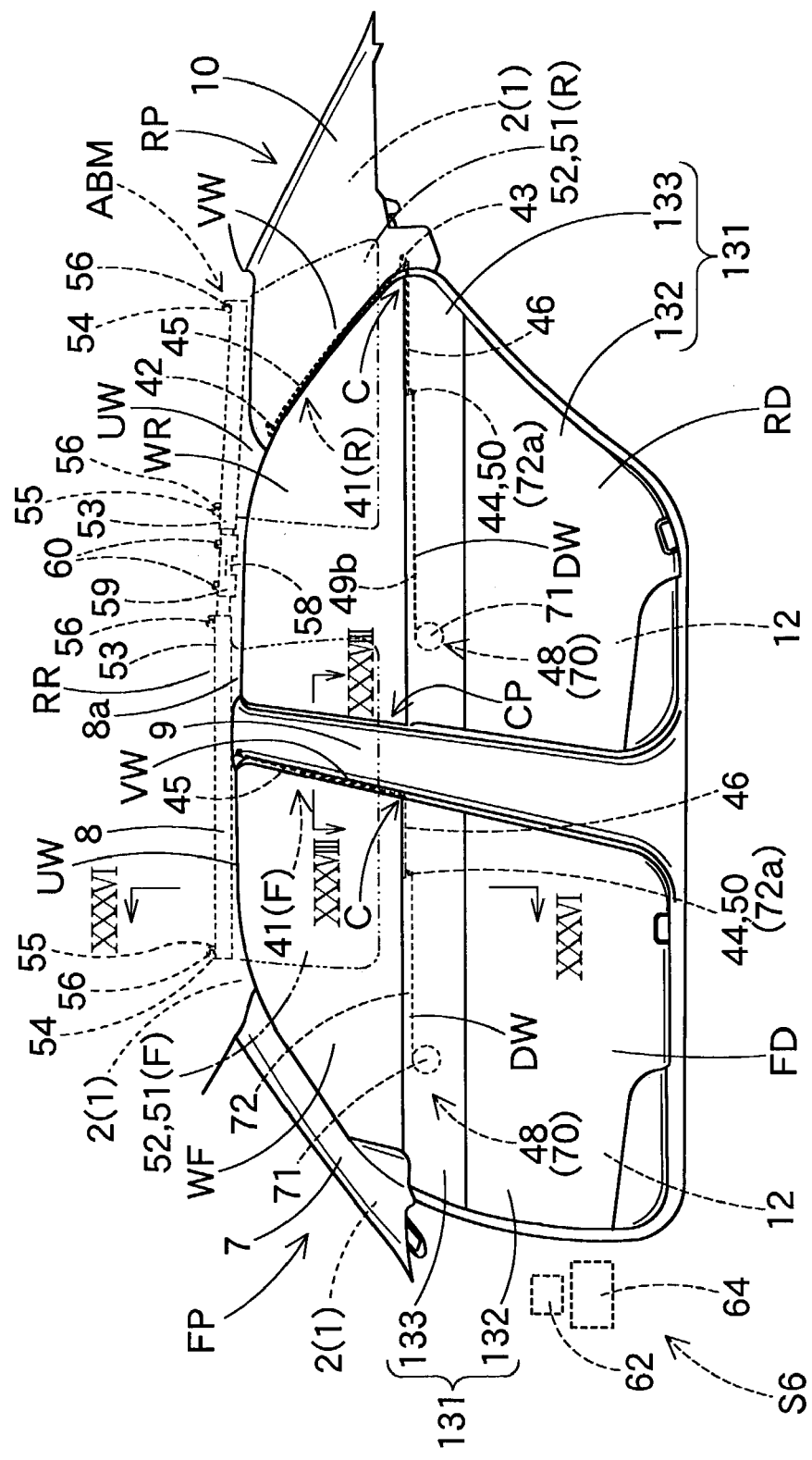
FIG. 34 is a front elevation showing an occupant restraining device of a sixth embodiment as taken from the inner side.
Figure 35:
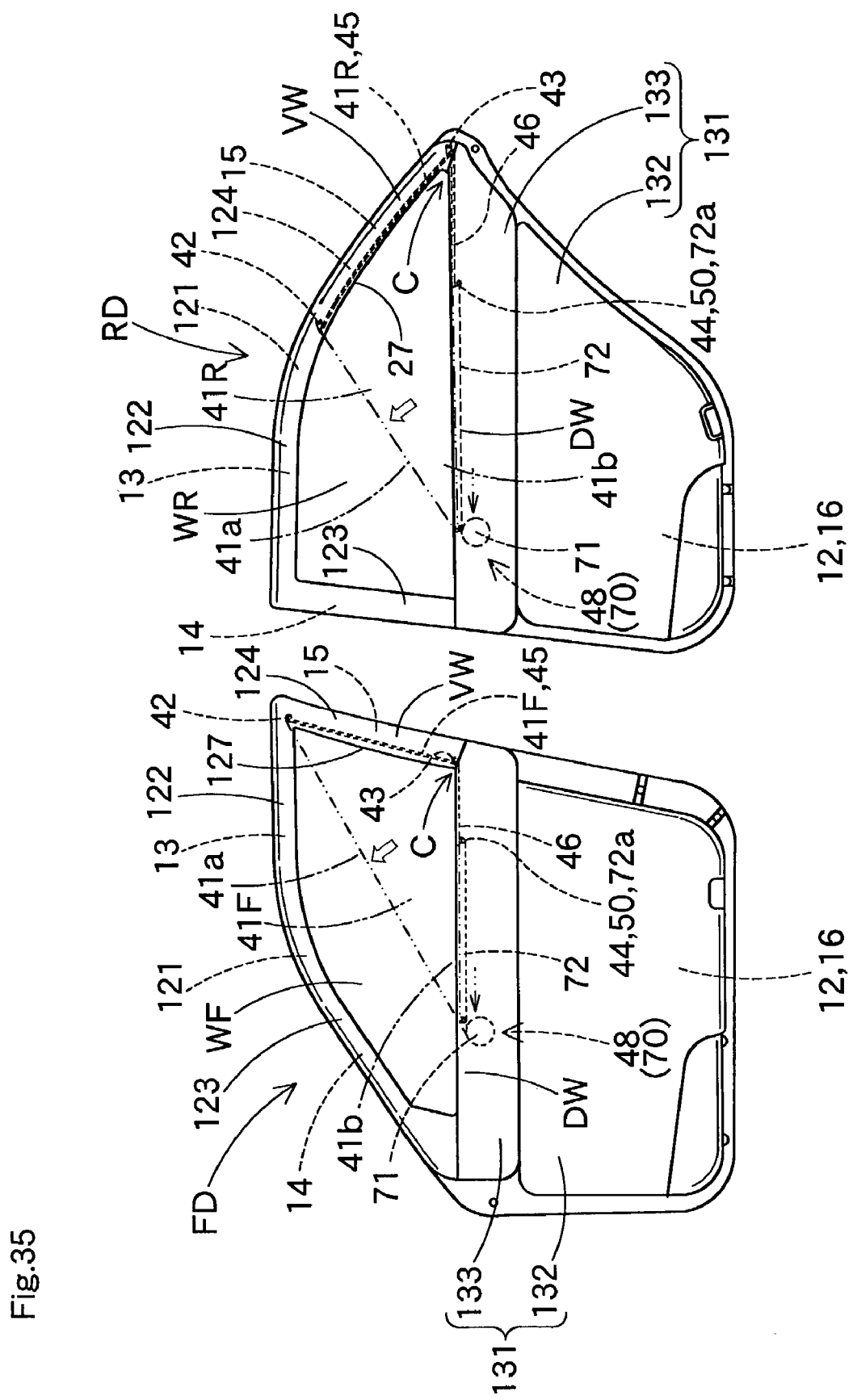
FIG. 35 is a front elevation showing a door of the sixth embodiment as taken from the inner side.

An occupant restraining device S6 of a sixth embodiment is constructed, as shown in FIGS. 34 and 35, to include the shielding member 41 (41F/41R) which is so let off the peripheral edge of the window WF/WR as to shield the inner side of the window WF/WR. The airbag device ABM is also mounted on the vehicle which carries the occupant restraining device S6. The airbag device ABM is constructed to include the airbag 51 (51F/51R) which is so inflated from the peripheral edge of the window WF/WR as can be interposed between the shielding member 41 and the occupant.

The shielding member 41 is activated by the pretensioner 70 as the let-off means 48, and the airbag 51 is expanded and inflated with the inflating gas from the inflator 58. The pretensioner 70 and the inflator 58 are so controlled by the control device 64 that they are activated by the control device 64 when this device 64 receives the rollover detection signal from the rollover sensor 62. Here, the control device 64 and the rollover sensor 62 are arranged at the predetermined positions of the vehicle.

In the vehicle of the sixth embodiment, too, the window WF/WR is arranged individually in the front door FD and the rear door RD, and the shielding member 41F is arranged in the front door FD whereas the shielding member 41R is arranged in the rear door RD. On the other hand, the airbag 51F/51R is arranged in the roof side rail portion RR on the side of the body 1. Specifically, the airbag 51F is arranged from the portion over the front door FD to the portion over the center pillar portion CP in the peripheral edge of the window WF, and the airbag 51R is arranged from the portion over the rear door RD in the peripheral edge of the window WR to the portion over the rear pillar portion RP.

The front door FD and the rear door RD are made to have constructions substantially identical to each other excepting the differences in the opening shapes of the window WF/WR and the shapes of the peripheral edge, as shown in FIG. 35. Each of them is constructed to include: the door frame 12 on the outer side, a door frame garnish 121 arranged on the peripheral edge of the window WF/WR on the inner side of the door frame 12; and a door trim 131 arranged below the window WF/WR on the inner side of the door frame 12.

Each door frame 12 is made of a sheet metal and its individual parts are arranged in the peripheral edge encircling the window WF/WR as in the embodiments described hereinbefore. Each door frame 12 is provided with the upper edge portion 13, the front/rear vertical edge portions 14/15 and the lower edge portion 16. To the vicinities of the upper/lower edges of the rear vertical edge portion 15, there are mounted the apex portions 42/43 of the individual shielding member 41F/41R.

Each door frame garnish 121 is made of a synthetic resin such as a thermoplastic elastomer of olefin or the like and is constructed, as in the fourth embodiment, to have individual portions that are arranged on the peripheral edge on the upper side on the window WF/WR. Specifically, each garnish 121 is constructed to include an upper edge portion 122 and front/rear vertical edge portions 123 and 124. The upper edge portion 122, the front vertical edge portion 123 and the rear vertical edge portion 124 are formed to have such generally U-shaped sections as can be fitted on the inner sides of the upper edge portion 13, the front vertical edge portion 14 and the rear vertical edge portion 15 of the door frame 12 in the peripheral edge of the window WF/WR (as referred to FIG. 38).

Figure 38:
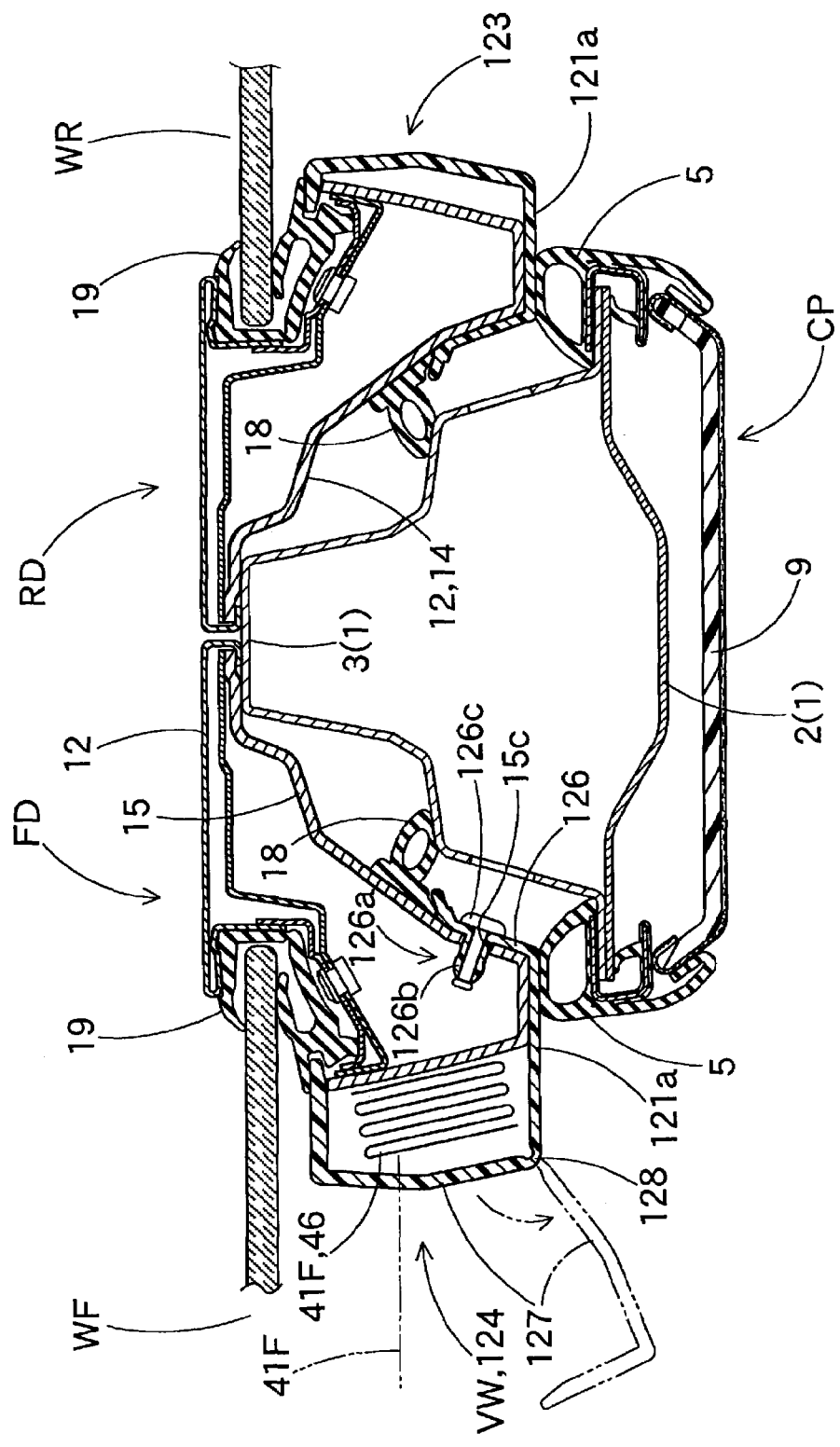
FIG. 38 is a schematic section of a portion XXXVIII—XXXVIII of FIG. 34.
Figure 39:
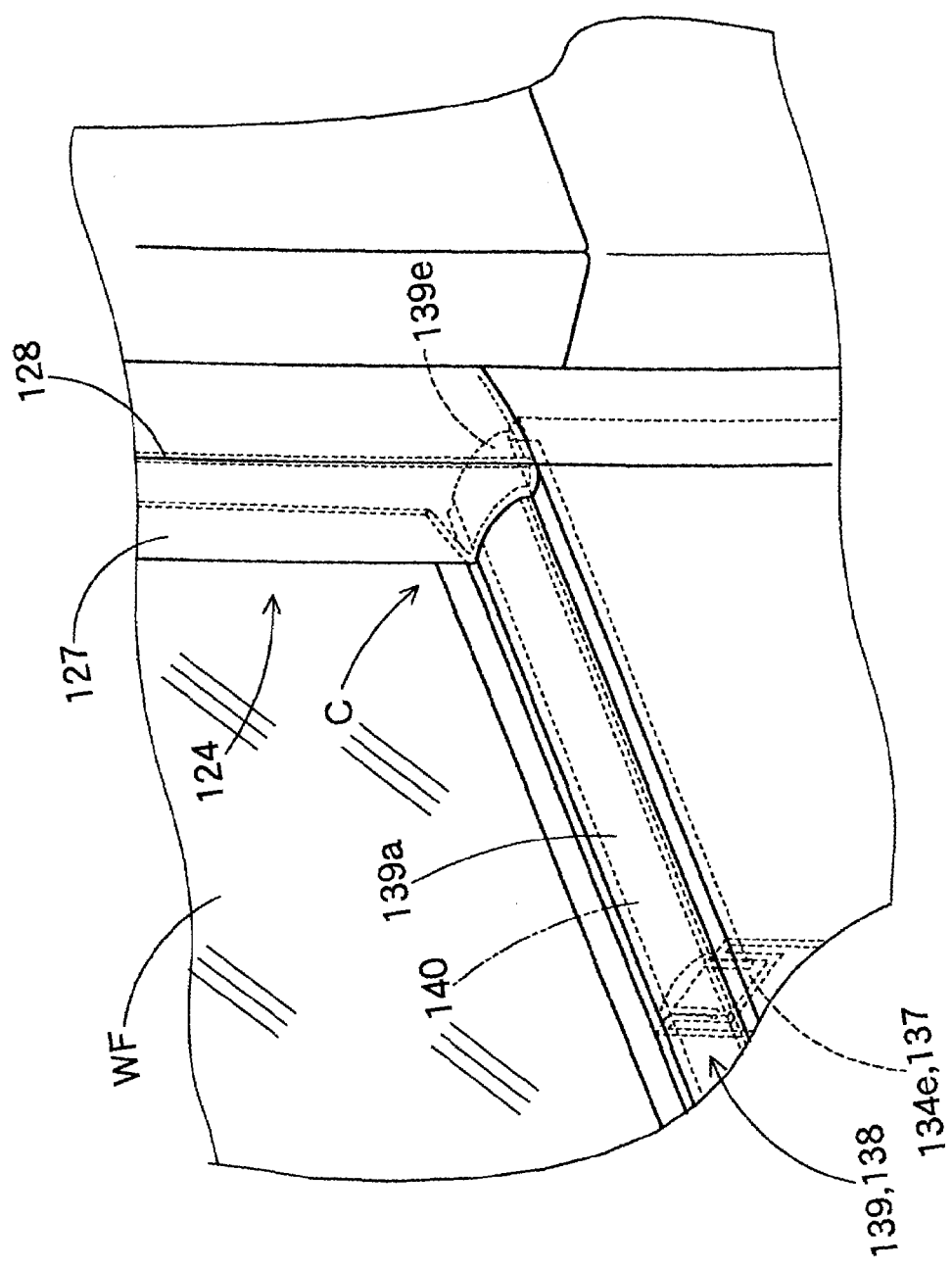
FIG. 39 is a perspective view of a portion near the rear lower corner of a window peripheral edge.

In the rear vertical edge portion 124 of the garnish 121 for covering the housed shielding member 41F/41R, as shown in FIGS. 38 and 39, there is arranged a door portion 127 which is pushed and opened by the shielding member 41F/41R being let off. The leading end side of the section of the door portion 127 is directed to the outer side. Moreover, the door portion 127 is provided with such a thin hinge portion 128 at the end portion on the inner side that the door portion 127 may be easily opened. On the side of a base portion 126 of the garnish rear vertical edge portion 124 on the side apart from the door portion 127, as shown in FIG. 38, there is formed a clip portion 126a. This clip portion 126a is of a push-and-expand type for mounting the garnish 121 on the rear vertical edge portion 15 of the door frame 12. The clip portion 126a is constructed of a cylindrical retaining leg 126b and a core member 126c. When the clip portion 126a is to be used, the retaining leg 126b is inserted into a retaining hole 15c of the rear vertical edge portion 15. The core member 126c is inserted into that retaining leg 126b. At this time, the retaining leg 126b is diametrically expanded to improve the retaining strength to the peripheral edge of the retaining hole 15c. Moreover, the vertical edge side housed portion 45 of each folded shielding member 41 is housed between the door portion 127 and the rear vertical portion 15 of the door frame 121 while being covered on its front side with the door portion 127.

Here, in case the garnish 121 is made of a synthetic resin, as has been described hereinbefore, the vicinities of the door portion 127 and the hinge portion 128 are formed as the soft portion of such a soft synthetic resin such as a thermoplastic elastomer of olefin or the like so that the door portion may be easily opened at the time of expansion of the shielding member 41. On the other hand, the remaining portion is formed as the general portion (or the hard portion) of such a hard synthetic resin such as polypropylene as to retain the strength. Moreover, the garnish 121 may be made of a two-color molded part having a compatibility to each other.

As shown in FIGS. 34 to 37, each door trim 131 is constructed of a lower trim 132 positioned on the lower side and an upper trim 133 positioned on the upper side of the lower trim 132. This lower trim 132 is constructed of a base portion 132a and a surface skin 132b. The base portion 132a is made of a hard synthetic resin such as polypropylene, and the surface skin 132b covers the base portion 132a and is formed of a thermoplastic elastomer such as olefin or styrene, fabric or leather.

Figure 36:
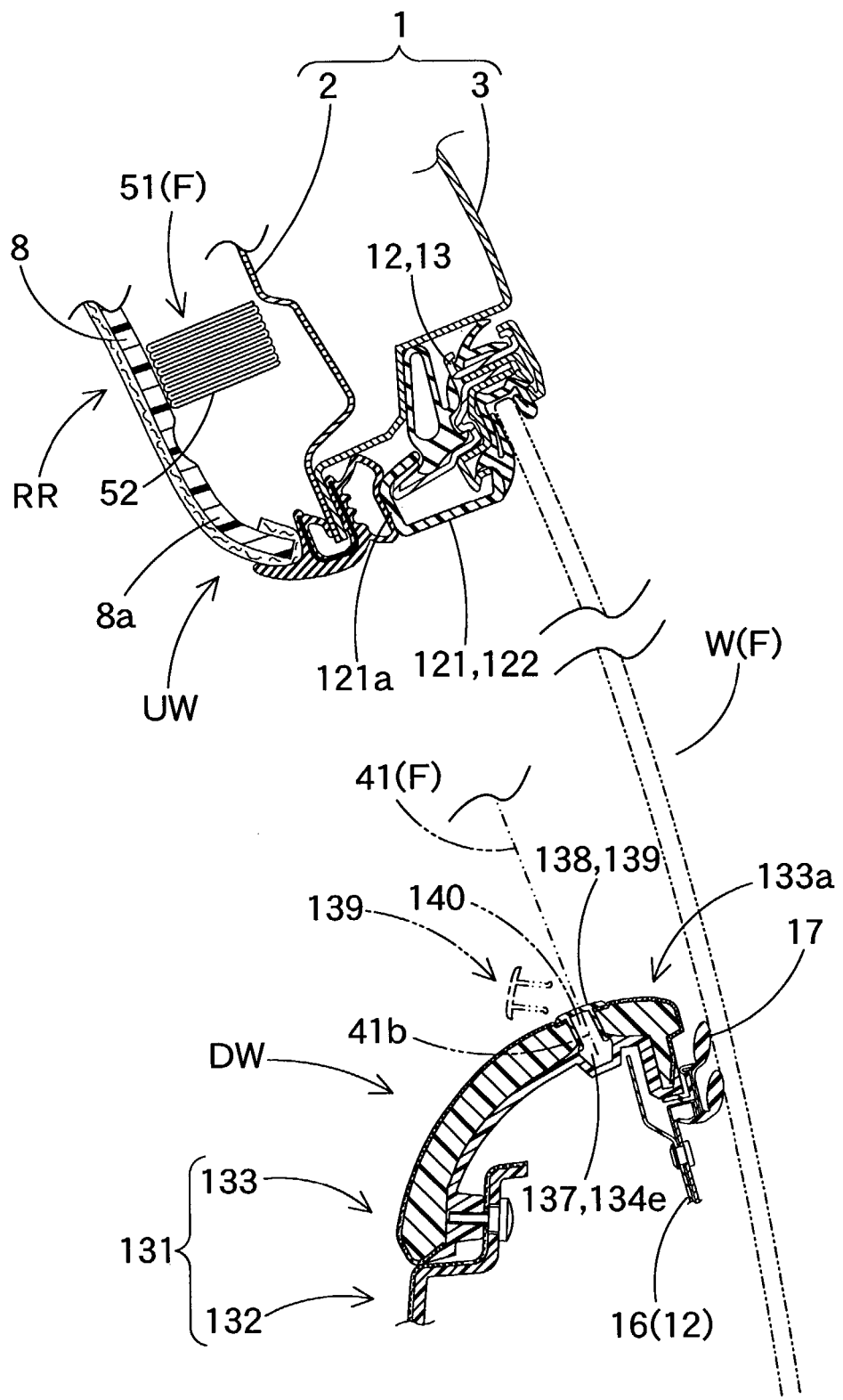
FIG. 36 is a schematic section of a portion XXXVI—XXXVI of FIG. 34.
Figure 37:
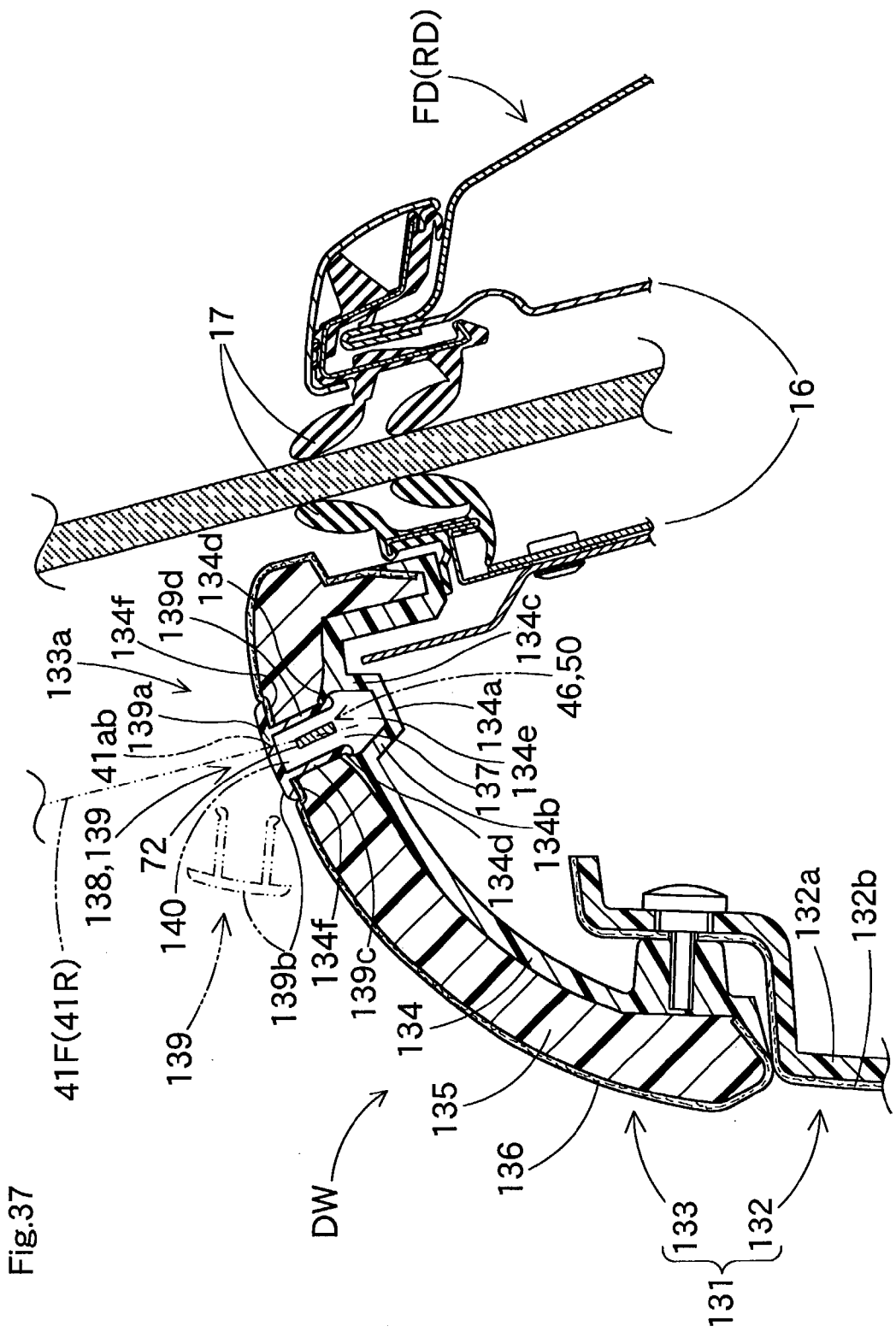
FIG. 37 is an enlarged schematic section showing a portion of an upper trim of FIG. 36.

The upper trim 133 is of a three-layered structure of a base portion 134, a surface skin 136 and a foamed layer 135. The base portion 134 is made of a hard synthetic resin such as polypropylene. The surface skin 136 is formed of a thermoplastic elastomer such as olefin or styrene, fabric or leather to cover the surface on the inner side. The foamed layer 135 is sandwiched between the surface skin 136 and the base portion 14 and is formed of polyurethane. On the side of the upper face 133a of the upper trim 133, as shown in FIGS. 36 and 37, there are formed a moving passage 137 and a closing portion 138. The moving passage 137 allows the movement of the vicinity of a connection portion 50 between the let-off means 48 and the shielding member 41. The closing portion 138 is arranged over the moving passage 137 and can form an opening 140. Here, this upper trim 133 corresponds to a garnish for covering the inner side of the lower edge portion DW of the peripheral edge of the window WF/WR.

The closing portion 138 of the sixth embodiment is arranged on the side of the upper face 133a of the upper trim 133 and is constructed of a cap 139. This cap 139 is removably mounted on the peripheral edge of a groove 134e formed in the base portion 134. The groove 134e constructs the moving passage 137 and is constructed of the bottom wall 134a and the side walls 134b/134c of the base portion 134, as shown in FIG. 37. The side walls 134b/134c are extended upward from the two sides of the inner/outer side portions of the bottom wall 134a. Moreover, the groove 134e is arranged to extend forward from the rear lower corner C (as referred to FIGS. 1 and 2) of the peripheral edge of the window WF/WR along the lower edge portion DW of the peripheral edge of the window WF/WR. Moreover, the groove 134e extends to the arrangement position of the body 71 of the pretensioner 70. Moreover, the opening 140 is so formed that the cap 139 comes off the base portion 134 to open the portion over the moving passage 137. At the opposed positions of the upper ends of the two side walls 134b/134c of the base portion 134, there are formed retaining pawls 134d. These retaining pawls 134d retain the later-described retaining leg portions 139c/139d of the cap 139. Each retaining pawl 134d is formed intermittently along the side walls 134b/134c instead of over the entire length thereof.

The cap 139 is formed of a soft material such as rubber or a thermoplastic elastomer into a long shape having an inverted U-shaped section having a cover portion 139a and the retaining leg portions 139c/139d. The retaining leg portions 139c/139d extend downward from the inner side portion and the outer side portion of the cover portion 139a. This cover portion 139a closes the opening 140 when the individual retaining leg portions 139c/139d are retained on the retaining pawls 134d of the base side walls 134b/134c. At the closing time, the cover portion 139a closes the opening 140 together with the recesses 134f of the peripheral edge of the groove 134e. The cap 139 is so arranged that its rear end 139e goes slightly below the door portion 127 of the garnish rear vertical edge portion 124, as shown in FIG. 39.

On the front side of the moving passage 137 having the groove 134e, there is housed the tension member 72 of the pretensioner 70 with the shielding member 41F/41R being housed. On the rear side of the moving passage 137, on the other hand, there is housed the lower edge side housed portion 46 of the shielding member 41F/41R. When the tension member 72 is pulled forward at the action time of the pretensioner 70, the cap 139 is pushed out by the vicinity of the connection portion 50 (i.e., the lower end 41ab of the later-described oblique side 41a of the shielding member 41, in the embodiment). Specifically, the vicinity of the connection portion 50 between the tension member 72 and the shielding member 41 pushes out the cap 139 to disengage the retaining leg portions 139c/139d from the retaining pawls 134d so that the cap 139 comes out of the peripheral edge of the groove 134e.

Here, the side of the body 1 of the peripheral edge of the door FD/RD is constructed by arranging the inner panel 2 and the outer panel 3, as shown in FIG. 38. On this side of the body 1, moreover, there is arranged the weather strip 5 for sealing the outer peripheral edge of the door FD/RD. Moreover, the weather strip 5 is pressed, when the door FD/RD is closed, against the apex portion 121a of the garnish 121 protruding to the inner side or against the front edge, the lower edge and the rear edge of the lower side of the door FD/RD away from the garnish 121. The apex portion 121a of the garnish 121 protruding to the inner side is arranged at the upper edge portion 122, the front vertical edge portion 123 and the rear vertical edge portion 124.

As in each of the embodiments, each shielding member 41 (41F/41R) is so formed of a flexible cloth of polyester yarns or polyamide yarns as to shield the window WF/WR, as shown in FIGS. 34 and 35. The major part of the shielding member 41F/41R, as designated by numeral 45, is housed in the vertically extending vertical edge portion VW on the back side of the peripheral edge of the window WF/WR, and the remaining portion 46 is housed in the lower edge portion DW in the peripheral edge of the window WF/WR. Each vertical edge side housed portion 45 is folded and housed between the rear vertical edge portion 15 of the door frame 12 and the rear vertical edge portion 124 of the door frame garnish 121. Each lower edge side housed portion 46 is housed in the groove 134e (or the moving passage 137) on the side of the upper face 133a of the upper trim 133 of the door trim 131.

As in each of the embodiments, each shielding member 41F/41R is formed into a generally triangular sheet shape having the apex portions 42/43/44, the oblique side 41a and the lower edge portion 41b. Moreover, the upper and lower apex portions 42/43 are fixed at the upper and lower portions of the rear vertical edge portion 15 of the door frame 12 in the vertical edge portion VW, and the leading end apex portion 44 is connected to the leading end 72a of the tension member 72 of the pretensioner 70.

As shown in FIG. 35, moreover, each shielding member 41F/41R is housed in an inverted L-shape composed of the vertical edge side housed portion 45 and the lower edge side housed portion 46. This lower edge side housed portion 46 is covered with the cap 139. The shielding member 41F/41R is folded to take such a folding-fan shape on the upper apex portion 42 of the shielding member 41 in the flatly expanded state that the folding width is larger on the side of the lower edge portion 41b than on the side of the upper apex portion 42.

Here, the lower edge side housed portion 46 of each shielding member 41 in the housed state is housed in about one third to one fifth of the entire length of the groove 134 on the side closer to the garnish rear vertical edge portion 124.

As in the third embodiment, the pretensioner 70 of the let-off means 48 is constructed of the body 71 and the flexible tension member 72. The body 71 is constructed by using a gas generator having an electric motor, restoring force of a spring, an electromagnetic solenoid and a clutch mechanism so as to tense the tension member 72 instantly. The body 71 is mounted at the lower edge portion DW of the peripheral edge of the window WF/WR and on the inner side face of the door frame lower edge portion 16.

As in each of the embodiments, the airbags 51F/51R are made so separate and independent of each other as to be inflated into a bag shape with the inflating gas from the inflator 58. The airbag 51F/51R is provided with the body portion 52, the gas inlet portion 53 and the mounting portion 54. The airbag 51F/51R is arranged in the roof side rail portion RR by fixing each of the mounting portions 54 together with the mounting brackets 55 on the inner panel 2 on the side of the body 1 by means of bolts 56.

At the time of expansion/inflation of each airbag 51F/51R, the lower end side of the body portion 52 can swing as a free end to the inner side or the outer side in the direction generally perpendicular to the window WF/WR.

In each of the embodiments, moreover, the airbag 51F/51R is folded in the bellows shape from the lower end side to the upper end side of the body portion 52 and is housed in the upper edge portion UW in the peripheral edge of each window WF/WR. The airbag 51F/51R thus housed is covered with the roof head lining 8 on the inner side of the roof side rail portion RR. In the lower edge of the roof head lining 8, there is arranged the door portion 8a which can be opened to the inner side. At the expansion/inflation time, moreover, the airbag 51F/51R pushes and opens the door portion 8a and protrudes downward so as to be interposed between an occupant and the shielding member 41F/41R.

As in each of the embodiments, inflator 58 is mounted as a cylinder type on the inner panel 2 of the roof side rail portion RR by using the mounting bracket 59 and the bolts 60. The inflator 58 is made into a dual type, and discharges an inflating gas from its two ends to expand and inflate the airbags 51F/51R simultaneously.

Here will be described how to mount the occupant restraining device S6 of the sixth embodiment on the vehicle. Each shielding member 41F/41R is folded in a folding-fan shape on the upper apex portion 42, and the folded shielding member 41F/41R is then wrapped with a plurality of not-shown breakable tape members for preventing itself from collapsing. Then, the shielding member assembly is prepared by mounting the leading end 72a of the tension member 72 of the pretensioner 70 on the leading end apex portion 44. In this folded state, the folded portion 45 from the upper apex portion 42 to the lower apex portion 43 provides the vertical edge side housed portion 45, and the folded portion from the lower apex portion 43 to the leading end apex portion 44 provides the lower edge side housed portion 46. This lower edge side housed portion 46 is housed in the grooves 134e (or the moving passage 137) of the upper trim 133.

After this, the upper apex portion 42 of each shielding member 41 is fixed on the upper portion of the door frame rear vertical edge portion 15, and the lower apex portion 43 of the shielding member 41 is fixed on the lower portion of the door frame rear vertical edge portion 15. Moreover, the pretensioner body 71 is fixed at a predetermined position of the lower edge portion 16 of the door frame 12. While the lower trim 132 and the upper trim 133 of the door trim 131 being assembled with the door frame lower edge portion 16, the tension member 72 and the lower edge side housed portion 46 of the shielding member 41 are housed in the moving passage 137 having the groove 134e. Moreover, the cap 139 is assembled with the portion of the base portion 134 by retaining the retaining leg portions 139c/139d on the retaining pawls 134d to close the opening 140. When the garnish 121 is assembled with the door frame 12, it is possible to complete the assembly of the door FD/RD and the assembly of the shielding member assembly with the door FD/RD.

Here will be described how to mount the airbag 51F/51R on the vehicle. Each airbag 51F/51R is folded and is wrapped with not-shown breakable tape members so that it may not collapse. Next, the mounting bracket 55 is mounted on each mounting portion 54 of the airbag 51F/51R. The airbag assembly is formed by connecting each gas inlet portion 53 to the inflator 58 and by mounting the mounting bracket 59 on the inflator 58. After this, the airbag device ABM can be mounted on the vehicle by fastening the individual mounting brackets 55/59 to the inner panel 2 by means of the bolts 56/60 and mounting the roof head lining 8 on the inner panel 2. Then, the occupant restraining device S6 and the airbag device ABM can be mounted on the vehicle by mounting the shielding member 41F/41R, the pretensioner 70, the airbag 51F/51R and the inflator 58 to the vehicle.

Here, the control device 64 and the rollover sensor 62 are separately mounted at the predetermined positions of the vehicle, and not-shown lead wires extending from the pretensioner 70 and the inflator 58 are connected with the control device 64 when the occupant restraining device S6 is to be mounted on the vehicle.

After the occupant restraining device S6 was mounted on the vehicle, moreover, the control device 64 activates each pretensioner 70 when it receives a rollover detection signal from the rollover sensor 62. Subsequently, each pretensioner 70 pulls the leading end 72a of the tension member 72 forward. At this time, the vicinity of the oblique side lower end 41ab of the shielding member 41F/41R interferes with the cover portion 139a of the cap 139 to push up the cap 139 out of the retaining pawls 134d of the base portion 134. Here, the vicinity of the oblique side lower end 41ab of the shielding member 41F/41R is located in the vicinity of the connection portion 50 between the shielding member 41F/41R and the tension member leading end 72a. When the cap 139 is released, moreover, the opening 140 is formed over the moving passage 137 of the upper trim 133 so that the oblique side 41a moves smoothly forward together with the tension member leading end 72a and the lower edge portion 41b in the moving passage 137 without interfering with the surrounding members. As a result, each shielding member 41F/41R pushes and opens the door portion 127 of the garnish rear vertical edge portion 124, as shown by double-dotted lines in FIGS. 35 to 37, from its folded state, and expands to shield the window WF/WR.

At this time, moreover, the pretensioner 70 moves the connection portion 50 between the tension member 72 and the shielding member 41 along the lower edge portion DW of the peripheral edge of the window WF/WR. Therefore, the shielding member 41, which has been housed in the vertical edge portion VW and the lower edge portion DW of the peripheral edge of the window WF/WR, is let off. Moreover, the shielding member 41 has its oblique side 41a let off obliquely upward from the rear lower corner C, at which the vertical edge portion VW and the lower edge portion DW of the peripheral edge of the window WF/WR intersect, thereby to shield the inner side of the window WF/WR.

Even if an occupant (e.g. a driver or a passenger) leans against the peripheral edge of the window WF/WR on the inner side, therefore, the shielding member 41 is smoothly let off while making an upward interference to raise the occupant.

Still moreover, the closing portion 138 formed of the cap 139 normally closes over the moving passage 137, so that it does not degrade the appearance of the lower edge portion DW of the peripheral edge of the window WF/WR.

Moreover, the control device 64 activates the inflator 58 when it receives a rollover detection signal from the rollover sensor 62. At this time, the inflating gas is discharged from the inflator 58 so that the airbag 51F/51R is inflated with the inflating gas admitted by the body portion 52. Then, the airbag 51F/51R breaks the not-shown tape members and pushes and opens the door portion 8a of the roof head lining 8 to expand and inflate downward to shield the window WF/WR on the inner side of the shielding member 41F/41R.

In the occupant restraining device S6 of the sixth embodiment, more specifically, the shielding member 41F/41R shields the window WF/WR on the inner side of the window WF/WR, and the airbag 51F/51R is interposed between the shielding member 41F/41R and the occupant on the inner side of the shielding member 41F/41R thereby to shield the window WF/WR. As a result, the occupant can be properly arrested by the shielding member 41 (41F/41R) and the airbag 51 (51F/51R).

Even if this occupant restraining device S6 of the sixth embodiment is mounted together with the airbag device ABM on the vehicle, therefore, the airbag device ABM can be arranged on the vehicle without any problem. Even if the occupant leans against the peripheral edge of the window WF/WR on the inner side, moreover, the shielding member 41F/41R can be smoothly let off to shield the window WF/WR. At the normal time, moreover, the lower edge portion DW in the peripheral edge of the window WF/WR is closed at the moving passage 137 by the closing portion 138 so that its appearance degradation is not invited. At the letting-off time of the shielding member 41F/41R, moreover, the closing portion 138 is removed so that the opening 140 is formed in the moving passage 137. Therefore, the connection portion 50 can smoothly move laterally so that the shielding member 41F/41R can shield the window WF/WR.

In the sixth embodiment, moreover, the shielding member 41F or the let-off means 48 is arranged not in the upper edge portion UW of the peripheral edge of the window WF/WR, on which the airbag device ABM is mounted, but in the lower edge portion DW or the vertical edge portion VW of the peripheral edge of the window WF/WR. Therefore, the shielding member 41 or the let-off means 48 hardly obstruct the mounting of the airbag 51F/51R on the vehicle even if it might be arranged in the door FD/RD or on the side of the body 1.

In the sixth embodiment, as in each of the embodiments, the shielding member 41F/41R is arranged, when housed, in the lower edge portion DW while extending from the vertical edge portion VW of the peripheral edge of the window WF/WR. In other words, the housed shielding member 41F/41R is housed not only in the vertical edge portion VW of the peripheral edge of the window WF/WR but also in the lower edge portion DW. Therefore, as compared with the case in which the whole shielding member 41F/41R is housed exclusively in the lower edge portion DW or in the vertical edge portion VW of the peripheral edge of the window WF/WR, the shielding member 41F/41R can be dispersed between the lower edge portion DW and the vertical edge portion VW in the peripheral edge of the window WF/WR. As a result, the shielding member 41F/41R can be housed easily coping with a limited space in the peripheral edge of the window WF/WR.

In the let-off means 48 of the six embodiment, moreover, the letting-off direction is set along the lower edge portion DW. The portion 50 of the shielding member 41F/41R to be moved at the letting-off time is housed in advance in the lower edge portion DW, and the let-off means 48 is connected to that portion 50. Therefore, the let-off means 48 can be minimized in its moving stroke so that it can be made simple and compact.

Here, the sixth embodiment has been exemplified by the construction in which the cap 139 constructing the closing portion 138 comes completely out of the peripheral edge of the moving passage 137 formed of the groove 134e of the upper trim 133 when forming the opening 140. However, the construction may be modified such that the cap 139 does not come off the upper trim 133 completely. For example, the end portion 139b (as referred to FIG. 37) on the inner side of the cover portion 139a is bonded to the surface skin 136 of the recess 134f by welding means using vibrations or adhering means using an adhesive. In this case, the cap 139 does not leave the upper trim 133 completely even if the cap 139 comes out to form the opening 140.

Figure 40:
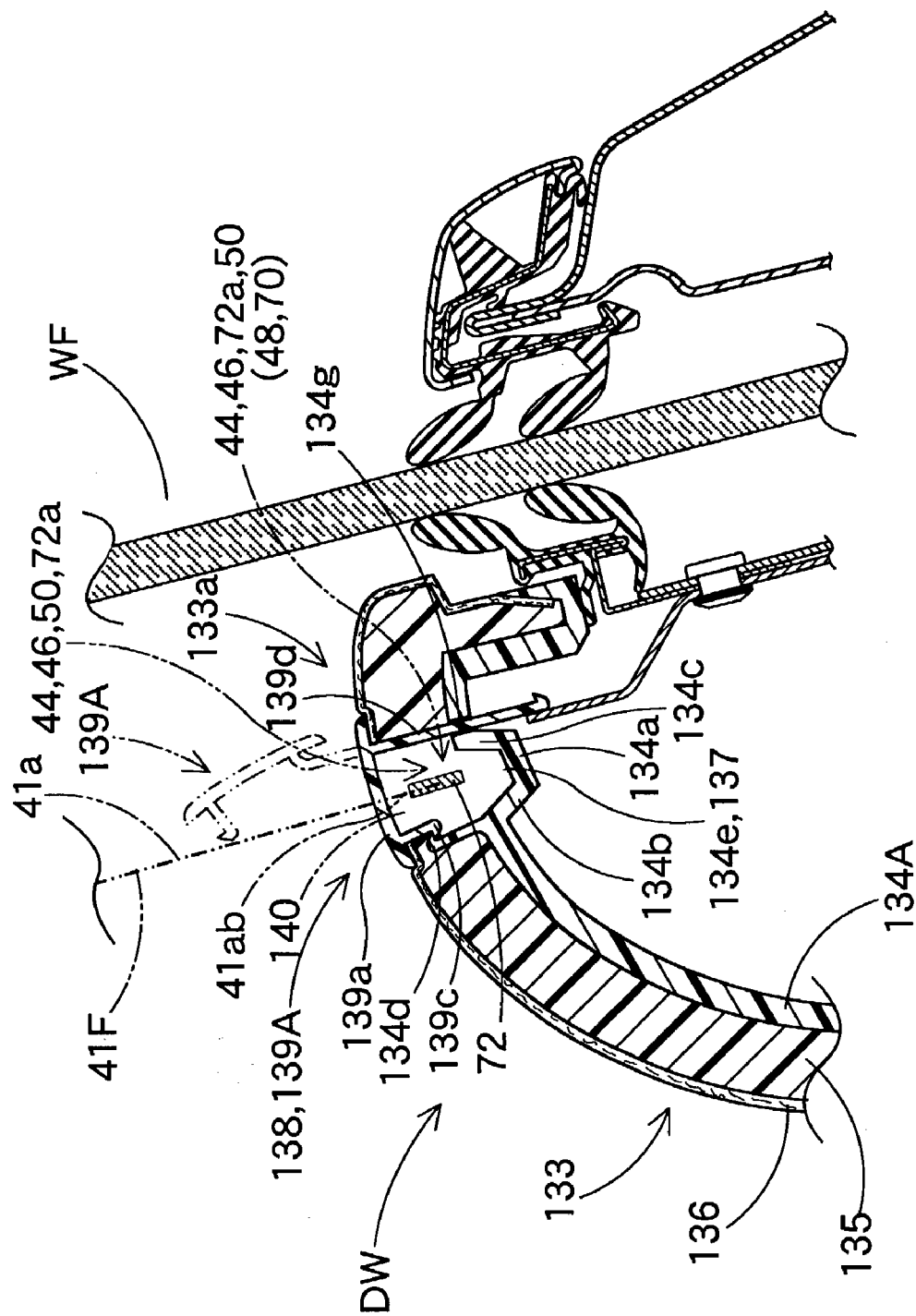
FIG. 40 is a schematic section showing a modification of the upper trim of the sixth embodiment.

On the other hand, one retaining leg portion 139*d* on the outer side or the inner side of a cap 139A is made partially long, as shown in FIG. 40. Moreover, the retaining leg portion 139*d* may be retained on a release preventing retaining portion 134*g*. This retaining portion 134*g* is provided at the base portion 134A of the upper trim 133. With this construction, when the opening 140 is to be formed, the retaining leg portion 139*d* is not completely extracted from the release preventing retaining portion 134*g* even if the retaining leg portion 134*c* comes out of the retaining pawl 134*d*. Therefore, the cap 139A does not leave the upper trim base portion 134A. The release preventing retaining portion 134*g* is formed of a hole for retaining the retaining leg portion 134*d* on its peripheral edge. Here, the cap 139A may be reversed from the shown embodiment to open the cover portion 139*a* to the inner side.

Figure 41:
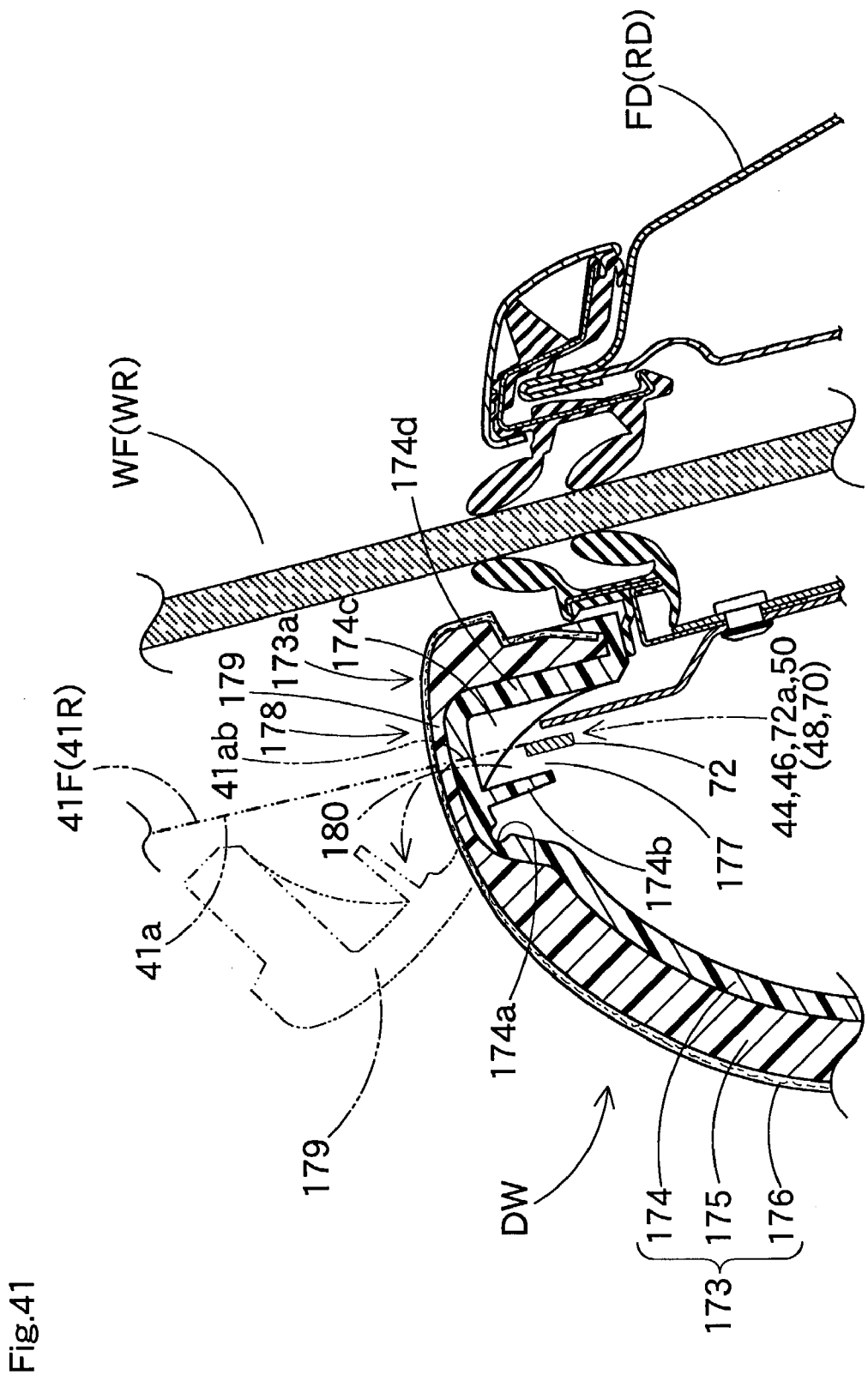
FIG. 41 is a schematic section showing another modification of the upper trim of the sixth embodiment.

Moreover, the upper trim 133 of the six embodiment may be constructed as an upper trim 173 shown in FIG. 41. In this upper trim 173, specifically, a closing portion 178 is formed of an openable door portion 179. This door portion 179 is arranged in the lower edge portion DW of the peripheral edge of the window WF/WR in the upper trim 173. This upper trim 173 is made of three layers of a base portion 174, a foamed layer 175 and a surface skin 176 like the upper trim 133. On the upper face 173*a* of the upper trim 173, the outer side end portion of the portion extending longitudinally of the vehicle along the lower edge portion DW is used as the door portion 179. This door portion 179 has a thin hinge portion 174*a* arranged at the base portion 174 which is positioned at the inner side end portion of the door portion 179. Moreover, the door portion 179 is opened toward the upper and inner side on the hinge portion 174*a*.

On the lower face of the door portion 179 in the closed state, moreover, there are formed a position regulating rib 174*b* and a guide rib 174*c*. The position regulating rib 174*b* extends downward from the base portion 174 and extends longitudinally of the vehicle along the lower edge portion DW of the peripheral edge of the window WF/WR. The guide rib 174*c* extends in a triangular sheet shape from the upper end of the rib 174*b* to the outer side wall 174*d* of the base portion 174. The guide rib 174*c* is arranged in plurality along the lower edge portion DW. Moreover, the space of the triangular section between the ribs 174*b*/174*c* forms a moving passage 177. This moving passage 177 allows the movement of the vicinity of the connection portion 50 between the pretensioner 70 as the let-off means 48 and the shielding member 41. In this moving passage 177, there are housed the tension member 72 of the pretensioner 70 and the lower edge side housed portion 46 of the shielding member 41. The position regulating rib 174*b* prevents the tension member 72 and the lower edge side housed portion 46 of the shielding member 41 from moving to the inner side. The guide ribs 174*c* are formed to interfere with the oblique side 41*a* to help the same rise and open the door portion 179. Specifically, the ribs 174*c* interfere with the oblique side 41*a* when the pretensioner 70 acts so that the vicinity of the lower end 41*ab* of the oblique side 41*a* in the vicinity of the connection portion 50 between the tension member 72*a* and the shielding member 41 advances and rises obliquely upward.

In this upper trim 173, the vicinity of the oblique side lower end 41*ab* of the shielding member 41 in the vicinity of the connection portion 50 interferes with the guide ribs 174*c* of the door portion 179 when the leading end 72*a* of the tension member 72 is pulled to move forward at the action time of the pretensioner 70. Moreover, the vicinity of the lower end 41*ab* pushes up and opens the door portion 179 to the inner side so that an opening 180 is formed over the moving passage 177 of the upper trim 173. Therefore, the oblique side 41*a* moves together with the tension member leading end 72*a* smoothly forward in the moving passage 177 without any interference so that each shielding member 41F/41R is expanded from its folded state to push and open the door portion 127 of the garnish rear vertical edge portion 124 thereby to shield the window WF/WR.

Here, the door portion 179 may be so reversed from the shown embodiment as to be opened to the outer side. Here, in this construction, the inner side end portion of the door portion 179 may be provided with a slit in between the body side of the upper trim 173 and itself so that it may be arranged separately from the body side of the upper trim 173. Alternatively, the later-described breakable portion may be provided at the inner side end portion of the door portion 179 of this construction so that the door portion 179 may be arranged continuously with the body side of the upper trim 173.

Figure 42:
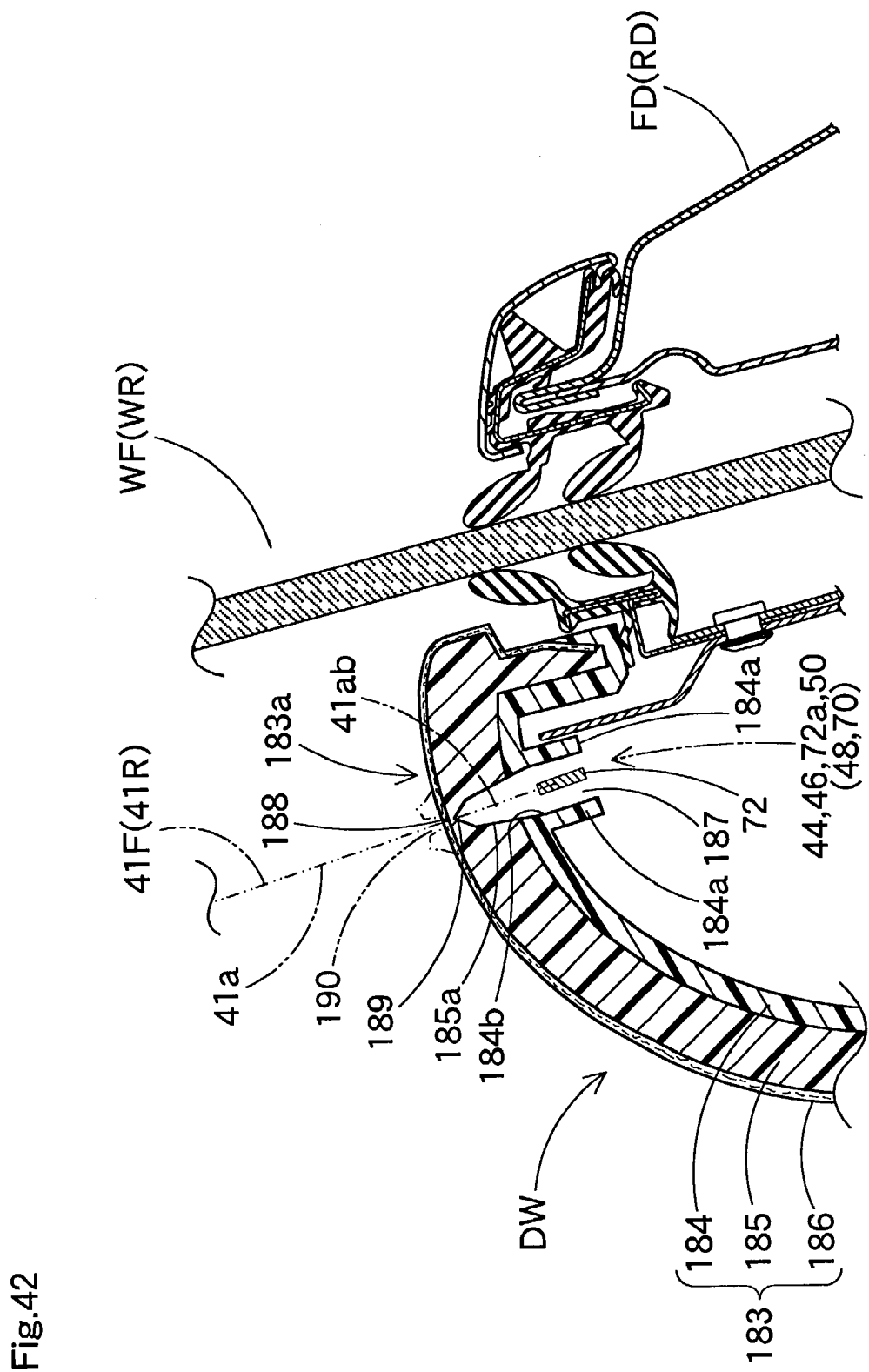
FIG. 42 is a schematic section showing still another modification of the upper trim of the sixth embodiment.

Moreover, the upper trim 133 of the sixth embodiment may be constructed into an upper trim 183, as shown in FIG. 42. In this upper trim 183, a closing portion 188 is made of the breakable portion 189. This breakable portion 189 is arranged in the lower edge portion DW of the peripheral edge of the window WF/WR in the upper trim 183. This upper trim 183 is constructed of a three-layered structure of a base portion 184, a foamed layer 185 and a surface skin 186 like the upper trims 133/173. On the side of an upper face 183*a* of this upper trim 183, the portion extending along the lower edge portion DW and longitudinally of the vehicle is provided as the portion 189 to be broken. This portion 189 is provided with a slit 184*b* in the base portion 184 so that it may be easily broken. Moreover, the portion 189 to be broken is made to have a two-layered structure of the foamed layer 184 and the surface skin 186. In the portion of the slit 184*b* in the foamed layer 185, there is further formed a recess 185*a* which is recessed upward.

On the peripheral edge of the slit 184*b* of the portion 189 to be broken, there are formed position regulating ribs 184*a*/184*a* extending downward from the base portion 184 while opposing each other. The ribs 184*a*/184*a* are extended longitudinally of the vehicle along the lower edge portion DW of the peripheral edge of the window WF/WR. Moreover, the portion including the recess 185*a* in the vicinity between those ribs 184*a*/184*a* forms a moving passage 187. This moving passage 187 allows the movement of the vicinity of the connection portion 50 between the pretensioner 70 and the shielding member 41. In this moving passage 187, there are housed the tension member 72 of the pretensioner 70 and the lower edge side housed portion 46 of the shielding member 41.

In this upper trim 183, if the leading end 72*a* of the tension member 72 is pulled to move forward on the action time of the pretensioner 70, the vicinity of the oblique side lower end 41*ab* of the shielding member 41 near the connection portion 50 interferes with the foamed layer 185 and the surface skin 186 of the portion 189 to be broken. Then, the vicinity of the lower end 41*ab* breaks the foamed layer 185 and the surface skin 186 of the portion 189 to be broken, so that an opening 190 is formed over the moving passage 187 of the upper trim 183. Therefore, the oblique side 41*a* moves together with the tension member leading end 72*a* smoothly without any interference forward in the moving passage 187 so that each shielding member 41F/41R is expanded from its folded state to push and open the door portion 127 of the garnish rear vertical edge portion 124, thereby to shield the window WF/WR.

Figure 43:
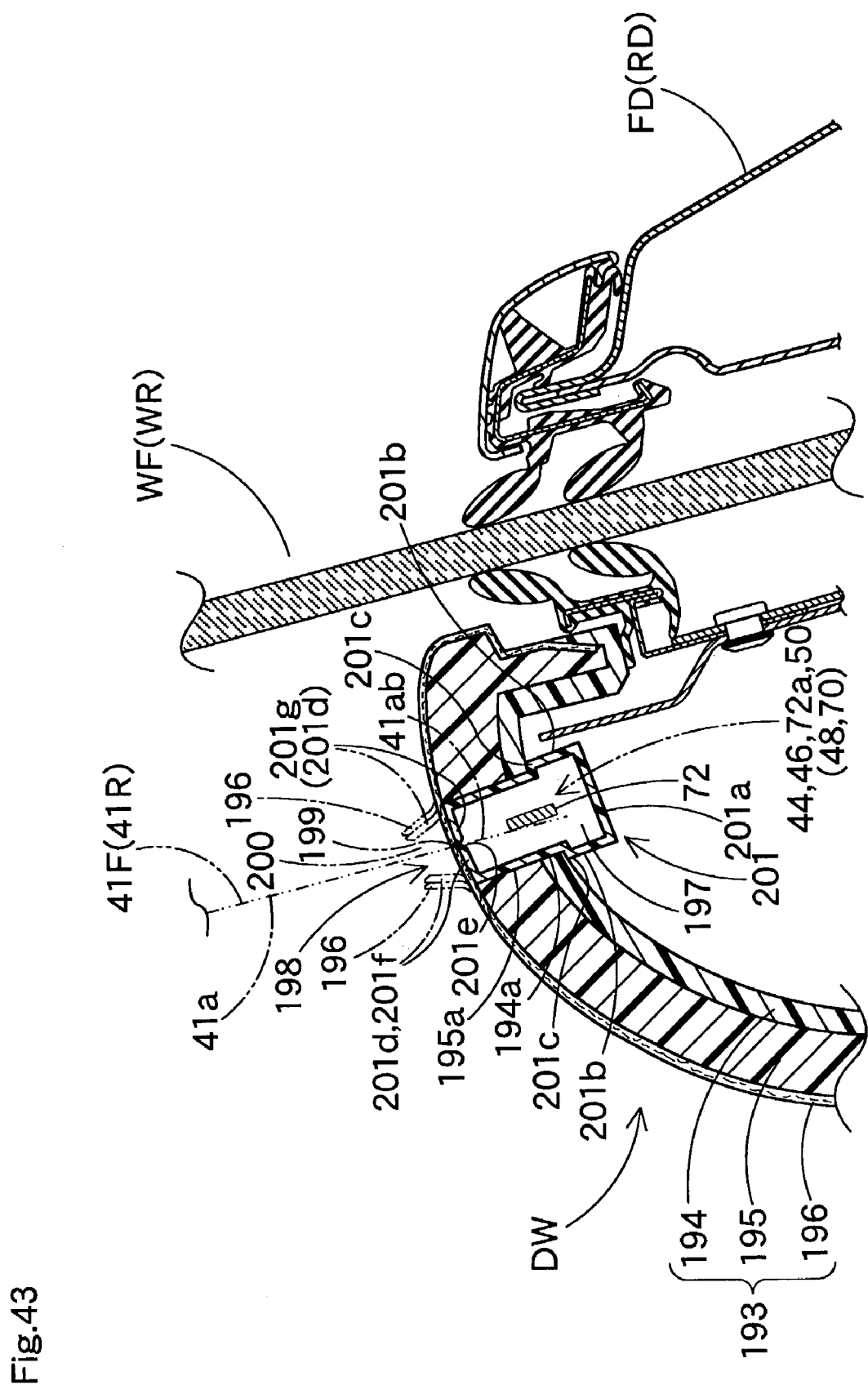
FIG. 43 is a schematic section showing still another modification of the upper trim of the sixth embodiment.

Here, the construction may be modified, as shown in FIG. 43, in case the closing portion is constructed of the portion to be broken. A portion 199 to be broken as a closing portion 198 is arranged in an upper trim 193. The upper trim 193 is arranged in the lower edge portion DW of the peripheral edge of the window WF/WR. This upper trim 193 is constructed of a three-layered structure of a base portion 194, a foamed layer 195 and a surface skin 196 like those of the upper trims 133/173/183. In the upper trim 193, moreover, the portion extending longitudinally of the vehicle along the lower edge portion DW is provided as the portion 199 to be broken on the side of an upper face 193a. This portion 199 to be broken is provided with slits 194a/195a in the base portion 194 and the foamed layer 195 so that it may be easily broken. Moreover, the part of the portion 199 to be broken is made into the two-layered structure of the surface skin 196 and the later-described case upper wall portion 201d.

A case 201 is formed of such a synthetic resin of a thermoplastic elastomer of olefin or the like as can be welded to the base portion 194 by vibrations and so on. The case 201 is formed into a generally square cylinder shape having a bottom wall portion 201a, side wall portions 201b/201b and an upper wall 201d. The side wall portions 201b/201b are extended upward from the inner/outer side end portions of the bottom wall portion 201a. The upper wall portion 201d connects the upper ends of the side wall portions 201b/201b to each other. Moreover, the upper wall portion 201d is provided with a thin strength-lowered portion 201e extending longitudinally of the vehicle along the lower edge portion DW. Moreover, the upper wall portion 201d is constructed to form door portions 201f/201g which are opened to the inner side and the outer side when the strength-lowered portion 201e is broken. On the outer sides of the side wall portions 201b/201b, there are formed step portions 201c which are to be welded to the base portion 194. Moreover, the inside of the case 201 forms a moving passage 197. This moving passage 197 allows the movement of the vicinity of the connection portion 50 between the pretensioner 70 and the shielding member 41. In this moving passage 197, there are housed the tension member 72 of the pretensioner 70 and the lower edge side housed portion 46 of the shielding member 41.

In this upper trim 193, the vicinity of the oblique side lower end 41ab of the shielding member 41 in the vicinity of the connection portion 50 interferes with the case upper wall portion 201d of the portion 199 to be broken, when the leading end 72a of the tension member 72 is pulled at the action time of the pretensioner 70 to move forward. Then, the vicinity of the lower end 41ab breaks the strength-lowered portion 201e and the surface skin 196 of the portion 199. Therefore, an opening 200 is formed over the moving passage 197 of the upper trim 193. As a result, the oblique side 41a moves together with the tension member leading end 72a smoothly without any interference forward in the moving passage 197, so that each shielding member 41F/41R is expanded from its folded state to push and open the door portion 127 of the garnish rear vertical edge portion 124 to shield the window WF/WR.

Figure 44:
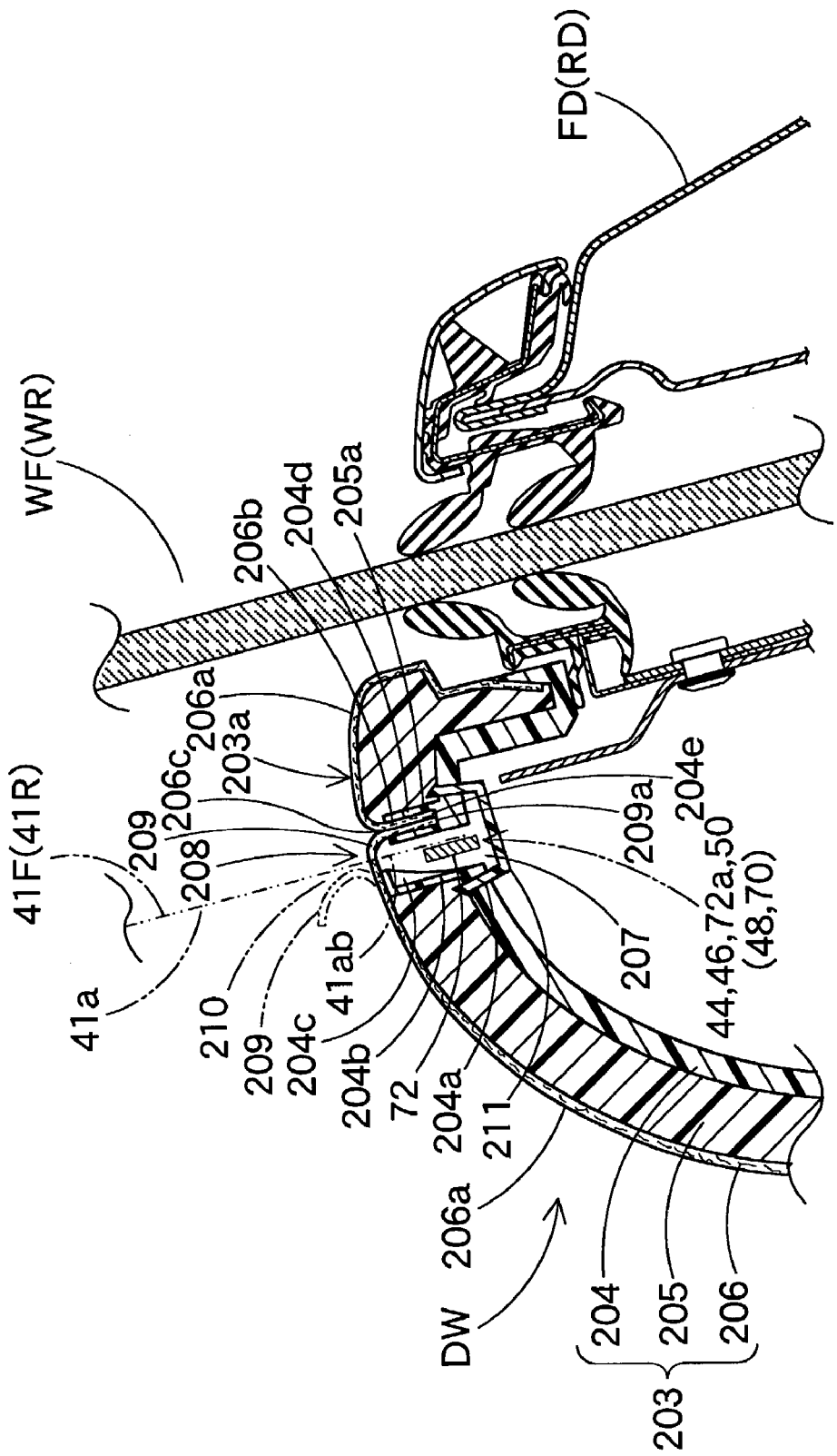
FIG. 44 is a schematic section showing still another modification of the upper trim of the sixth embodiment.

Still moreover, a closing portion 208 may be constructed as an upper trim 203 shown in FIG. 44. This closing portion 208 is constructed of a cover-shaped surface skin 209 of a surface skin 206. The cover-shaped surface skin 209 is arranged on the surface side of an upper trim upper face 203a forming the lower edge portion DW of the peripheral edge of the window WF/WR. The upper trim 203 is constructed of a three-layered structure having a base portion 204, a foamed layer 205 and a surface skin 206 like those of the upper trim 133. Moreover, the base portion 204 and the foamed layer 205 have slits 204a/205a formed in the portion of the closing portion 208. In the surface skin 206, there is formed a slit 206c which extends in the outer side edge over the slits 204a/205a and along the lower edge portion DW. Moreover, the surface skin 206 is formed to have a cover-shaped surface skin 206b and a body 206a. The cover-shaped surface skin 206b is arranged over the slits 204a/205a across the slit 206c. The body 206a is arranged to enclose the cover-shaped surface skin 209.

On one peripheral edge across the slit 204a of the base portion 204, e.g., on the inner side peripheral edge, there is formed a side wall 204b which extends upward. On the other peripheral edge, there is formed a side wall 204d which extends upward. The side wall 204b is formed to have an inverted L-shaped section. At the portion on the side of the slit 204a, there is formed a guide rib 204c which has such a triangular sheet shape as to make the clearance from the side wall 204d the narrower as it goes the more upward. This guide rib 204c is arranged in plurality along the lower edge portion DW. In the side wall 204d, there is formed a groove 204e which is opened upward. In this groove 204e, there are fitted the end portion 206b of the body 206a of the surface skin 206 and the end portion 209a of the cover-shaped surface skin 209. Here, the two end portions 206a/209a are so fitted in the groove 204a by means of an adhesive that the cover-shaped surface skin 209 can be peeled on the action time of the pretensioner 70 from the side of the body 206a. Below the slit 204a of the base portion 204, on the other hand, a cover 211 is so fixed on the base portion 204 as to close the slit 204a.

Moreover, the space between the side walls 204b/204d and between the cover 211 and the cover-shaped surface skin 209 forms a moving passage 207. This moving passage 207 allows the movement of the vicinity of the connection portion 50 between the pretensioner 70 as the let-off means 48 and the shielding member 41. In this moving passage 207, there are housed the tension member 72 of the pretensioner 70 and the lower edge side housed portion 46 of the shielding member 41.

In this upper trim 203, the vicinity of the oblique side lower end 41ab of the shielding member 41 near the connection portion 50 interferes with the cover-shaped surface skin 209, if the leading end 72a of the tension member 72 is pulled at the action time of the pretensioner 70 to move forward. Subsequently, the end portion 209a of the cover-shaped surface skin 209 leaves the end portion 206b of the surface skin body 206a. An opening 210 is formed over the moving passage 207 of the upper trim 203 because the vicinity of the lower end 41ab pushes up and opens the cover-shaped surface skin 209 to the inner side. Then, the oblique side 41a moves together with the tension member leading end 72a smoothly without any interference forward in the moving passage 207 so that each shielding member 41F/41R is expanded from its folded state to push and open the door portion 127 of the garnish rear vertical edge portion 124 thereby to shield the window WF/WR.

Here, the cover-shaped surface skin 209 may be so reversed from the shown embodiment as to be opened to the outer side.

In the occupant restraining device S6 of the sixth embodiment, on the other hand, the shielding member 41 is expanded to push and open the door portion 127 of the garnish rear vertical edge portion 124. Specifically, the shielding member 41 before let off can be covered with the door portion 127 of the garnish 121 and thus does not degrade the design of the inner peripheral edge side of the window WF/WR. It is natural that the shielding member 41 can be smoothly expanded to push and open the door portion 127. Moreover, this door portion 127 may be constructed, as shown in FIG. 45, such that a vertically extending thin portion 129 to be broken is provided at the peripheral edge of the door portion 127 in a rear vertical edge portion 124A and is broken at the expanding time of the shielding member 41 to push and open the door portions 127/127.

Figure 45:
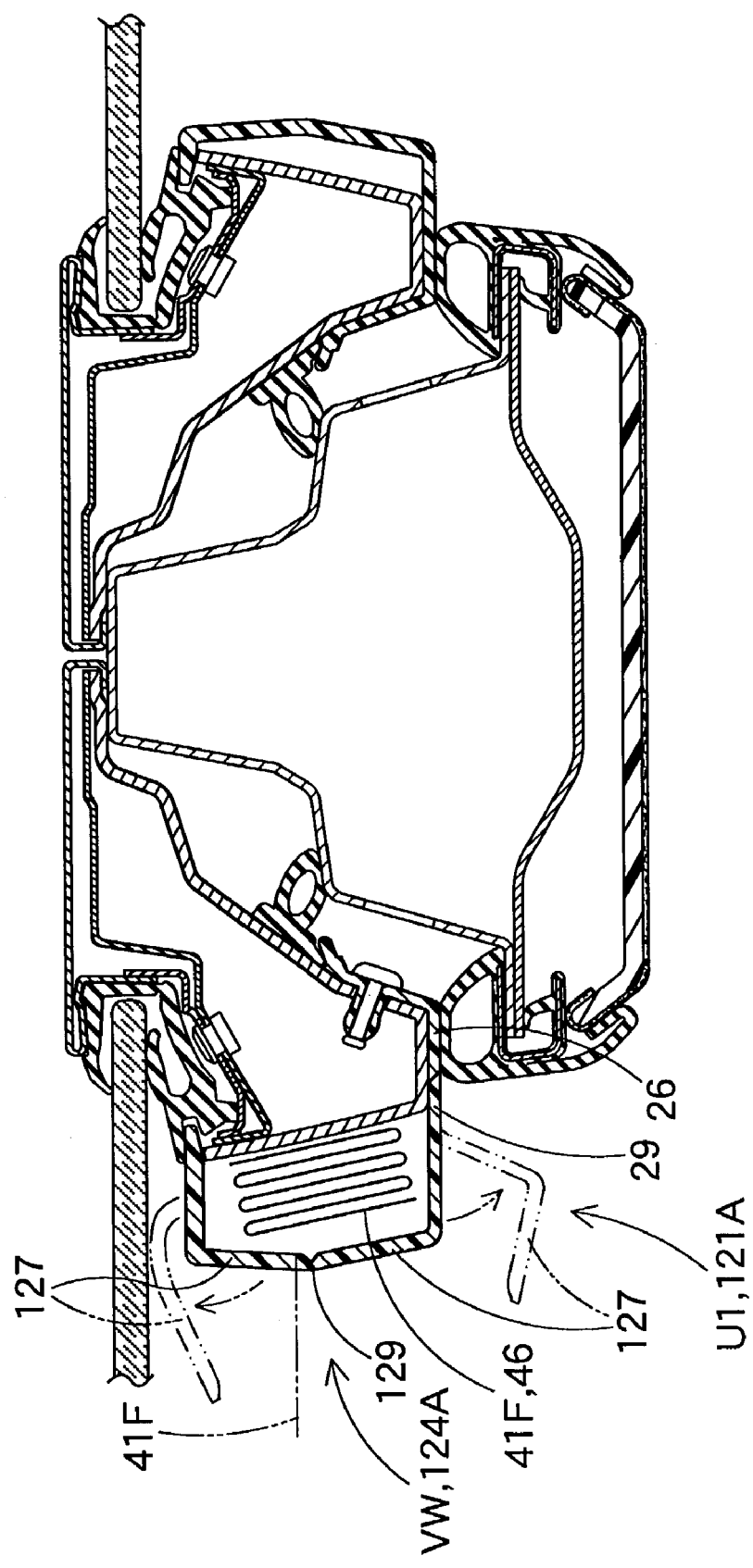
FIG. 45 is a schematic section showing a modification of a door frame garnish of the sixth embodiment.

Here, a garnish 121A shown in FIG. 45 is constructed to form a shielding member unit U1. On the other hand, the vicinity of the door portion 127 is formed as the soft portion 29 of a thermoplastic elastomer of polyolefin, and the remaining portion is formed as the general portion 26 of hard polypropylene. Thus, the garnish 121A is formed of a two-color molded part in which the soft portion 29 and the general portion 26 are integrally formed.

The sixth embodiment has been described on the case in which the shielding member 41F/41R and the airbag 51F/51R are activated when a rollover is detected. However, the construction may be modified such that the side collision sensor capable of detecting a side collision of the vehicle is connected with the control device 64 so that the shielding member 41 and the airbag 51 may be activated at the side collision time of the vehicle.

Figure 46:
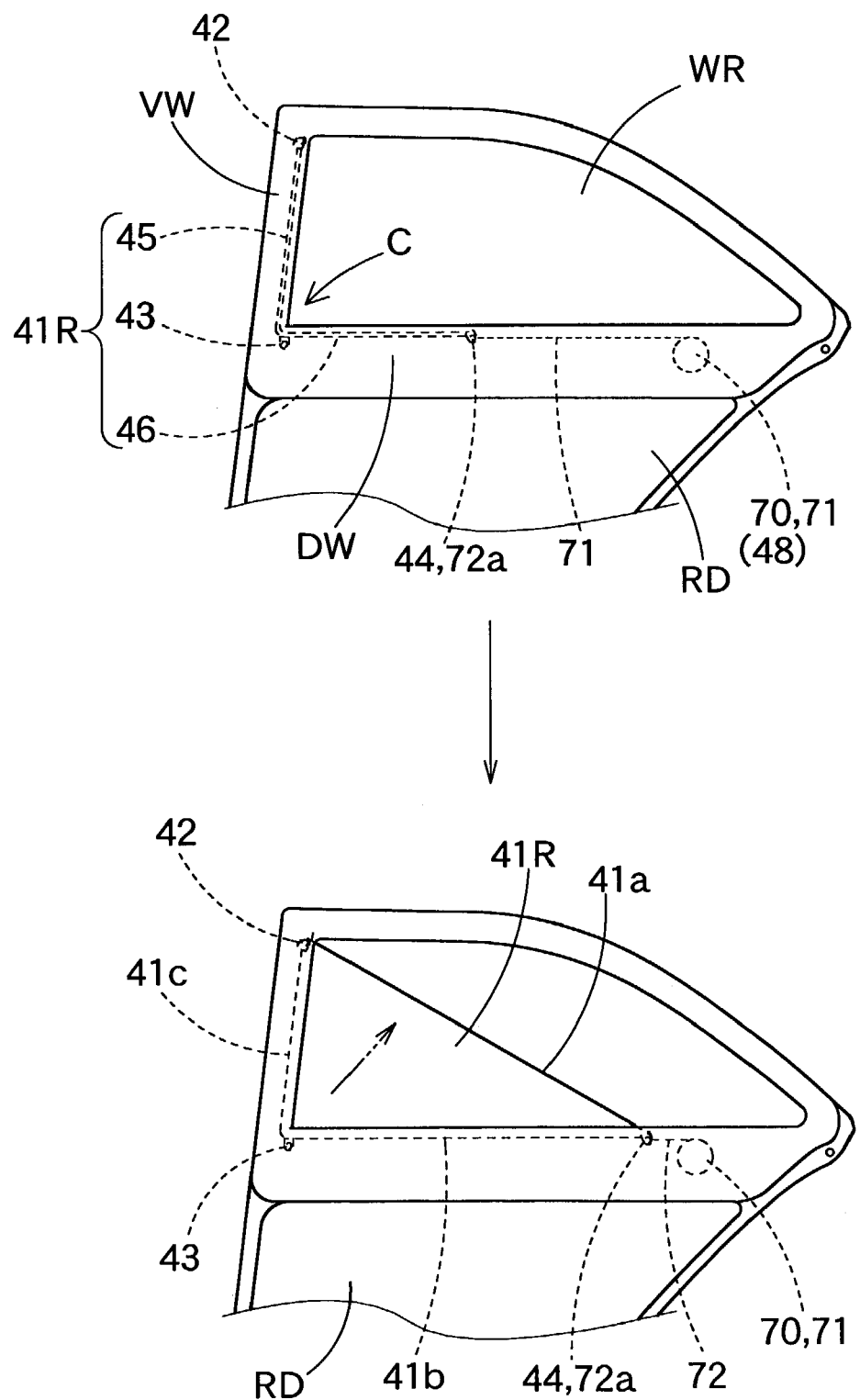
FIG. 46 presents diagrams showing a modification of a shielding member on the side of a rear door.

Moreover, each of the embodiments has been described on the case in which the shielding member 41/41F/41R/41S is housed from the vertical edge portion VW to the lower edge portion DW on the back side of the vehicle in the peripheral edge of the window WF/WR/WS. Like the rear door RD shown in FIG. 46, however, the shielding member 41R may be housed from the vertical edge portion VW to the lower edge portion DW on the front side of the vehicle. This mode can naturally be applied to the peripheral edge of the front door FD or the window on the side of the body 1.

Figure 47:
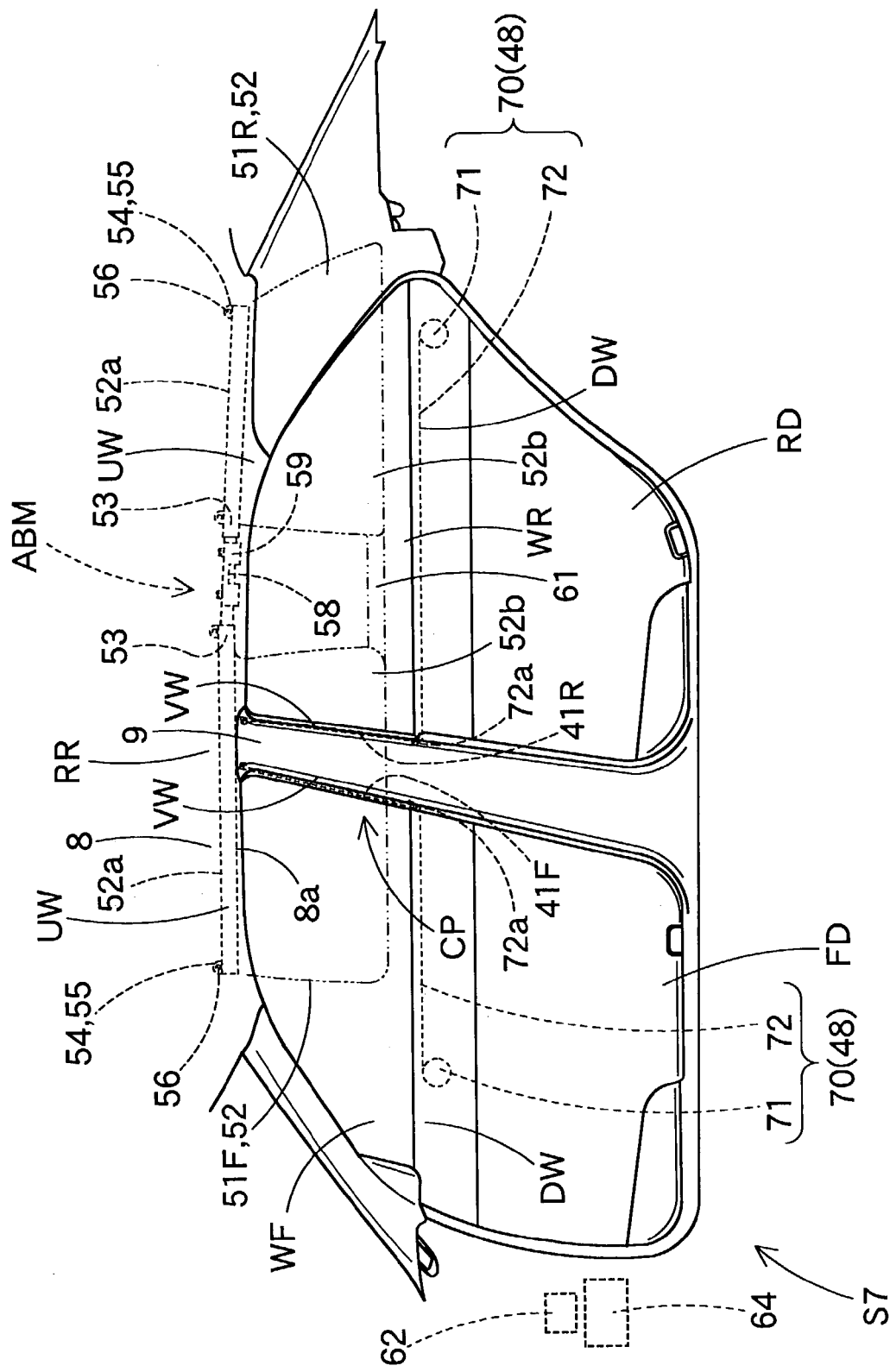
FIG. 47 is a front elevation showing an occupant restraining device of a seventh embodiment as taken from the inner side.
Figure 48:
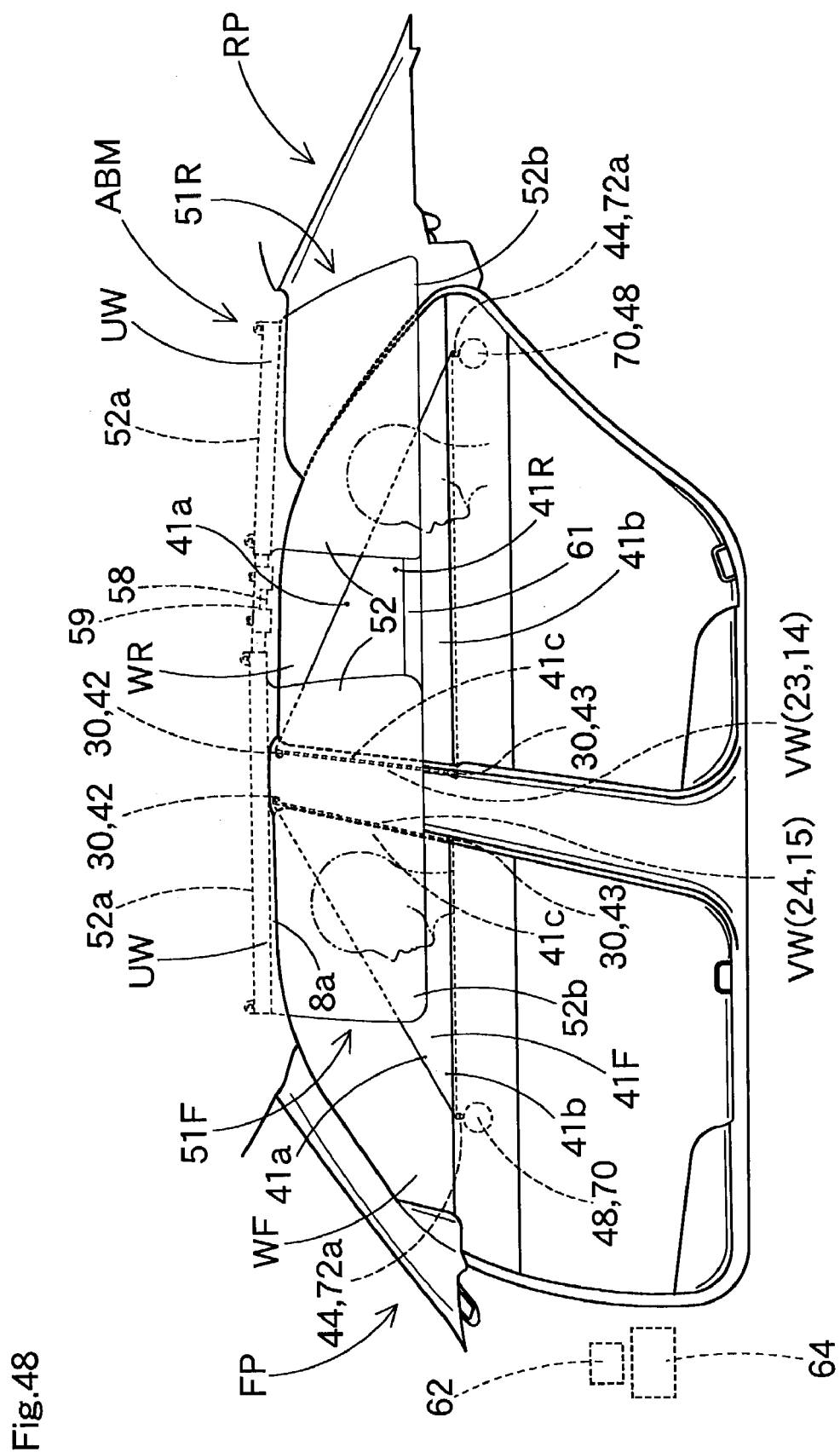
FIG. 48 is a front elevation showing the action time of the occupant restraining device of the seventh embodiment as taken from the inner side.

Like a seventh embodiment shown in FIGS. 47 and 48, still moreover, the shielding member 41F/41R may be housed only in the vertical edge portion VW of the peripheral edge of the window WF/WR on the rear side or the front side of the vehicle. The shielding member 41F in the shown embodiment is housed between the door frame rear vertical edge portion 15 and the door frame garnish rear vertical edge portion 24 in the vertical edge portion VW on the vehicle's rear side of the peripheral edge of the window WF. The shielding member 41R is housed between the door frame front vertical edge portion 14 and the door frame garnish front vertical edge portion 23 in the vertical edge portion VW on the vehicle's front side of the peripheral edge of the window WR. These shielding members 41F/41R can be folded, if the leading end apex portion 44 is brought close to the lower apex portion 43 by folding them in a bellows shape having crests and valleys parallel to the vertical edge portion 41c (as referred to FIGS. 23A and 24A and FIG. 15) from the expanded state, and can be housed in the individual vertical edge portions VW.

In each of the embodiments, the shielding member 41/41F/41R is formed into the sheet shape, but the shielding member may also be formed into a net shape, a mesh shape or a belt shape as long as it can shield the window WF/WR/WS. For example, the shielding member 41 may be formed into a belt shape having only the side of the oblique side 41a of the shielding member 41 or into a T-shaped belt having the oblique side 41a and a line joining the center of the oblique side 41a and the corner C. Moreover, the shielding member may be formed into a bag shape capable of admitting the inflating gas from the inflator instead of a sheet shape. In this modification, the shielding member may be directly expanded with the inflating gas from the inflator.

In each of the embodiments, however, the shielding member 41/41F/41R is made of a flexible thin sheet material so that it can be housed compactly by folding it.

In case the pretensioner 70 is used as the let-off means 48 of the shielding member 41, the tension member 72 itself may be used as a part of the shielding member 41.

Figure 49:
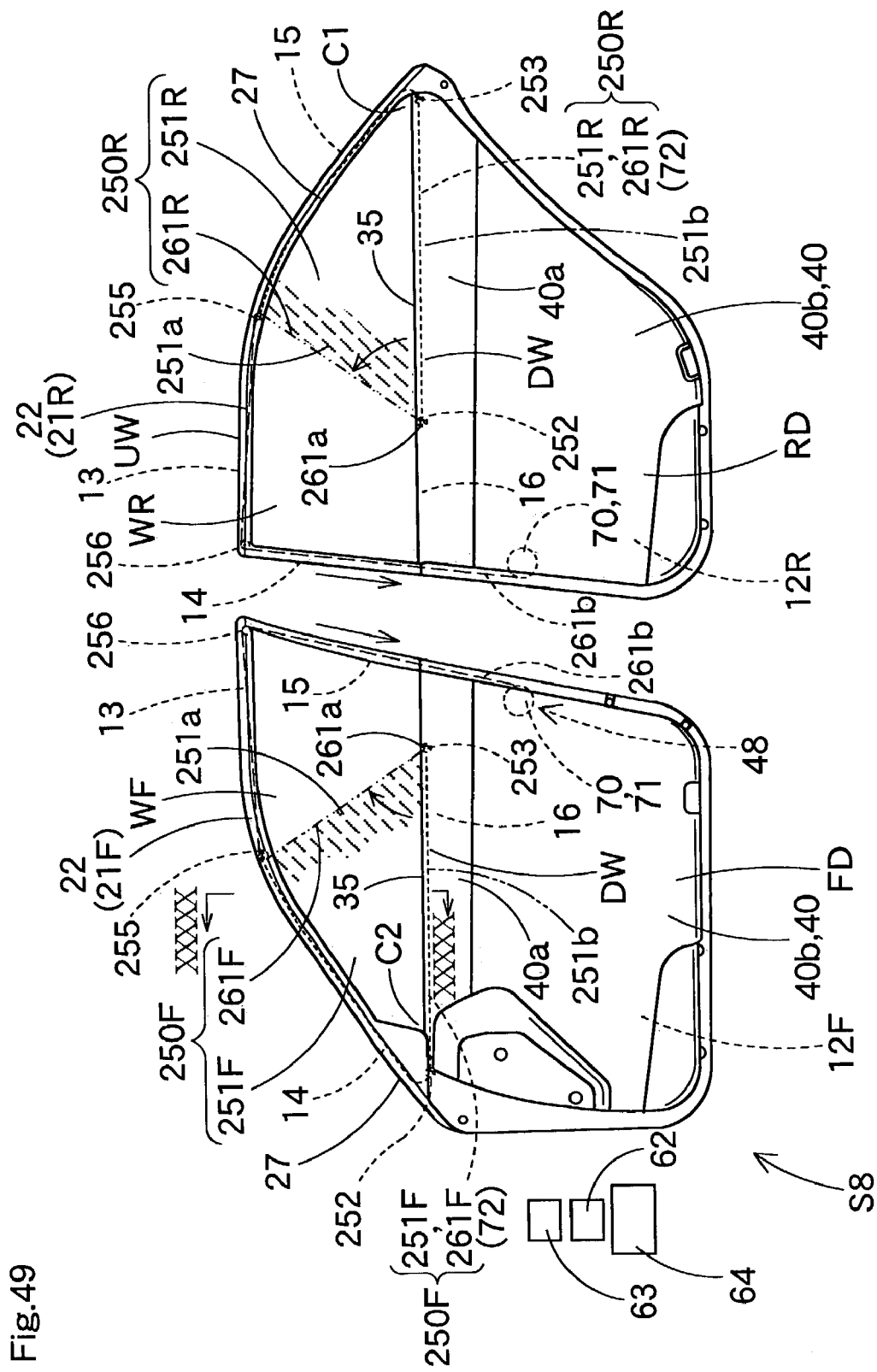
FIG. 49 is a front elevation showing an occupant restraining device of an eighth embodiment as taken from the inner side.
Figure 50:
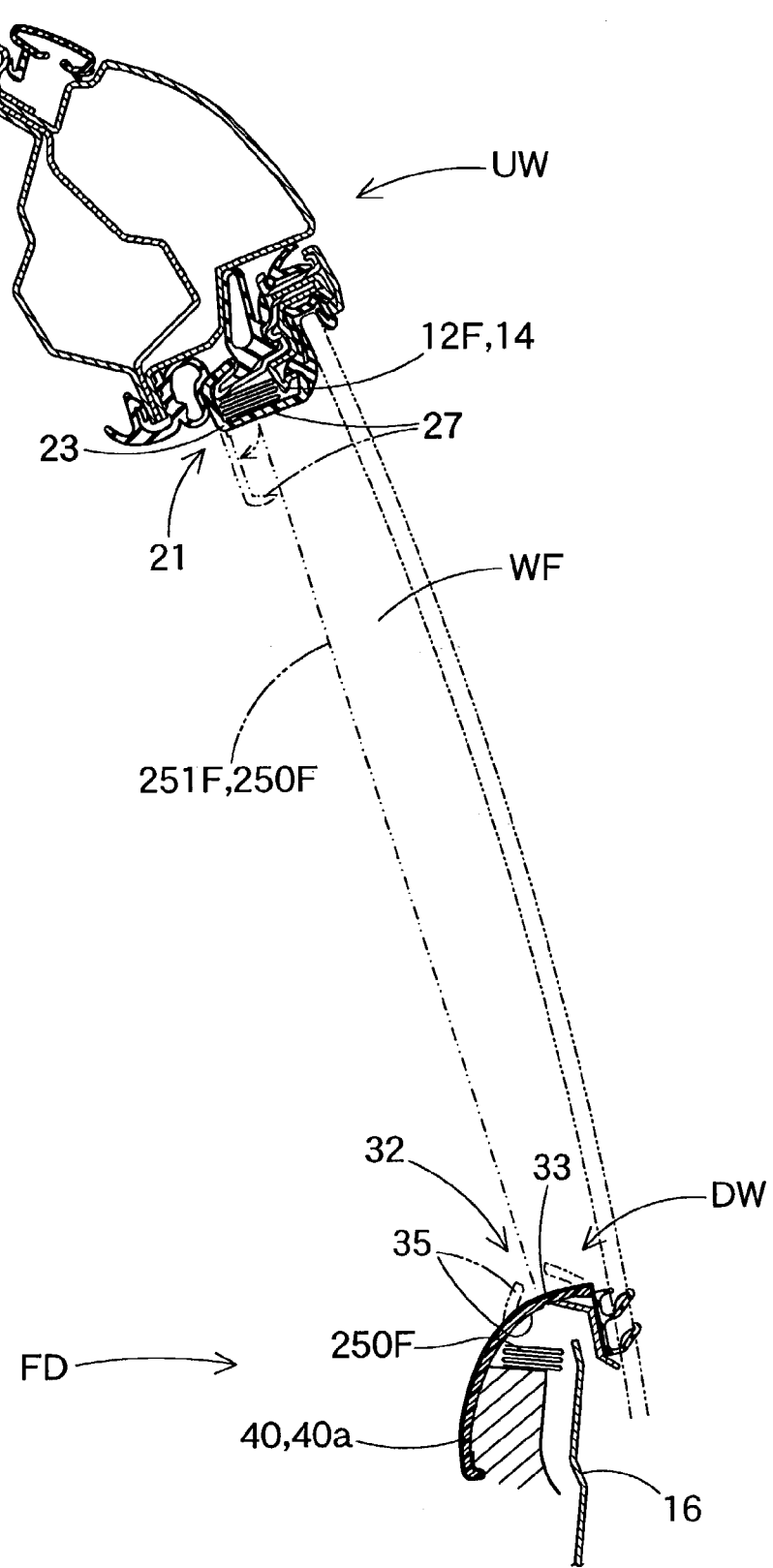
FIG. 50 is a schematic section of a portion XXXXX—XXXXX of FIG. 49.

As in the occupant restraining device S8 of the eighth embodiment shown in FIGS. 49 and 50, for example, a shielding member 250F/250R may be constructed to include a flexible triangular sheet member 251F/251R for covering the side of the front lower corner C2 of the window WF or the rear lower corner C1 of the window WR, and a string member 261F/261R acting as the tension member 72. This string member 261F/261R is connected at its leading end side to the substantially entire length of the oblique side 251a on the upper edge side of the sheet member 251F/251R. The sheet member 251F/251R uses the lower edge portion 251b as the stationary edge portion, and is fixed at the front/rear end portion 252/253 of the lower edge portion 251b on the lower edge portion 16 of the door frame 12F/12R on the side of the lower edge portion DW.

The string member 261F is bonded at its leading end portion 261a to the oblique side 251a in the sheet member 251F to cross the window WF and is fixed at its leading edge portion 261a together with the end portion 252 of the sheet member 251F to the lower edge portion 16 of the door frame 12F in the vicinity of the center pillar portion CP. Moreover, the string member 261F is wound at its root portion 261b on a free roller 255 fixed near the front portion of the upper edge portion 13 in the door frame 12F and on a free roller 256 fixed near the upper end of the rear vertical edge portion 15 in the door frame 12F, so that the root portion 261b is connected in a tensible manner to the body 71 of the pretensioner 70 which is arranged in the lower edge portion 16 of the door frame 12F.

The string member 261R is bonded at its leading end portion 261a to the oblique side 251a of the sheet member 251R to cross the window WR and is fixed at its leading edge portion 261a together with the end portion 252 of the sheet member 251R to the lower edge portion 16 of the door frame 12R in the vicinity of the center pillar portion CP. Moreover, the string member 261R is wound at its root portion 261b on a free roller 255 fixed near the rear portion of the upper edge portion 13 in the door frame 12R and on a free roller 256 fixed near the upper end of the front vertical edge portion 14 in the door frame 12R, so that the root portion 261b is connected in a tensible manner to the body 71 of the pretensioner 70 which is arranged in the lower edge portion 16 of the door frame 12R.

In the folded state of the shielding member 250F/250R, the sheet member 251F/251R is folded close to the lower edge portion 251b together with the string members 261F/261R along the lower edge portion 251b so that it may be covered with the lower edge portion 25 of the door frame garnish 21F/21R. On the other hand, the string member 261F is housed along the garnish 21F from the side of the door frame front vertical edge portion 14 through the free roller 255/256 so that its portion extending from the sheet member 251F may be covered with the garnish 21F on the side of the door FD. Moreover, the string member 261R is housed along the garnish 21R from the side of the door frame rear vertical edge portion 15 through the free roller 255/256 so that its portion extending from the sheet member 251R may be covered with the garnish 21R on the side of the door RD.

In this eighth embodiment, the control device 64 activates, when it receives a predetermined signal from the rollover sensor 62 or the side collision sensor 63, each pretensioner body 71 as the drive source of the let-off means 48. Then, each string member 261F/261R is tensed while being guided by the free roller 255/256. The sheet member 251F takes a mode in which the oblique side 251a rises backward obliquely upward from the front lower corner C2 of the window WF, and the sheet member 251R takes a mode in which the oblique side 251a rises forward obliquely upward from the rear lower corner C1 of the window WR, so that each shielding member 250F/250R shields the window WF/WR. At this action time, the string member 261 and the sheet member 251 push and open the door portion 27/35 of the garnish 21 (as referred to FIG. 50).

In this occupant restraining device S8 of the eighth embodiment, the string member 261F/261R and the free roller 255/266 are arranged at the upper edge portion UW of the window WF/WR. These arranging portions are located at the upper edge portion 13 and the front/rear vertical edge portions 14/15 on the side of the door frame 12F/12R. Moreover, those members are not bulky unlike the drive source of the let-off means 48. Therefore, the occupant restraining device S8 can be mounted without any problem on the vehicle even if it is mounted to a vehicle together with an airbag device arranged on the roof side rail portion.

In each of the embodiments, moreover, the airbag 51F/51R is arranged at the two front/rear portions of the vehicle. However, the airbags 51F/51R may be integrated by connecting their lower ends to each other by a belt 61 (as referred to FIGS. 47 and 48) or may be made of such one airbag as is covered with the front pillar garnish 5 of the front pillar portion FP from the lower edge 8a of the roof head lining 8 in the roof side rail portion RR. It is quite natural that the occupant restraining device S1/S2 according to the present invention may be mounted on a vehicle which is not provided with an airbag device ABM.

Here, the foregoing individual embodiments have been described on the case in which only one shielding member shields the window WF/WR/WS. However, a plurality of shielding members may be let off to shield a single window.

Moreover, the shielding member may be constructed to cover not only the inner side of a window but also the outer side of the window.

What is claimed is:

1. An occupant restraining device for a vehicle comprising: a shielding member adapted to be released from a peripheral edge structure of a window of the vehicle so as to shield said window; and a release mechanism for releasing said shielding member, so as to shield said window,
    wherein said window is ranged in a door of the vehicle,
    wherein said shielding member and said release mechanism are arranged in said door,
    wherein said door is provided, at the peripheral edge structure of said window inside the vehicle in a door frame, with a garnish for covering said shielding member, the garnish being attached to the door frame in a manner to allow said shielding member to be released,
    wherein said garnish is provided, at a vertical portion thereof extending generally vertically on a front side or a rear side of the vehicle in the peripheral edge structure of said window, with an apex portion protruding inward of the vehicle, wherein the apex portion abuts against a weather strip that is arranged on a body of the vehicle, and the apex portion seals a gap between the door and the body when the door is closed,
    wherein said shielding member includes a vertical housed portion to be housed in a vertical portion of said window peripheral edge structure, and
    wherein, in the vertical portion of said window peripheral edge structure, the vertical housed portion of said shielding member is housed between a portion of said garnish extending toward the vehicle's exterior and inward of the window from said apex portion and said door frame.

2. An occupant restraining device according to claim 1, wherein said garnish includes a door portion which covers the vertical housed portion of said shielding member and is adapted to be pushed and opened by said shielding member when said shielding member is released.

3. An occupant restraining device according to claim 2, wherein said door portion is opened when the shielding member breaks the peripheral edge structure when said shielding member is released.

4. An occupant restraining device according to claim 2,
    wherein said garnish includes a portion in the vicinity of said door portion and a general portion apart from said door portion's vicinity, and
    wherein said garnish is a two-color molded part in which said door portion and the portion in the vicinity of said door in said garnish are made of a thermoplastic elastomer, and said general portion in said garnish is made of a synthetic resin having a compatibility with said thermoplastic elastomer and harder than said thermoplastic elastomer.

5. An occupant restraining device comprising:
    a shielding member adapted to be released from a peripheral edge structure of a window of a vehicle so as to shield said window; and
    a release mechanism for releasing said shielding member, so as to shield said window, wherein:
    said window is arranged in a door of the vehicle,
    said shielding member and said release mechanism are arranged in said door,
    said door includes a garnish mounted on a frame of said door and arranged on the peripheral edge structure of said window to cover said shielding member and allow said shielding member to be released,
    said garnish, said shielding member and said release mechanism are integrally assembled to form an occupant restraining unit,
    said occupant restraining unit is mounted to said door frame so that said shielding member and said release mechanism are arranged in said door, said garnish is arranged on said door,
    said garnish includes:
        a door portion covering said shielding member and adapted to be pushed and opened by said shielding member when said shielding member is released;
        a cover portion covering a path of a connection portion of said release mechanism and said shielding member, the cover portion being opened along with movement of said connection portion upon deployment of said shielding member; and
        a general portion, which is a portion of said garnish other than said door portion, a portion in the vicinity of said door portion, and said cover portion, and
    said garnish is a two-color molded part in which the door portion, the portion in the vicinity of said door and said cover portion in said garnish are made of a thermoplastic elastomer, and said general portion in said garnish is made of a synthetic resin, which is compatible with said thermoplastic elastomer and harder than said thermoplastic elastomer.

* * * * *